INVENTORS
William F. Galey
George W. Misson
Wolfe, Hubbard, Voit & Osann
ATTORNEYS

EXAMPLE OF DEFECT PATTERN

| DEFECT | Z | S |
|---|---|---|
| a | 6 | 22 |
| b | 8 | 47 |
| c | 25 | 17 |
| d | 25 | 43 |
| | 26 | 43 |
| | 26 | 42 |
| | 27 | 42 |
| | 28 | 42 |
| | 28 | 41 |
| | 29 | 41 |
| | 29 | 40 |
| | 30 | 40 |
| | 30 | 39 |
| | 31 | 39 |
| | 31 | 38 |
| e | 33 | 53 |
| f | 44 | 35 |
| g | 45 | 36 |

PROGRAMMED SIZES

| SIZE | Z | S | S RANK PER Z | Z × S VALUE |
|---|---|---|---|---|
| 9×6 | 9 | 6 | 2 | 6 |
| 9×9 | | 8 | 1 | 8 |
| 20×10 | 20 | 10 | 3 | 10 |
| 20×11 | | 11 | 2 | 11 |
| 20×13 | | 13 | 1 | 13 |
| 35×7 | 35 | 7 | 3 | 7 |
| 35×15 | | 15 | 2 | 15 |
| 35×29 | | 29 | 1 | 29 |

INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959 30 Sheets-Sheet 3

FIRST CUT FROM LEADING EDGE

| TRIAL NO. | TRIAL Z | TRIAL S | AVAILABLE WIDTHS LARGER THAN ANY S | S FITS | ACCUMULATED VALUE | CHOSEN TRIAL |
|---|---|---|---|---|---|---|
| 1 | 35 | 7,15,29 | 16<br>15<br>9 | 1(15)<br>1(15) 1(7)<br>1(7) | 37 | |
| 2 | 20 | 13,11,10 | 21<br>24<br>15 | 1(11) 1(10)<br>1(13) 1(11)<br>1(13) | 58 | ✓ |
| 3 | 9 | 8,6 | 21<br>24<br>15 | 3(6)<br>3(8)<br>1(8) 1(6) | 56 | |

INVENTORS

William F. Galey
George W. Misson
Wolfe, Hubbard, Voit & Osann
ATTORNEYS

June 29, 1965 W. F. GALEY ETAL 3,191,857

GLASS PARTITIONING PROCESS AND APPARATUS

Filed Nov. 2, 1959 30 Sheets-Sheet 4

INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959 30 Sheets-Sheet 5

INVENTORS
William F. Galey
George W. Mivson
Wolfe, Hubbard, Voit & Osann
ATTORNEYS INVENTORS
William F. Galey
George W. Misson
Wolfe, Hubbard, Voit & Osann
ATTORNEYS INVENTORS
William F. Galey
George W. Misson
Wolfe, Hubbard, Voit & Osann
ATTORNEYS

GLASS PARTITIONING PROCESS AND APPARATUS

Filed Nov. 2, 1959

INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959 30 Sheets-Sheet 9

INVENTORS
William F. Galey
George W. Misson
Wolfe, Hubbard, Voit & Osann
ATTORNEYS

GLASS PARTITIONING PROCESS AND APPARATUS

Filed Nov. 2, 1959

INVENTOR
William F. Galey
George W. Misson
Wolfe, Hubbard, Voit & Osann
ATTORNEY INVENTORS
William F. Galey
George W. Misson
Wolfe, Hubbard, Voit & Osann
ATTORNEYS

GLASS PARTITIONING PROCESS AND APPARATUS

Filed Nov. 2, 1959

INVENTORS
William F. Galey
George W. Misson
Wolfe, Hubbard, Voit & Osann
ATTORNEYS

GLASS PARTITIONING PROCESS AND APPARATUS

Filed Nov. 2, 1959

INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959 30 Sheets-Sheet 14

INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959

30 Sheets-Sheet 15

INVENTORS
William F. Galey
George W. Misson
Wolf, Hubbard, Voit & Osann
ATTORNEYS June 29, 1965 W. F. GALEY ETAL 3,191,857

GLASS PARTITIONING PROCESS AND APPARATUS

Filed Nov. 2, 1959

30 Sheets-Sheet 16

INVENTORS
William F. Galey
George W. Misson
Wolfe, Hubbard, Voit & Osann
ATTORNEYS INVENTOR
William F. Galey
George W. Misson
Wolfe, Hubbard, Voit & Osann
ATTORNEY INVENTOR
William F. Galey
George W. Misson
Wolfe, Hubbard, Voit & Osann
ATTORNEY

GLASS PARTITIONING PROCESS AND APPARATUS

Filed Nov. 2, 1959

INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959 30 Sheets-Sheet 20

INVENTORS
William F. Galey
George W. Misson
Wolfe, Hubbard, Voit & Osann
ATTORNEYS INVENTOR
William F. Galey
George W. Misson
Wolfe, Hubbard, Voit & Osann
ATTORNEYS

GLASS PARTITIONING PROCESS AND APPARATUS

Filed Nov. 2, 1959

INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959 30 Sheets-Sheet 23

INVENTORS
William F. Galey
George W. Misson

Wolfe, Hubbard, Voit & Osann
ATTORNEY

June 29, 1965 W. F. GALEY ETAL 3,191,857

GLASS PARTITIONING PROCESS AND APPARATUS

Filed Nov. 2, 1959

30 Sheets-Sheet 24

INVENTORS
William F. Galey
George W. Misson

Wolfe, Hubbard, Voit & Osann
ATTORNEYS

GLASS PARTITIONING PROCESS AND APPARATUS

Filed Nov. 2, 1959 30 Sheets-Sheet 25

INVENTOR
William F. Galey
George W. Misson
Wolfe, Hubbard, Voit & Osann
ATTORNEY INVENTORS
William F. Galey
George W. Misson
Wolfe, Hubbard, Voit & Osann
ATTORNEYS INVENTORS
William F. Galey
George W. Misson
Wolfe Hubbard Voit & Osann
ATTORNEYS INVENTORS
William F. Galey
George W. Misson
Wolfe, Hubbard, Voit & Osann
ATTORNEYS June 29, 1965 W. F. GALEY ETAL 3,191,857

GLASS PARTITIONING PROCESS AND APPARATUS

Filed Nov. 2, 1959

30 Sheets-Sheet 29

INVENTORS
William F. Galey
George W. Misson
Wolfe, Hubbard, Voit & Osann
ATTORNEYS INVENTORS
William F. Galey
George W. Misson
Wolfe, Hubbard, Voit & Osann
ATTORNEYS United States Patent Office 3,191,857

Patented June 29, 1965

3,191,857

GLASS PARTITIONING PROCESS AND APPARATUS

William F. Galey, Saxonburg, and George W. Misson, Pittsburgh, Pa., assignors to Pittsburgh Plate Glass Company, Allegheny County, Pa., a corporation of Pennsylvania Filed Nov. 2, 1959, Ser. No. 850,460

25 Claims. (234—3)

This invention relates in general to the manufacture of plate glass and particularly to a process for inspecting sheets or a ribbon of polished and ground plate glass for defects, and directing the cutting of the glass into smaller, saleable sizes according to the defects which are found to be present.

In the manufacture of plate glass heretofore, the manner of cutting a large sheet or continuous ribbon of plate glass into smaller desired sizes has been determined by trained personnel after visual inspection of the glass for the presence of defects which are likely to affect its optical and mechanical properties. The defects which may be present in the body of or on the surface of polished plate glass sheets or ribbon and which mar the optical properties of the glass sufficiently to be discerned by the human eye, are of certain well-known and picturesquely named kinds. Examples of these are: point type defects such as stones or sand holes, gross surface defects such as sleeks and scratches, and microscopic surface defects such as sweep and peel.

It has been found that as various grades of plate glass are required for various purposes, certain defects, if not too severe, may be permitted in the smaller sizes that are cut from the larger uncut sheets or ribbon. While glass which is to be used for high quality mirrors is required to meet quality standards far higher than required for glazing quality plate glass, certain minor defects may yet be permitted in plate glass graded for mirror use. More severe defects (mirror defects), while lowering the quality of the glass below mirror grade, however, are acceptable in plate glass graded "glazing." Glass containing defects of a greater severity, such that would lower the quality so that it would be judged below glazing grade, is called "cullet." Such defects are called "glazing" or "total" defects. To produce usable sizes of glass of mirror or glazing grade, therefore, the defect containing areas of the glass must be excluded by the cutting procedure followed in partitioning the sheets or ribbon. And, it is clearly apparent that in order to obtain the greatest yield of usable glass in the desired smaller sizes from the large uncut sheet or ribbon, both the severity of the defects as well as the area that they cover, will enter into the determination of the manner in which the glass should be partitioned and cut.

In fitting or piecing out different combinations of various sizes from the usable areas of the large uncut plate glass sheets or ribbons, it is desired, of course, to throw away or downgrade as little of the glass as is necessary. Time and timing are always of concern since the operation must maintain pace with high production manufacture in which glass in a given width, either as large separate sheets or as unbroken ribbon, moves at a continuous rate as it is formed and finished.

Efficiency goals in laying out the usable areas of the total glass output into smaller sizes have in fact been limited by the number of factors which skilled layout men have found it practical to consider. The possible factors are many. For example, a large number of predetermined sizes are marketable and more than one grade may also be involved. Inspection is required for the total output since the defect distribution is not predictable. Relative preference or demand for the various sizes may also be factors. The demand for particular sizes may change in accordance with the quantities which have already been cut. Obviously, the number of choices of possible glass sizes which must be evaluated before a cut is made is very large if all of the factors or choices are considered.

In the interests of reducing storage and handling of the glass produced before shipping, close control of elapsed time is also involved. Desirably the sequence of inspection for defects, the presentation of all the relevant data, the making of economic cutting decisions by the layout men, the actual cutting, and the routing of the cut glass sizes to respective packing stations, is an essentially on-line procedure.

It is the general object of this invention to provide a process for directing the cutting of plate glass in pace with its production which utilizes manual, visual inspection similar to that which has been carried out heretofore, but eliminates human calculation in correlating supplied data on specific defect locations in a sheet or ribbon to be cut on the one hand, and on desired sizes on the other hand, to reach a cutting determination aimed at granting the most effective overall yield of glass. While any manual, visual inspection procedure necessarily requires human judgment in evaluating the severity of the defects, by reducing the number of decisions requiring subjective evaluation, the object is to obtain greater uniformity in glass grading with less waste than has been achievable heretofore with known inspection, partitioning, and cutting procedures.

Another object is to provide a process and apparatus for partitioning sheets or a ribbon of glass into desired smaller sizes wherein both the severity of the defects as well as their distribution are considered in determining the manner in which the glass should be cut.

Another object is to provide in pace with the glass production a secondary record of the defects in the glass which comprises an analogue of the defect spotted glass sheet or ribbon and a means for storing defect location information.

A further object is to provide a defect storage apparatus wherein a secondary record of defect locations is made by punching holes in a paper tape at locations coordinately corresponding to the locations of the defects in the glass.

Still another object is to provide for read-out of the defect location information found on the secondary record, so that a cutting determination may be made by computations based on the data read-out to partition the sheet or ribbon into smaller programmed sizes.

More specifically, it is an object to provide means for read-out of defect location information on the secondary record for progressively greater (or smaller) lengths of glass starting with a point on the secondary record corresponding to the leading edge of the sheet or ribbon of glass, so that based on the read-out data, programmed widths may be fitted into the usable lengths of the glass and the cut for which the best fit is provided may be chosen.

Other objects will become apparent as the following description proceeds taken together with the accompanying drawings, wherein.

Figure 1:
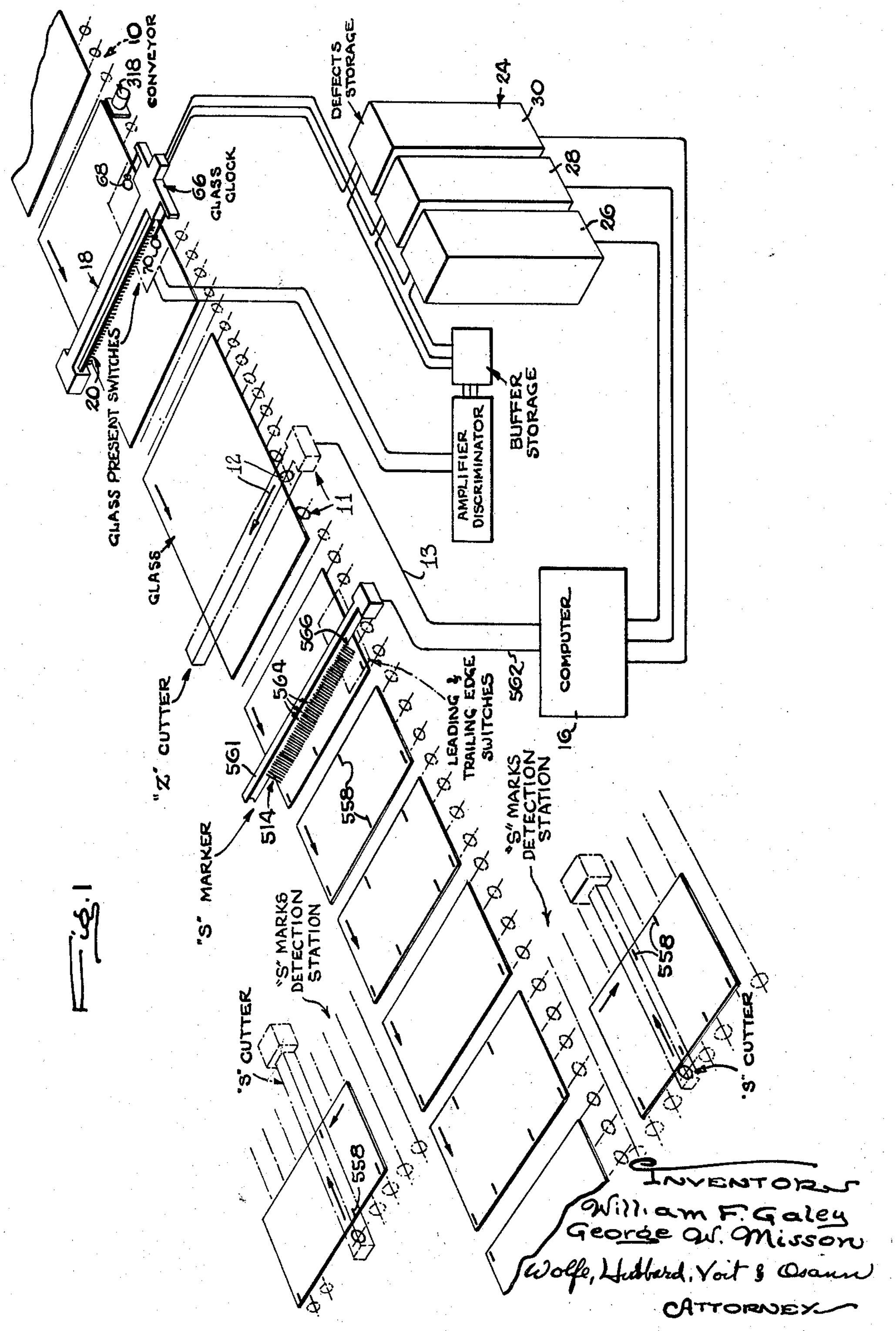
FIGURE 1 is a diagrammatic overall view of the partitioning apparatus.
Figures 2, 2A, 2B:
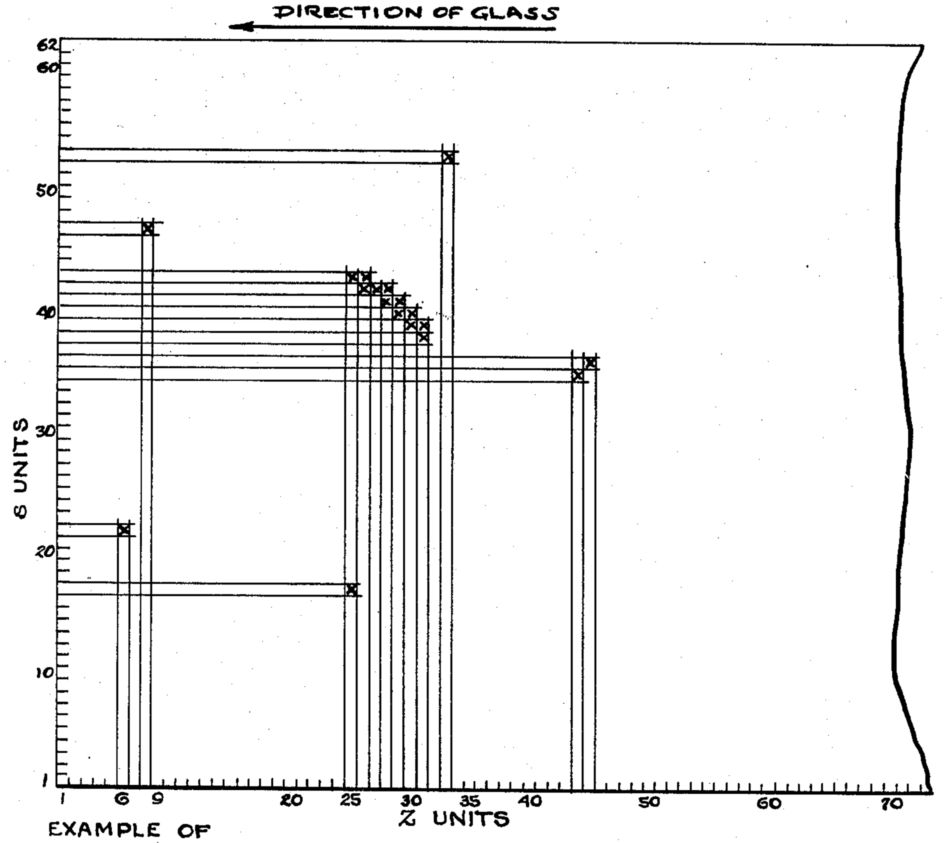
FIG. 2 is an illustration of a defect-spotted glass sheet.
Figures 2C, 2D:
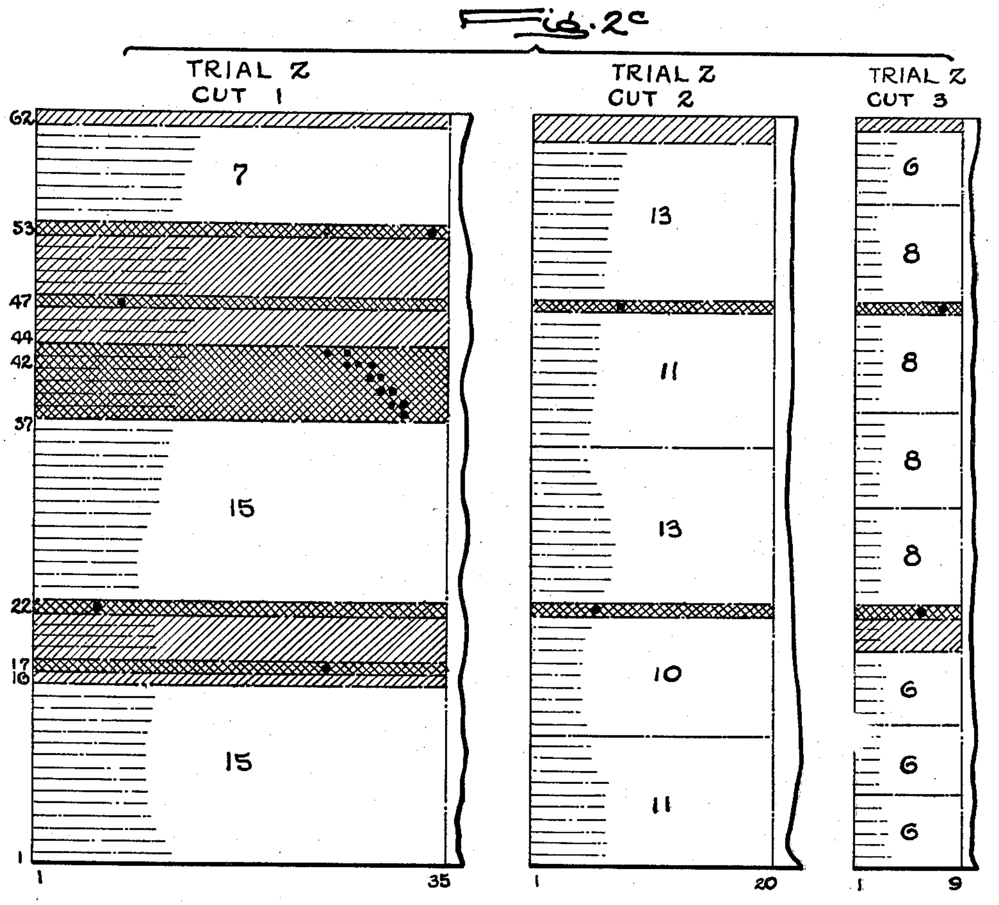
Figures 3, 4, 5:
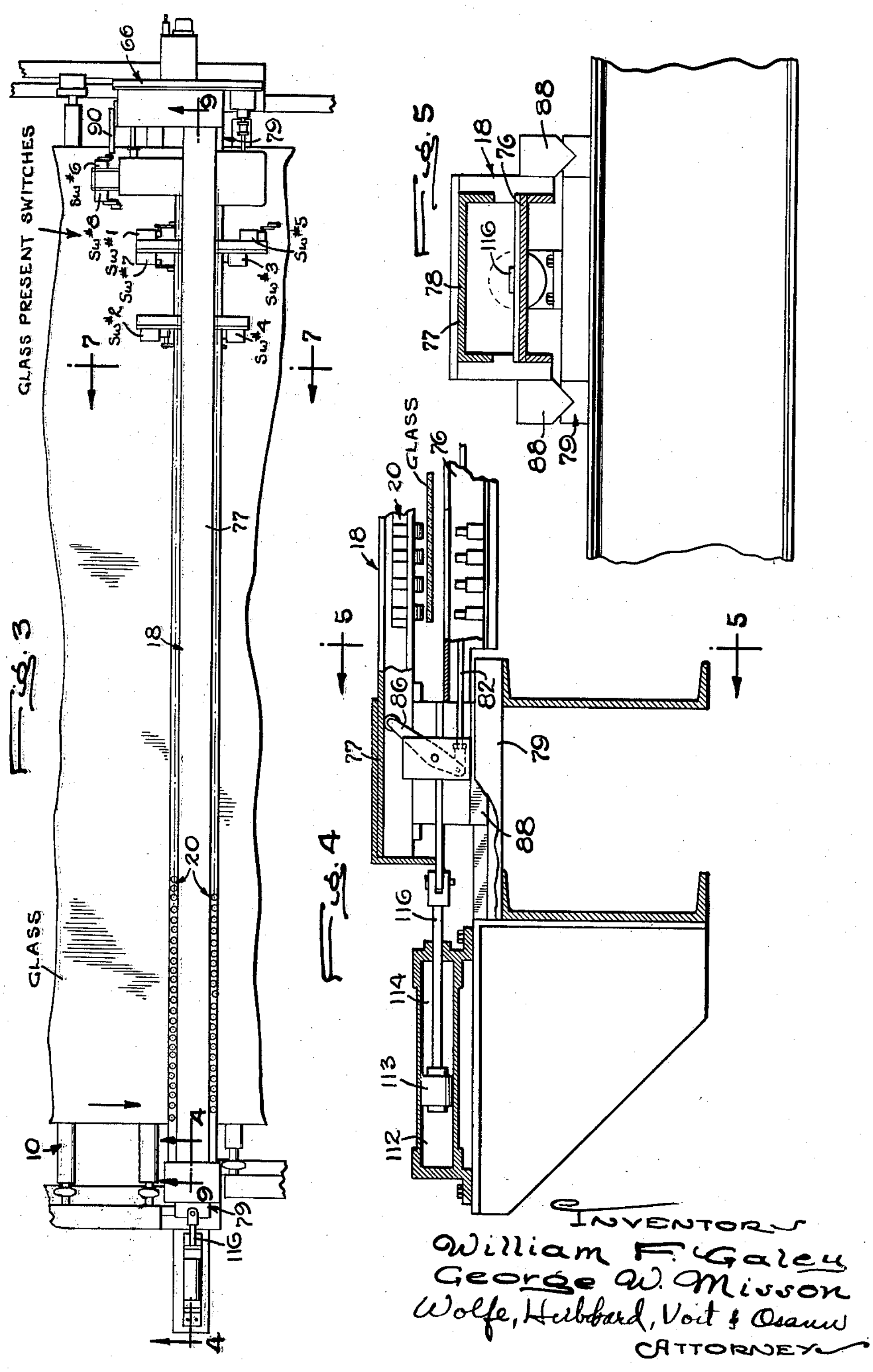
Figure 6:
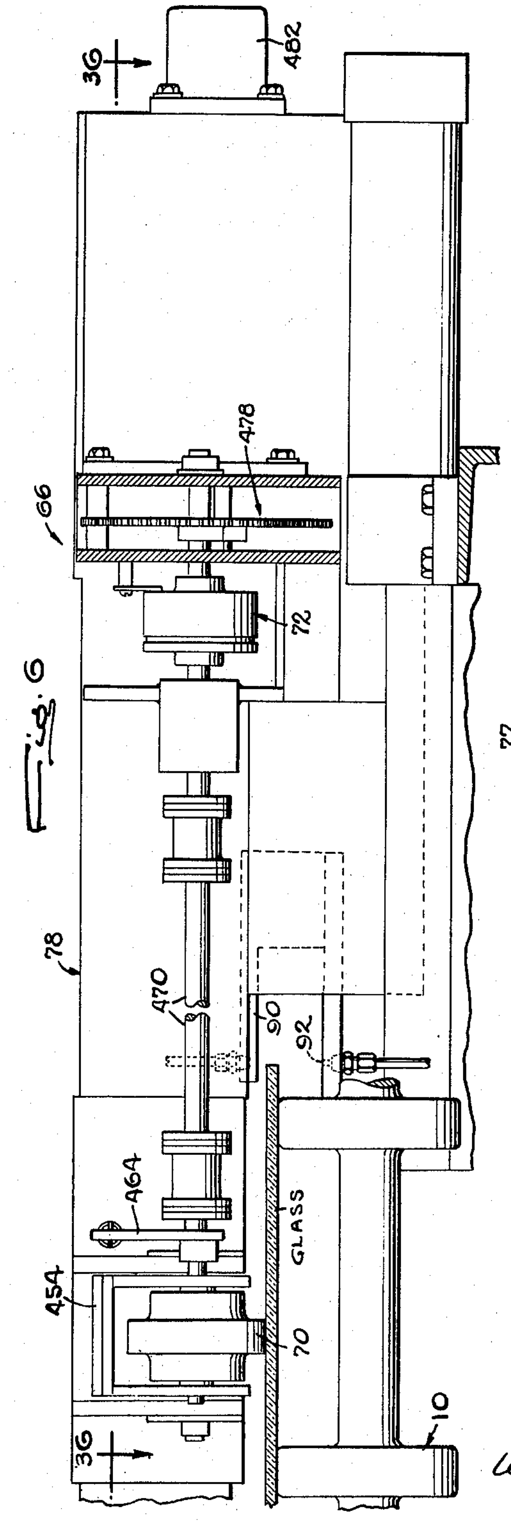
Figure 7:
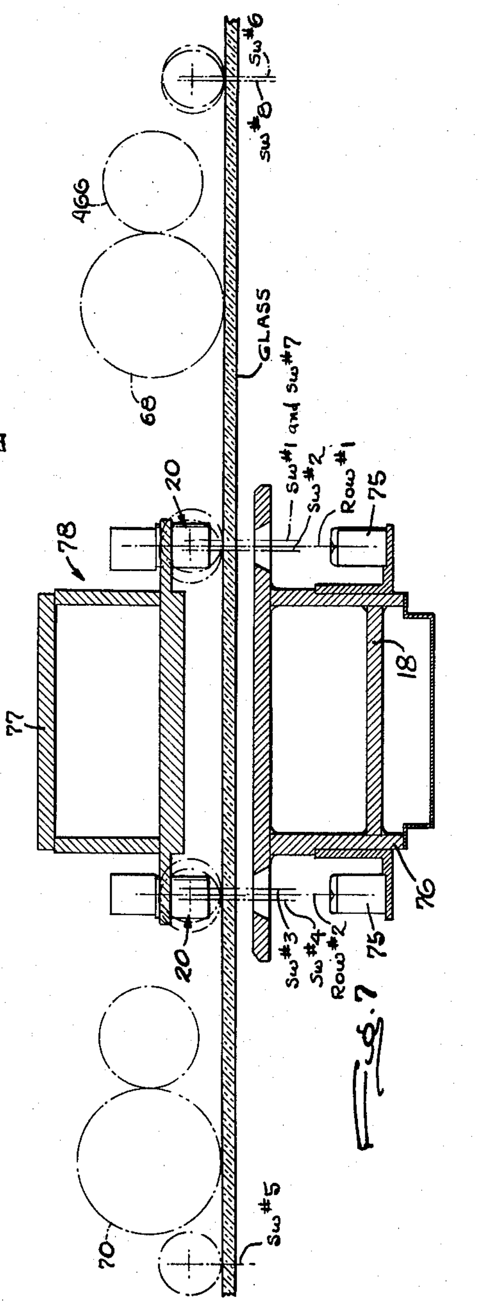
Figure 8:
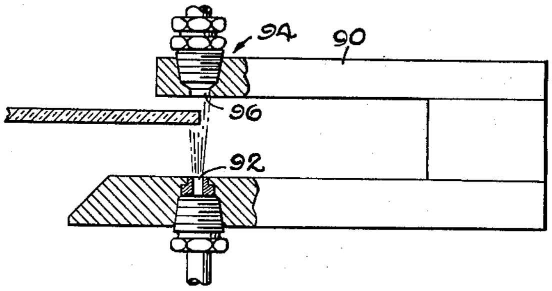
Figures 9, 10:
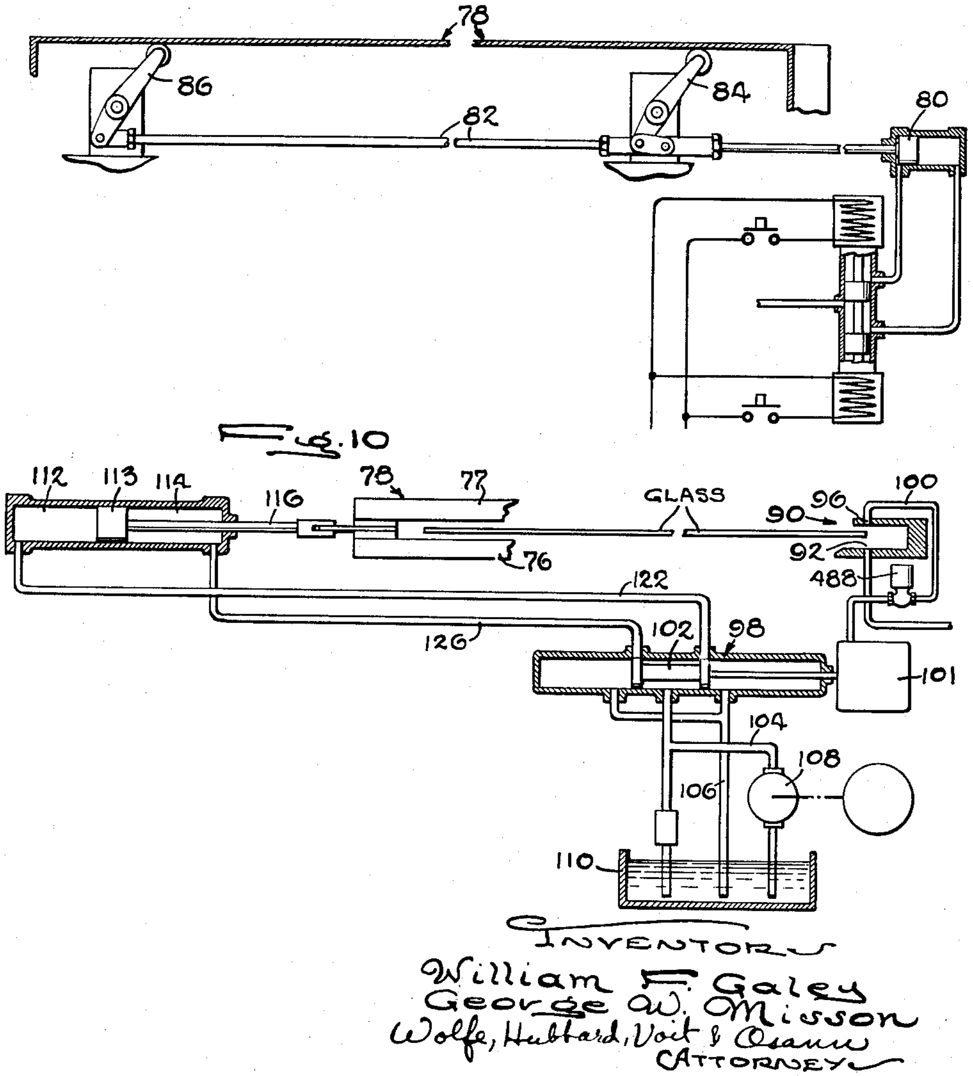
Figure 11A:
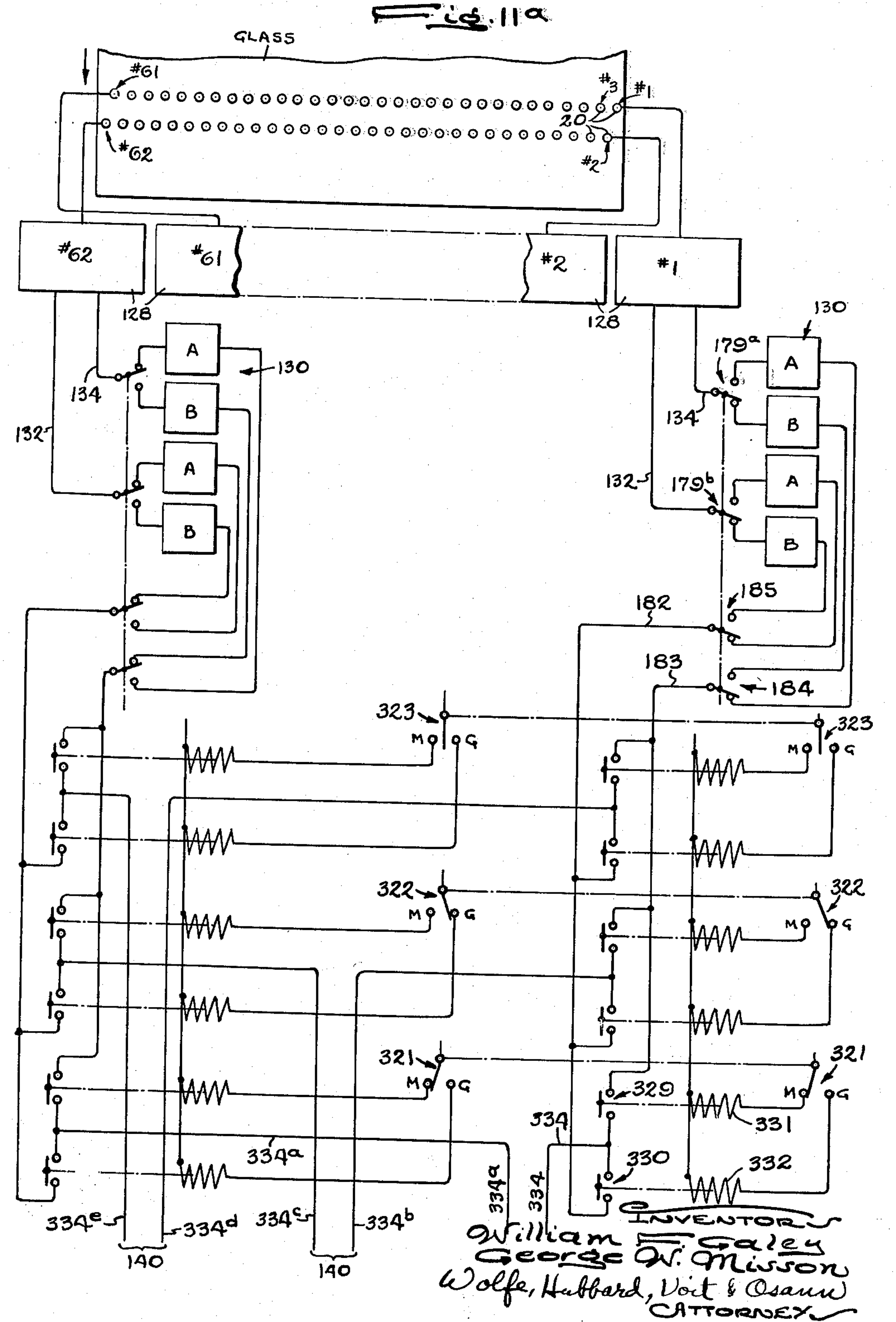
Figure 12:
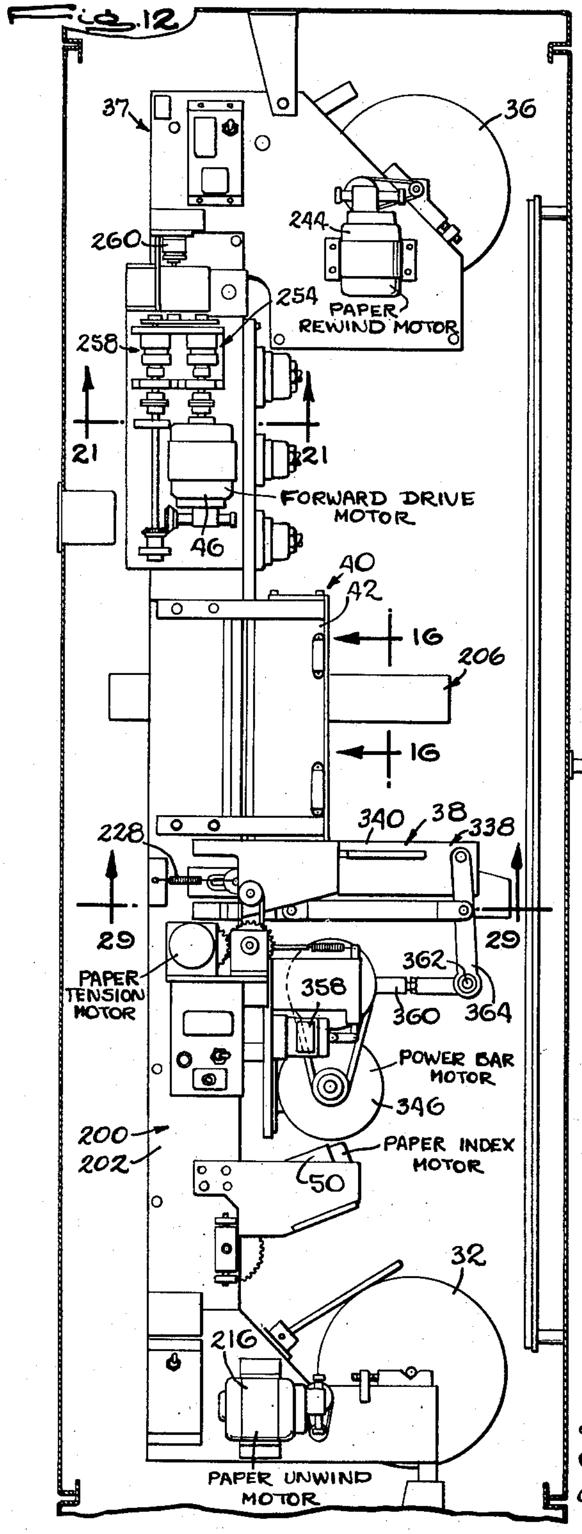
Figure 13:
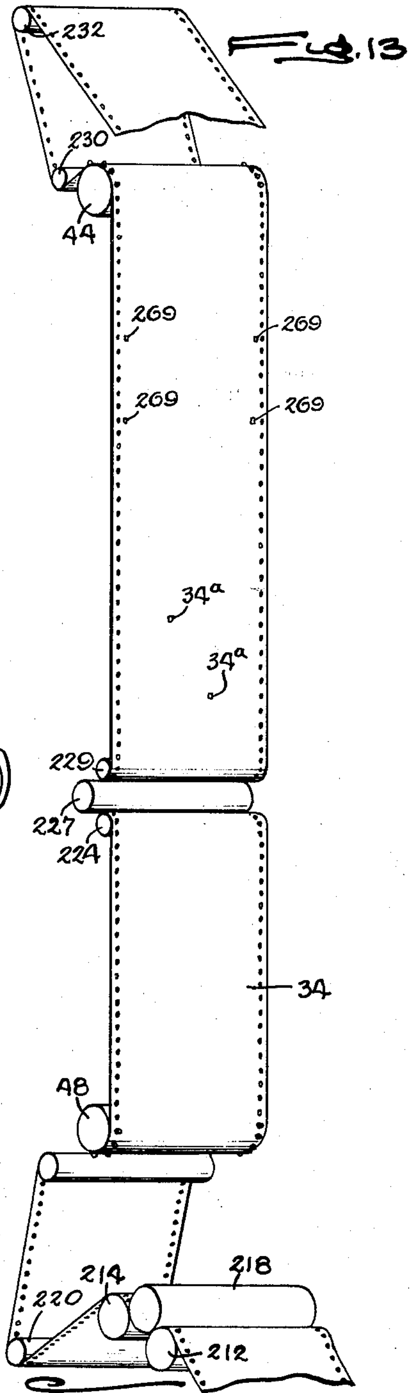
Figure 14:
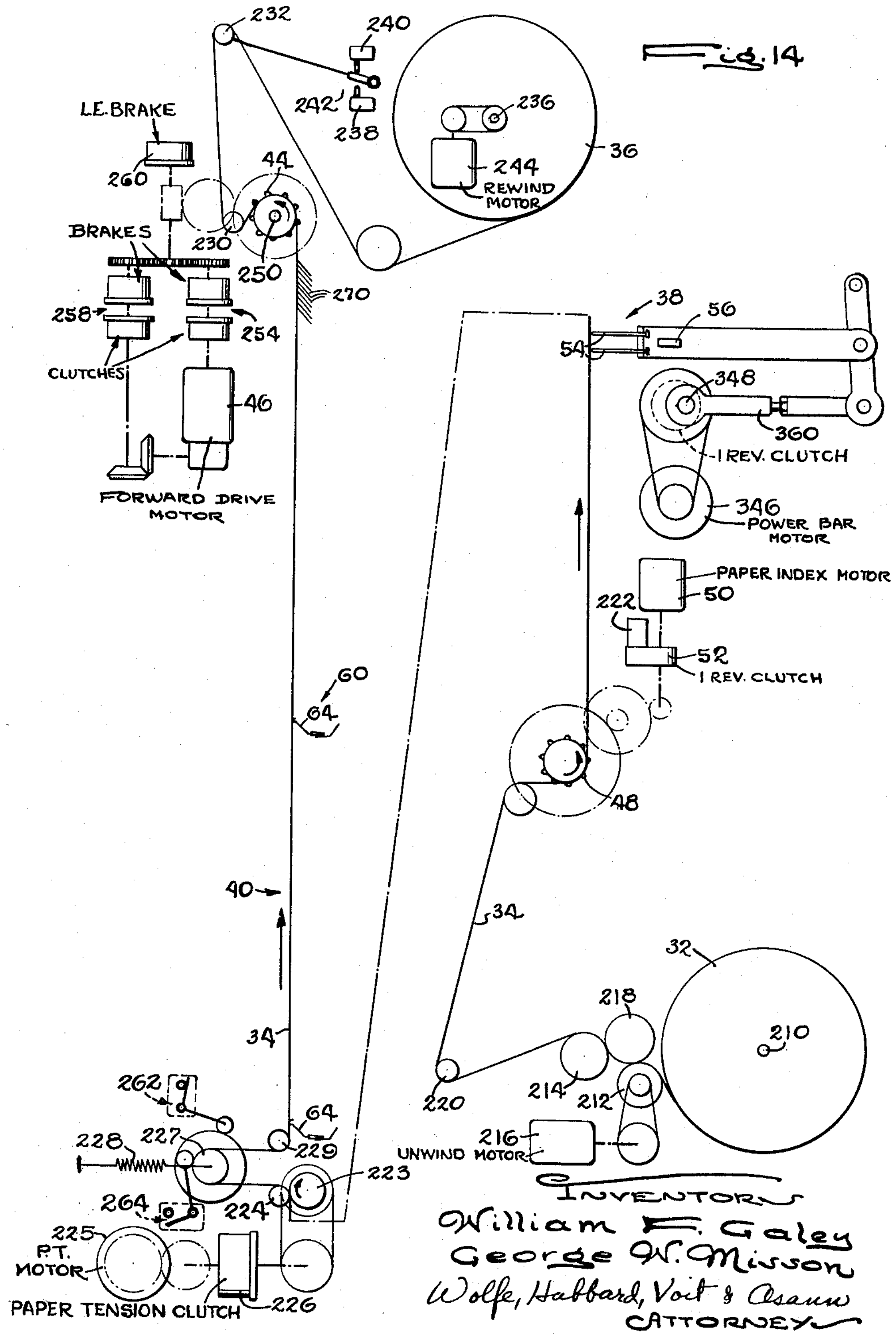
Figure 15:
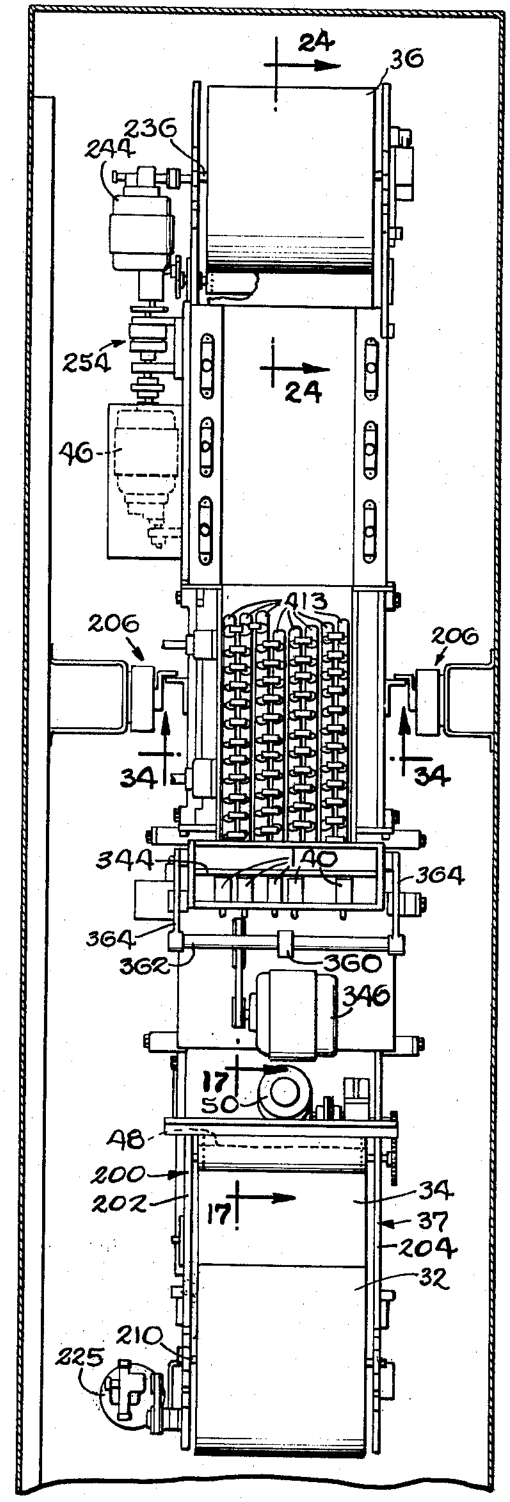
Figure 16:
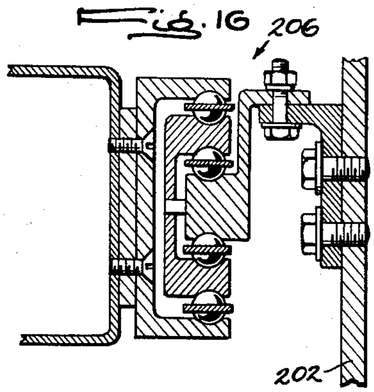
Figure 16A:
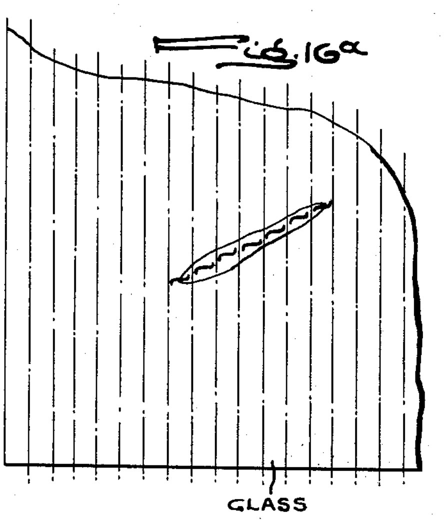
Figure 17:
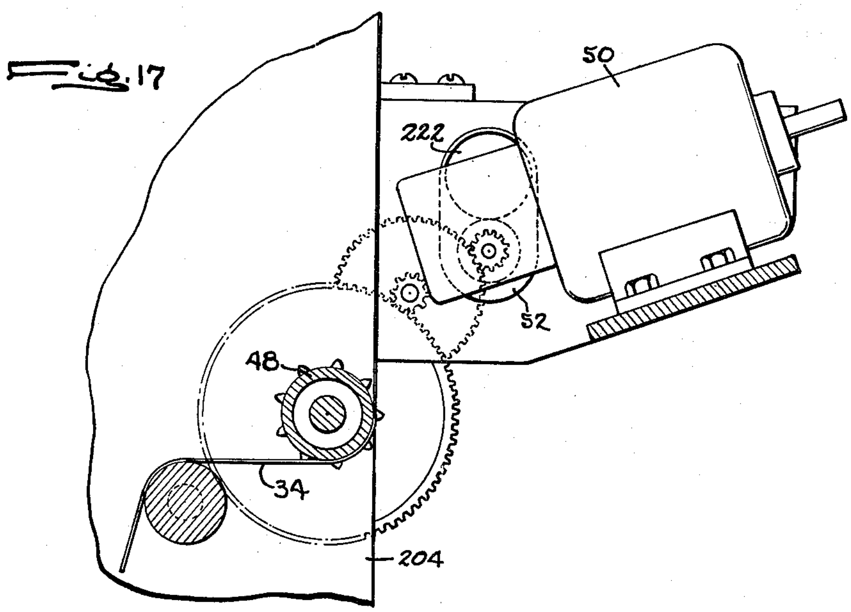
Figure 18:
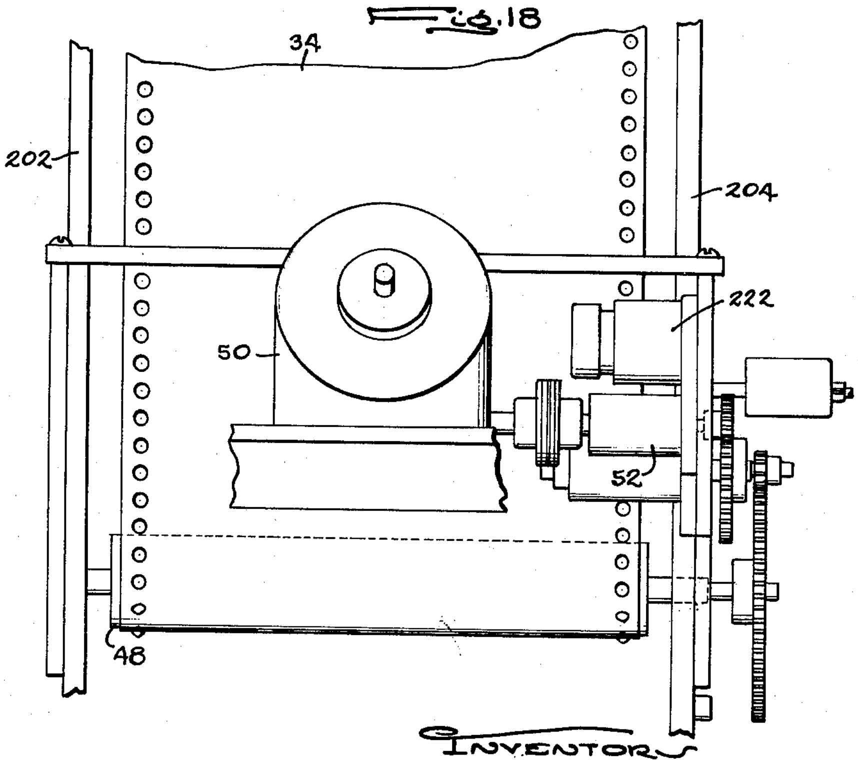
Figure 19:
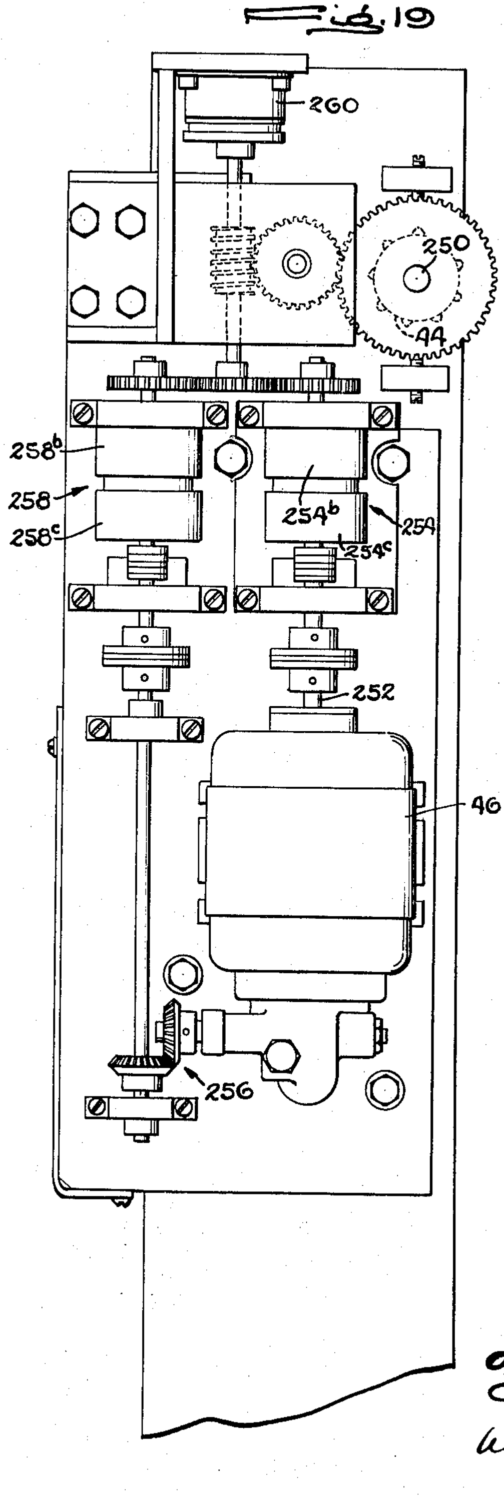
Figure 20A:
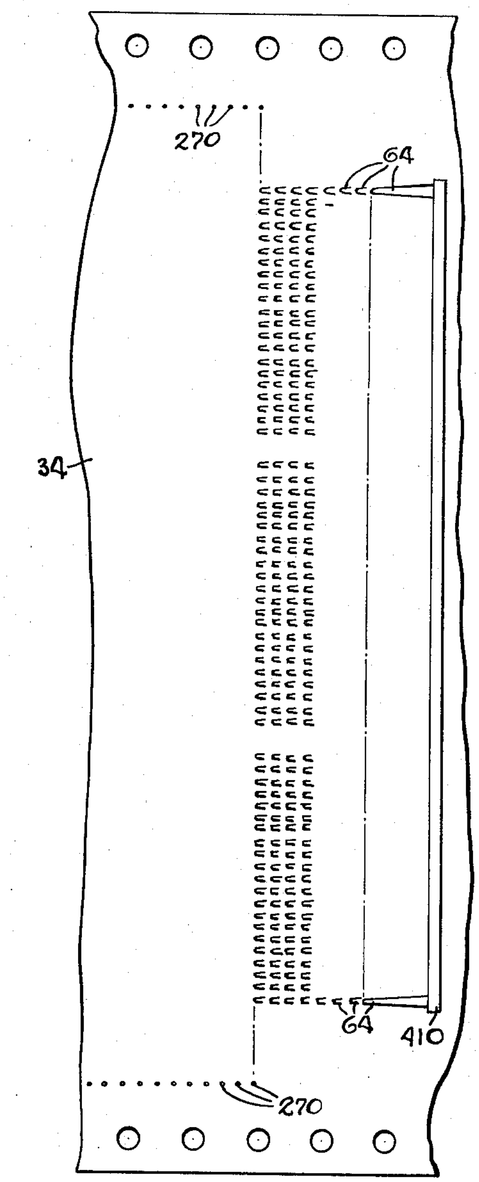
Figure 20:
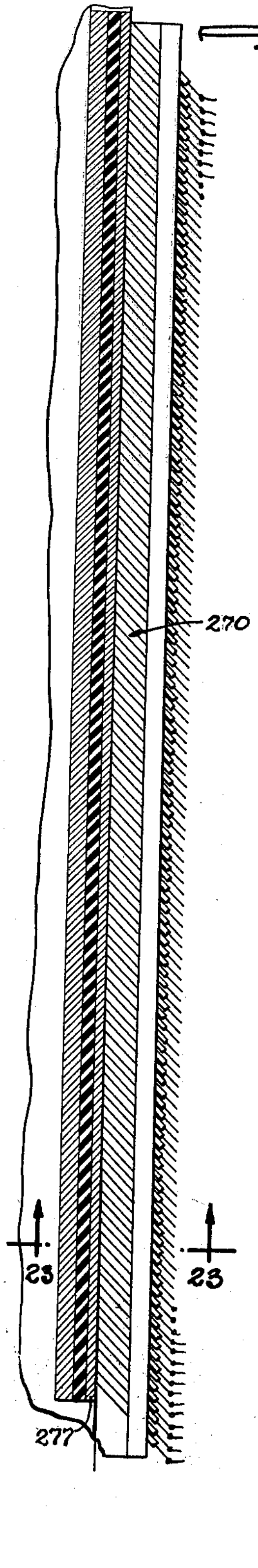
Figure 21:
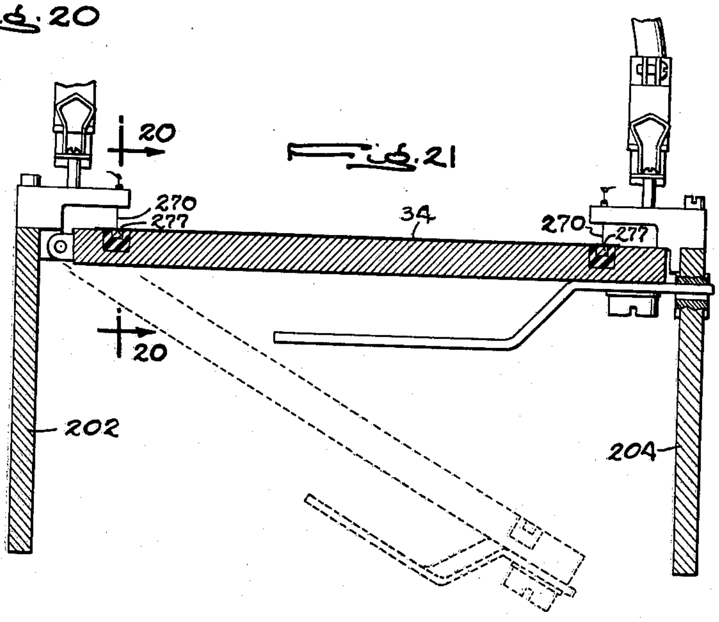
Figure 22:
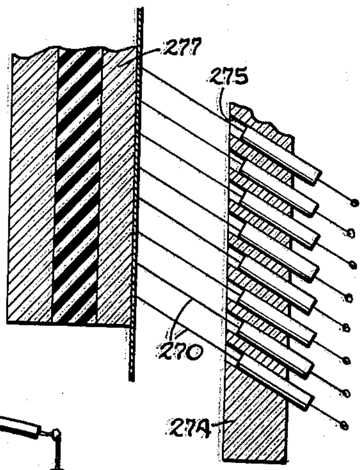
Figure 23:
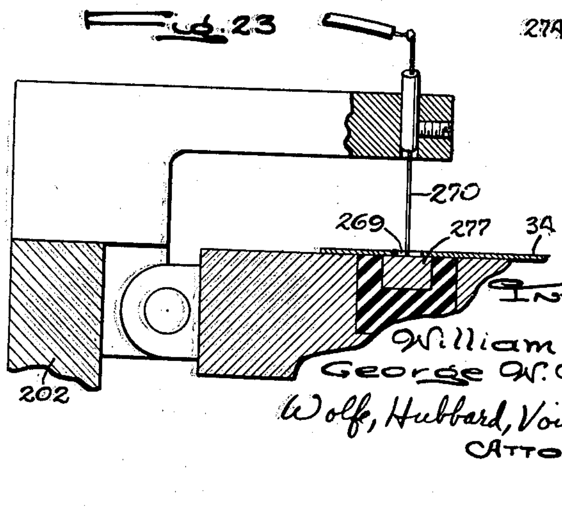
Figures 24, 25, 26:
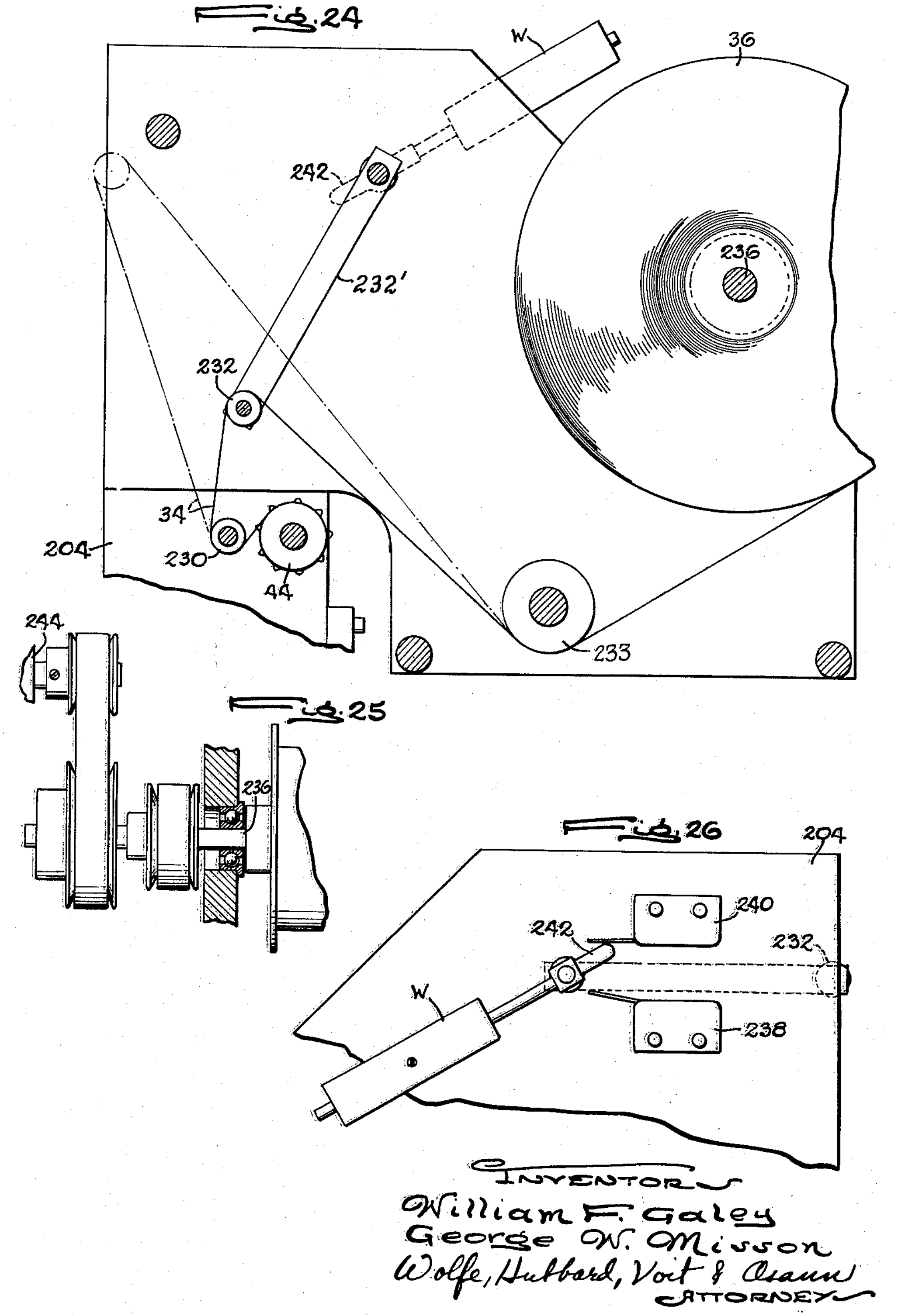
Figures 27, 28:
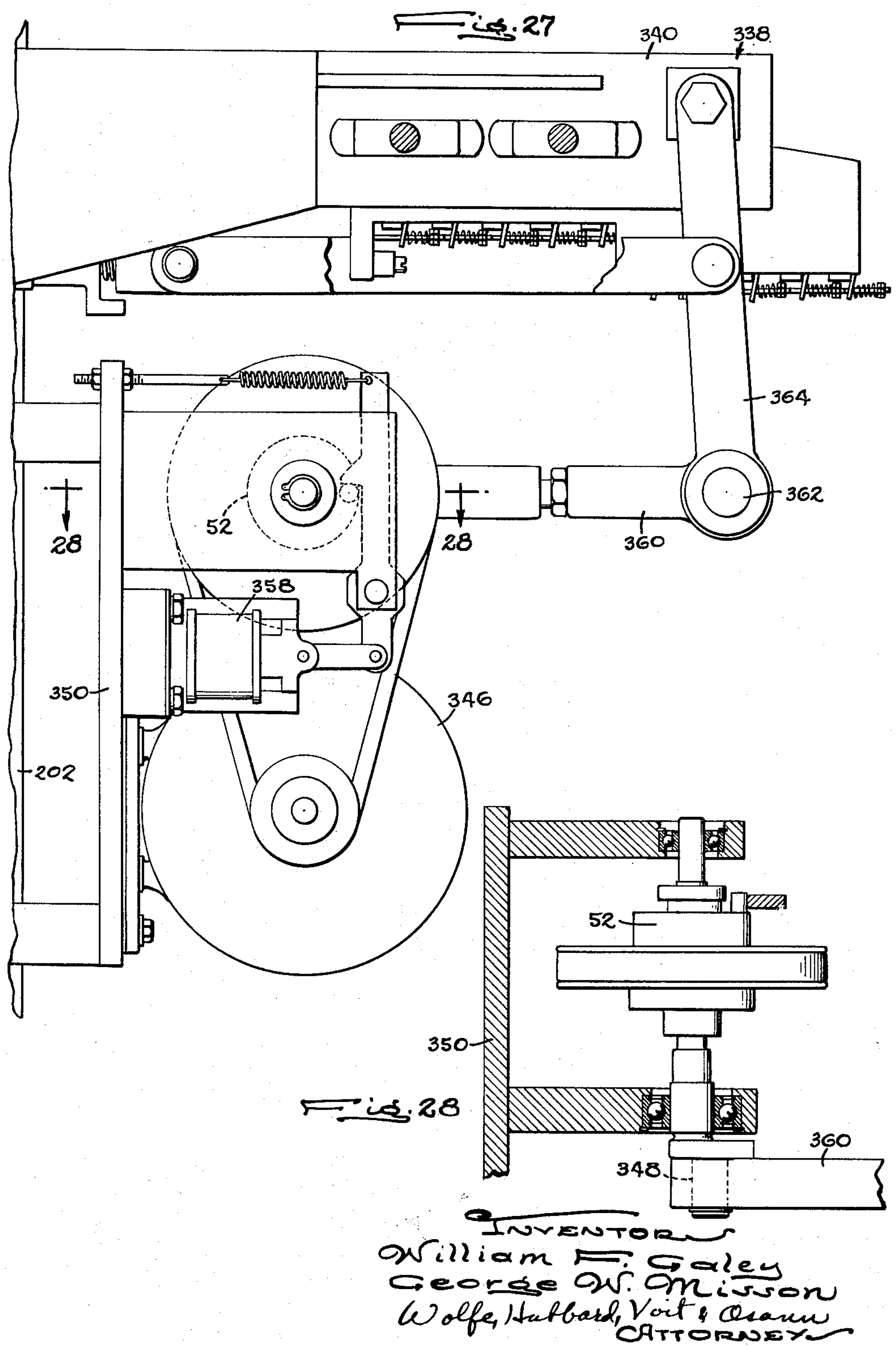
Figure 29:
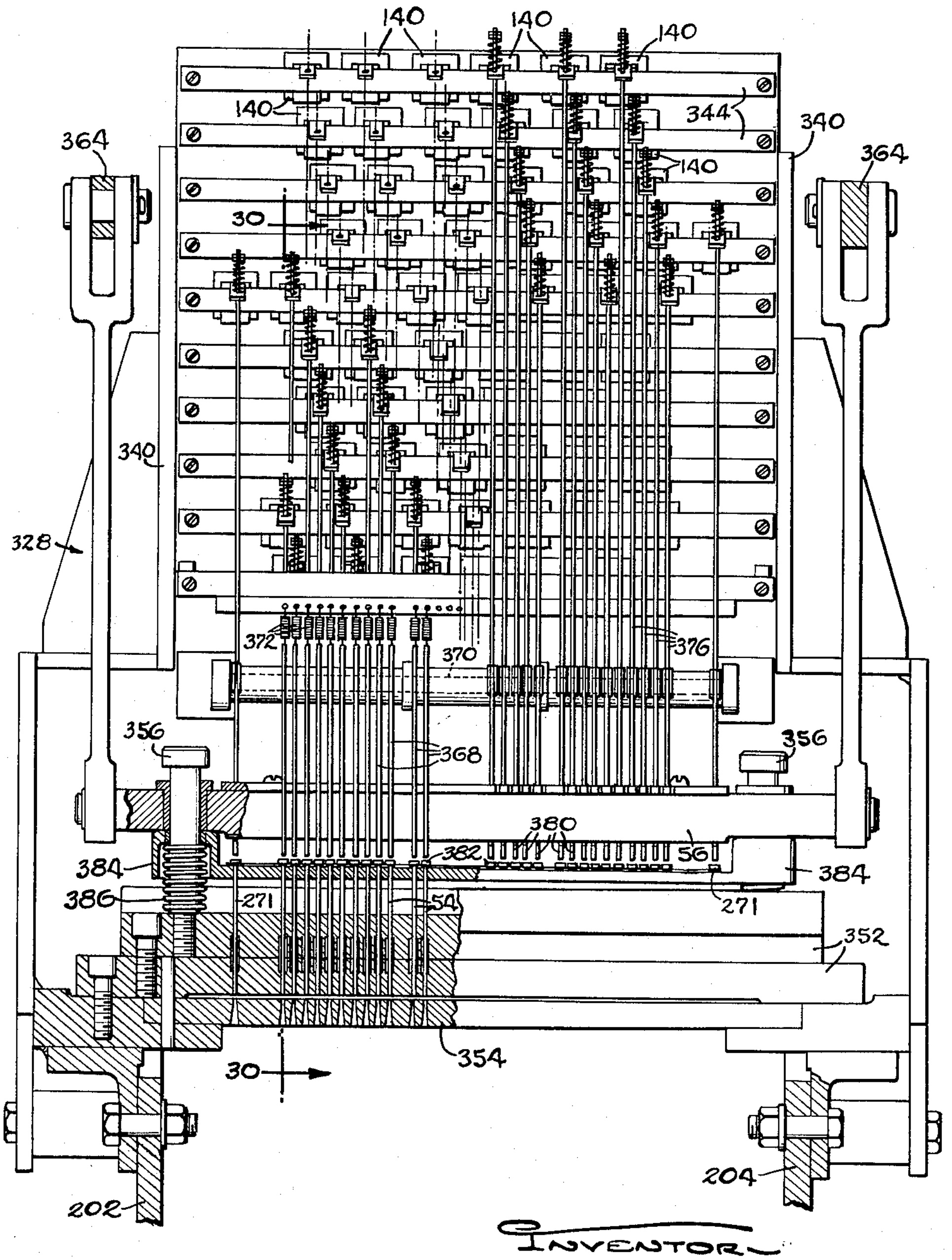
Figure 30:
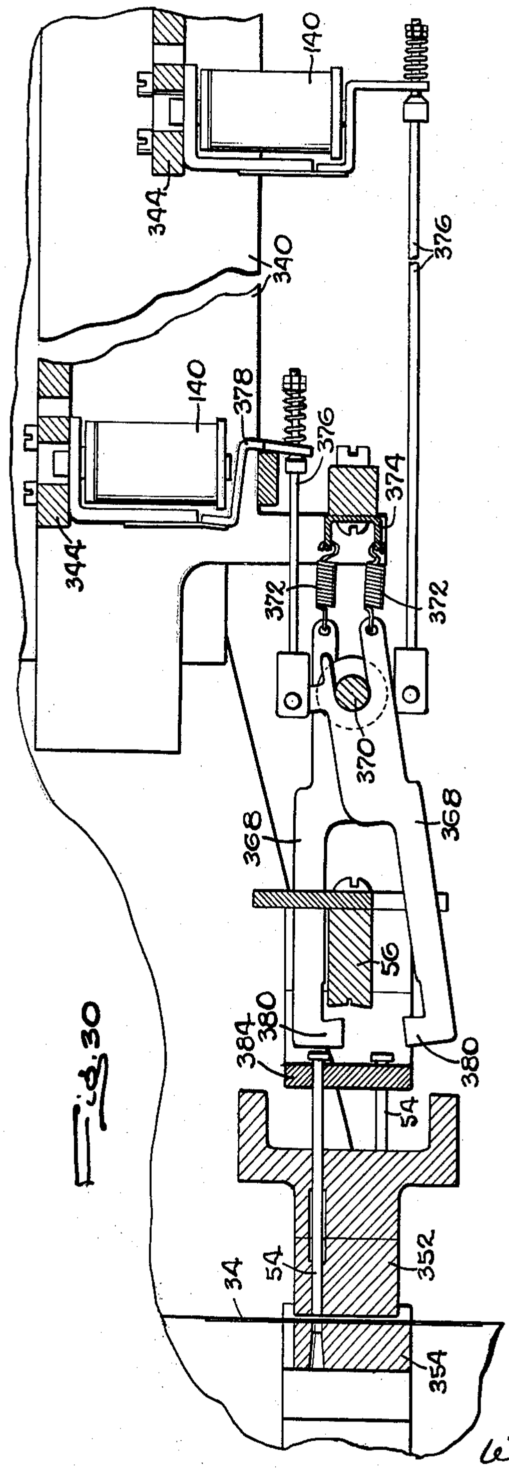
Figure 31:
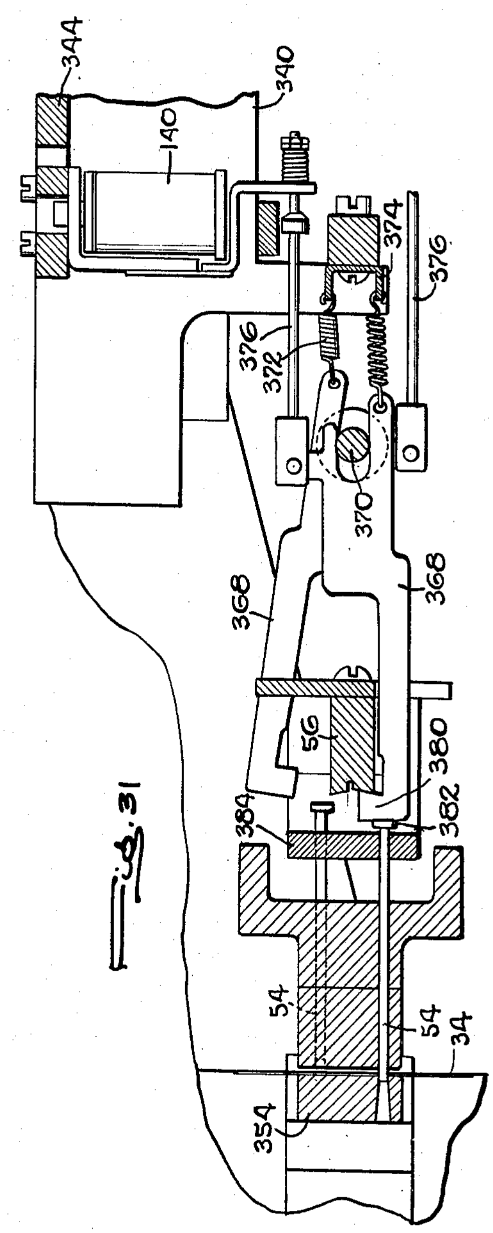
Figure 32:
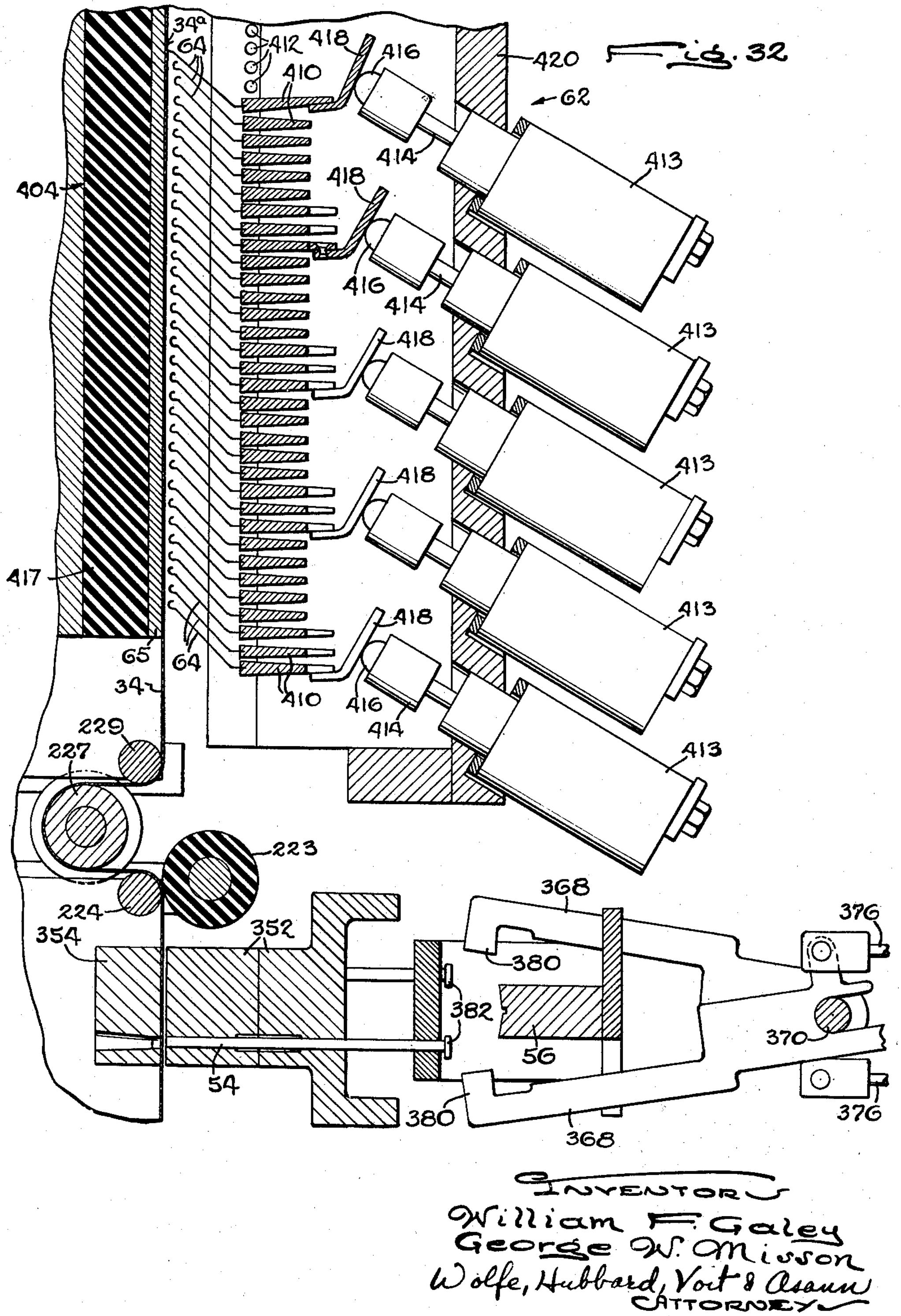
Figure 33:
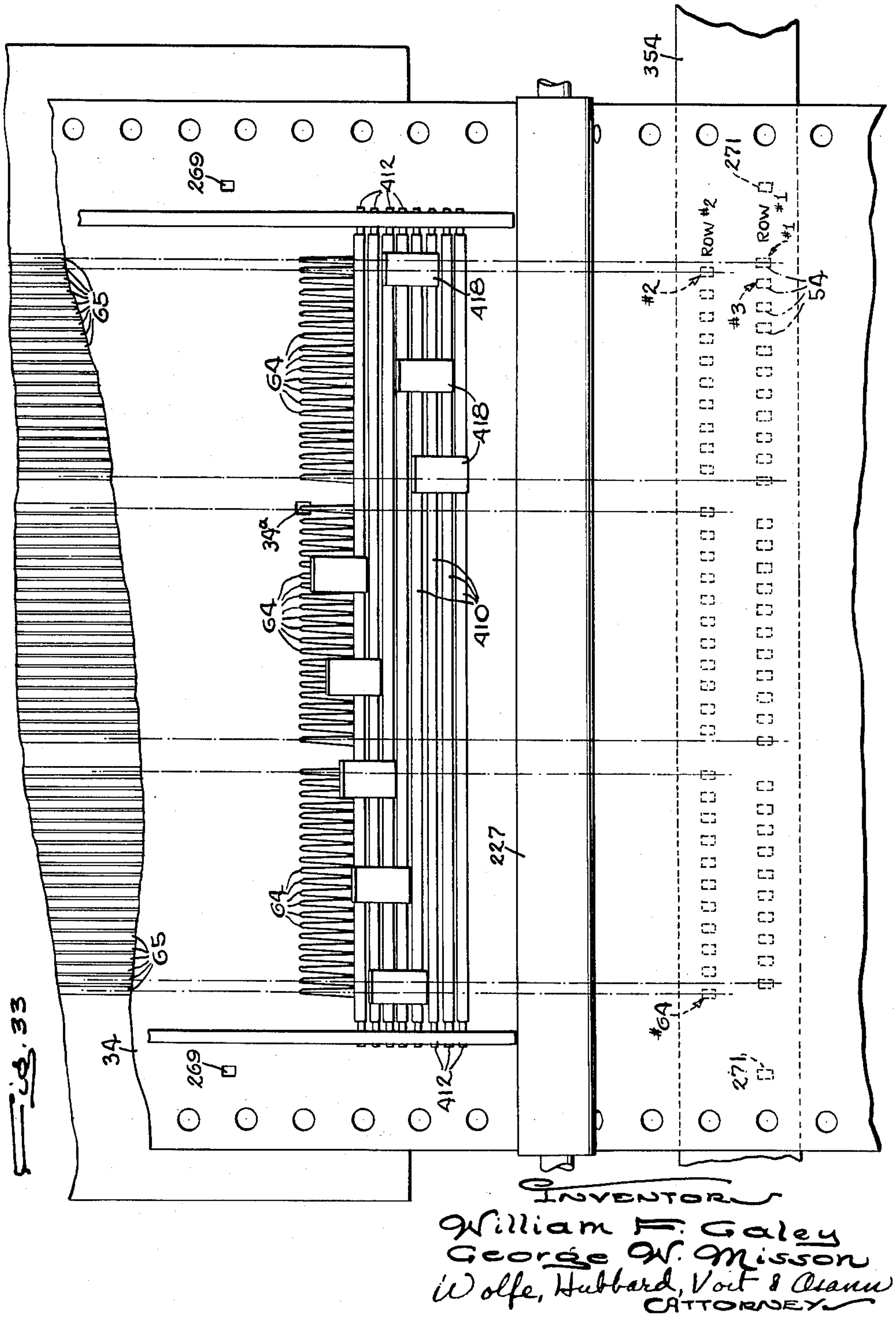
Figure 34:
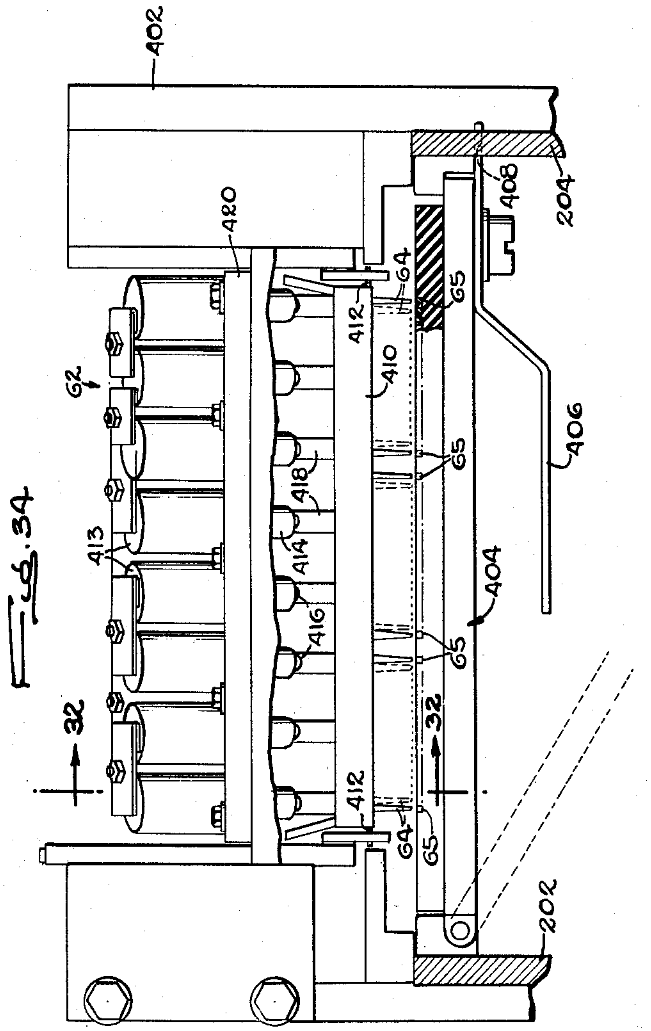
Figure 35:
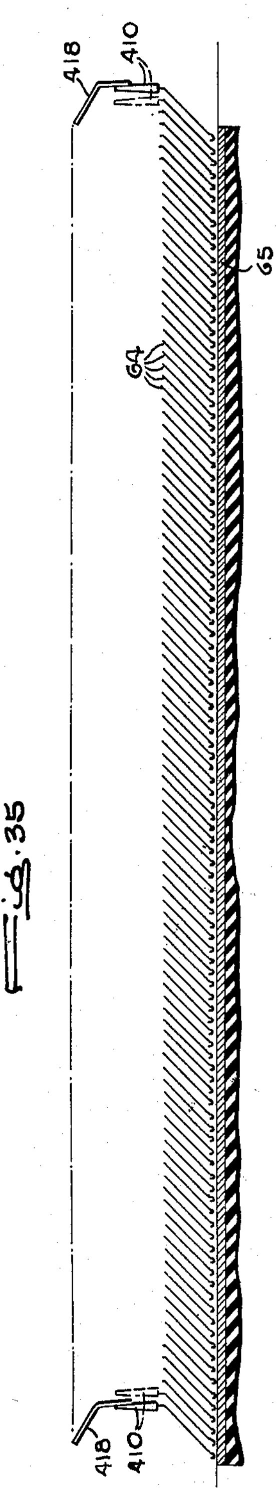
Figure 36:
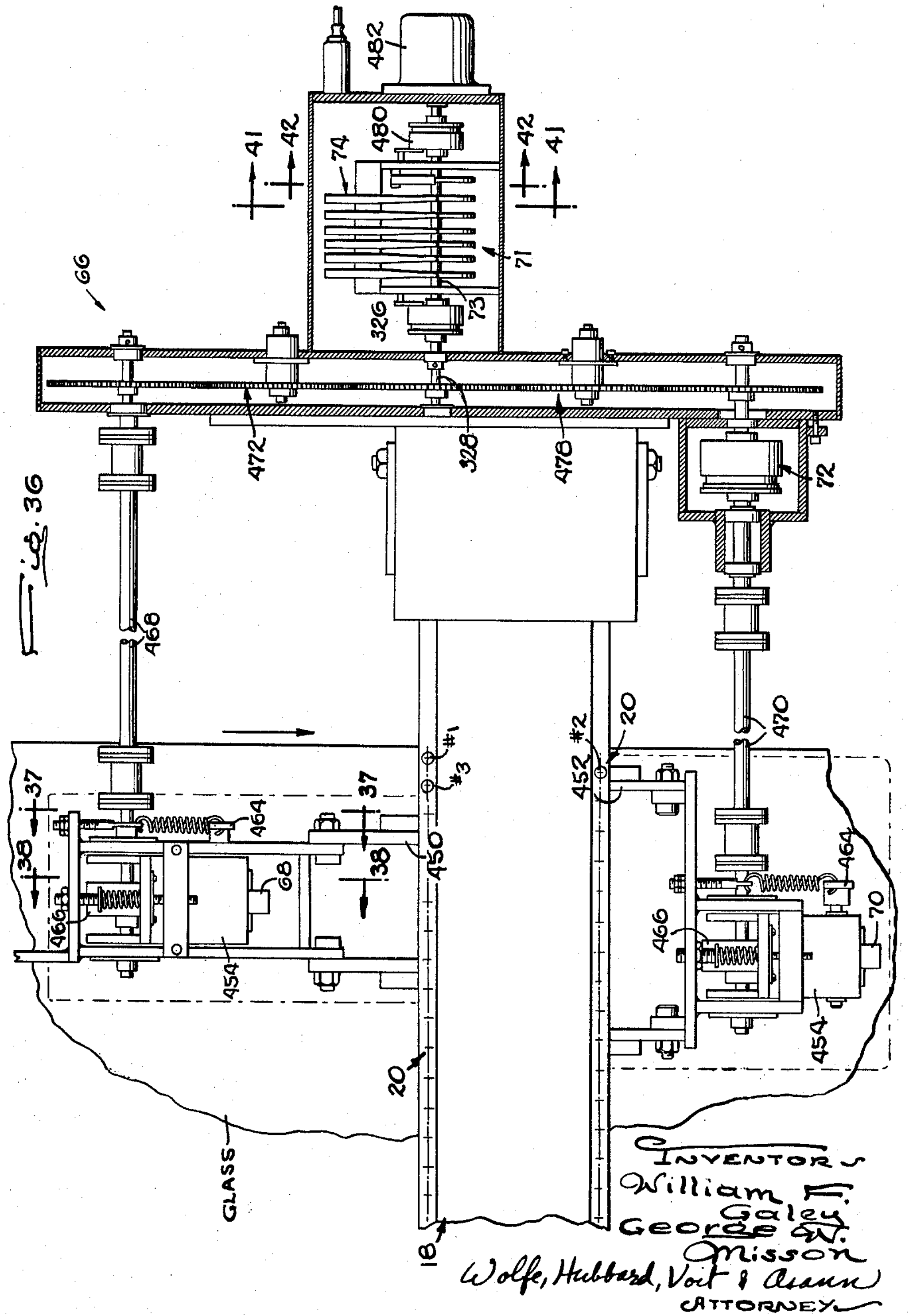
Figure 37:
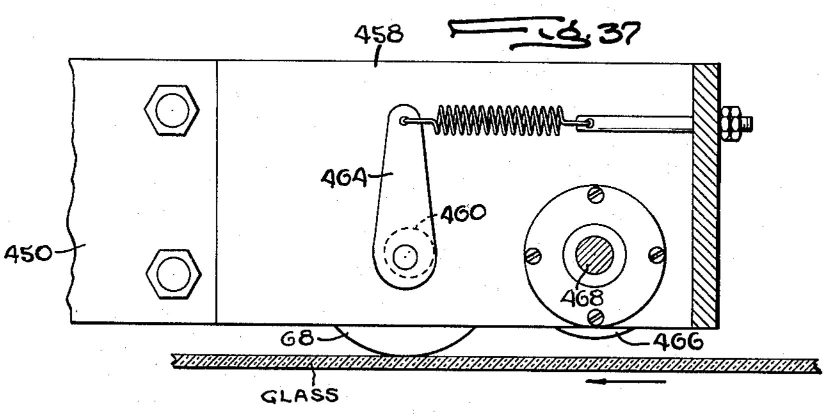
Figure 38:
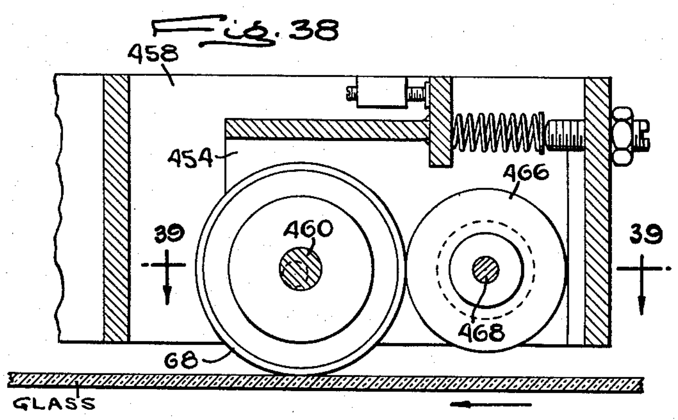
Figures 39, 40:
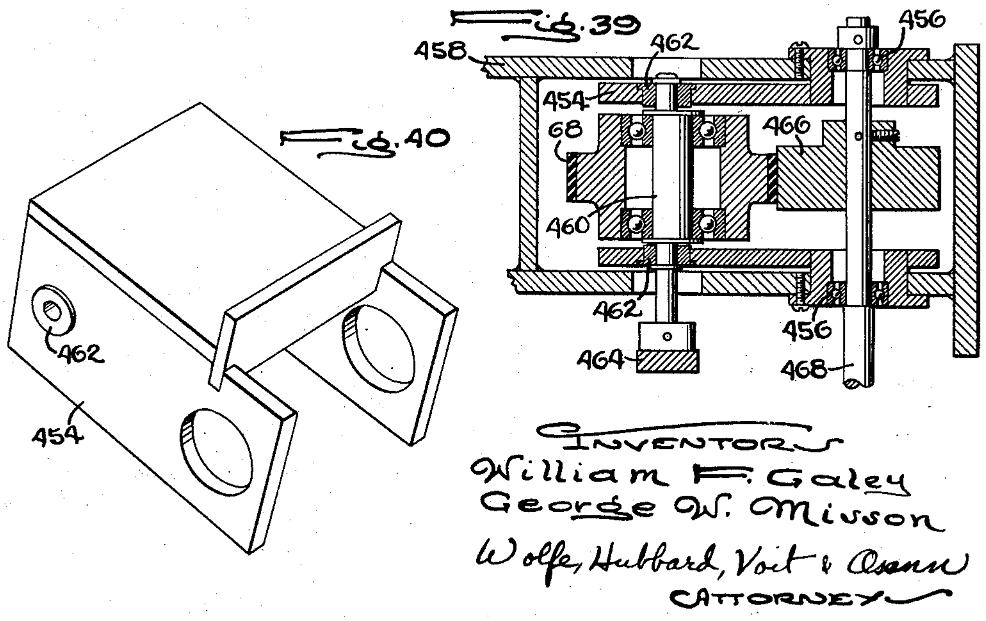
Figure 41:
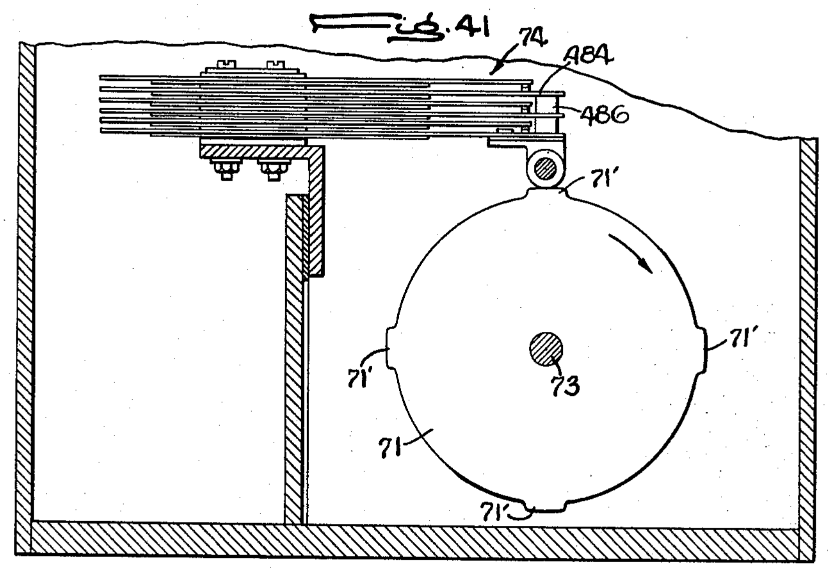
Figure 42:
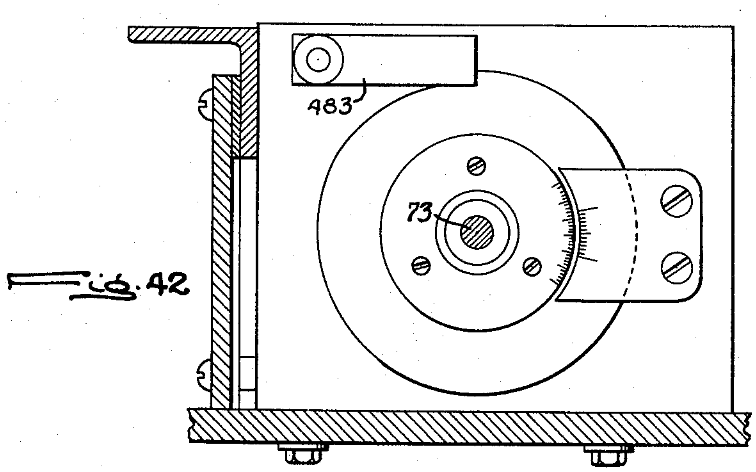
Figure 43A:
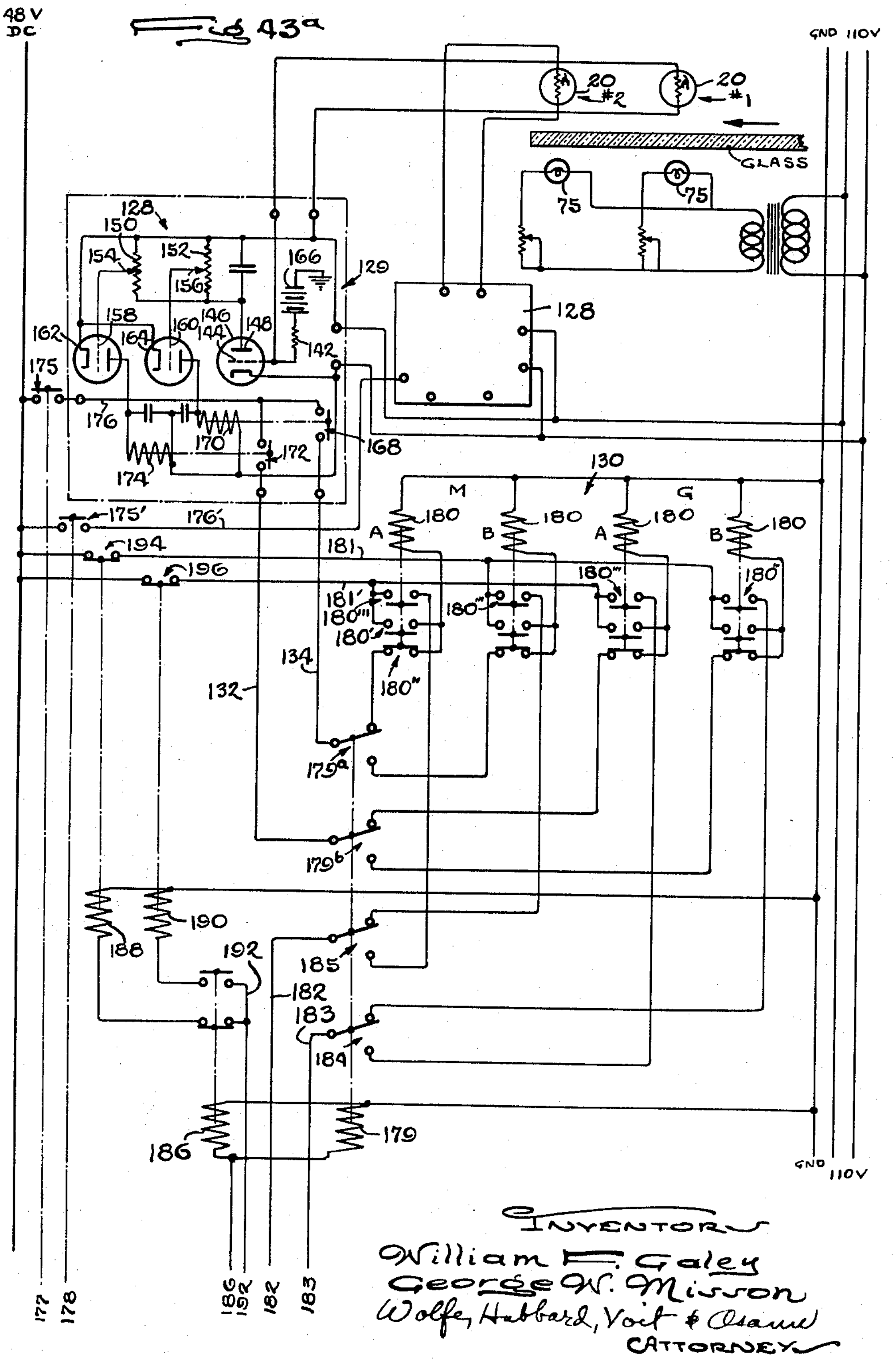
Figure 44:
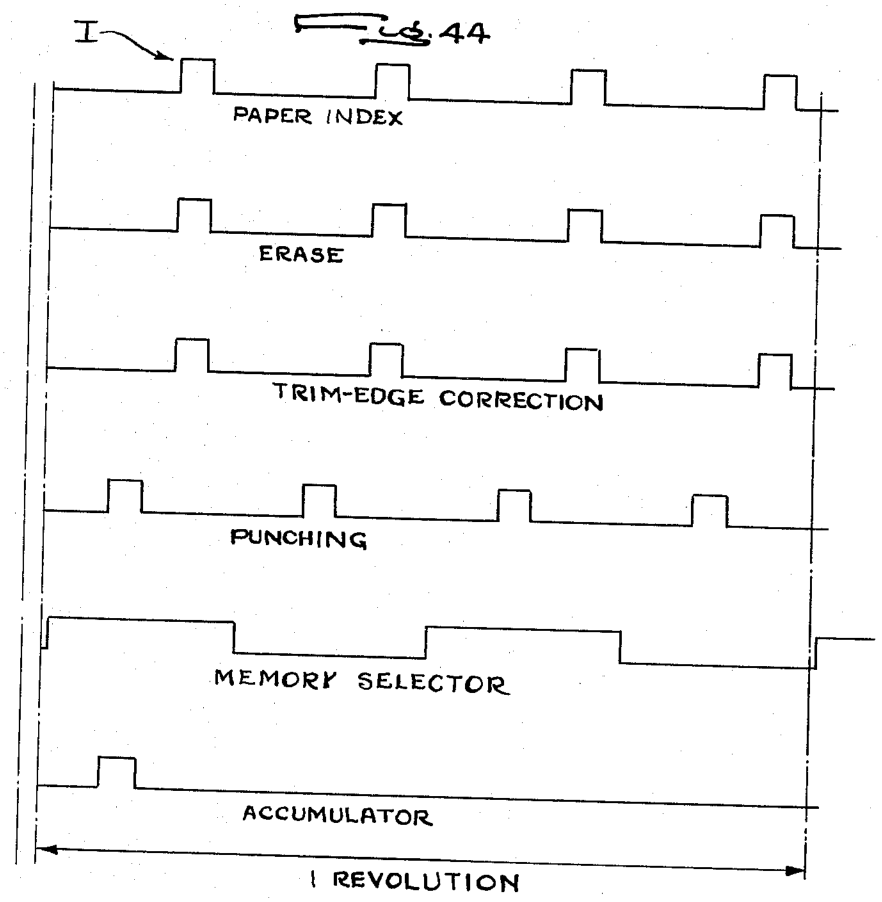
Figure 45:
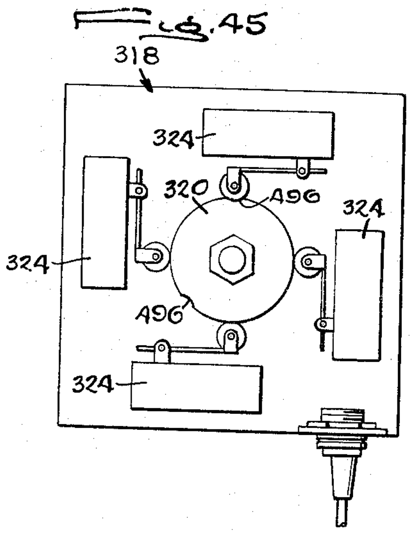
Figure 46:
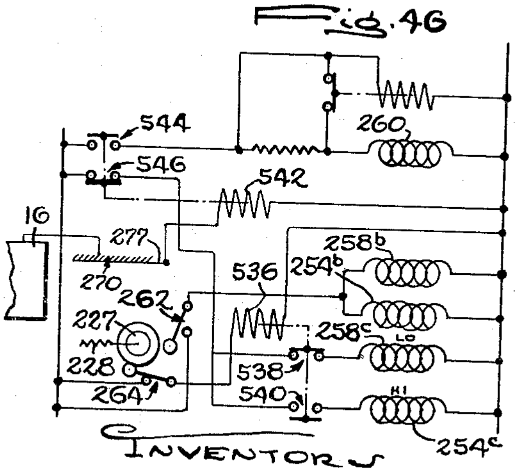
Figures 47, 48, 49:
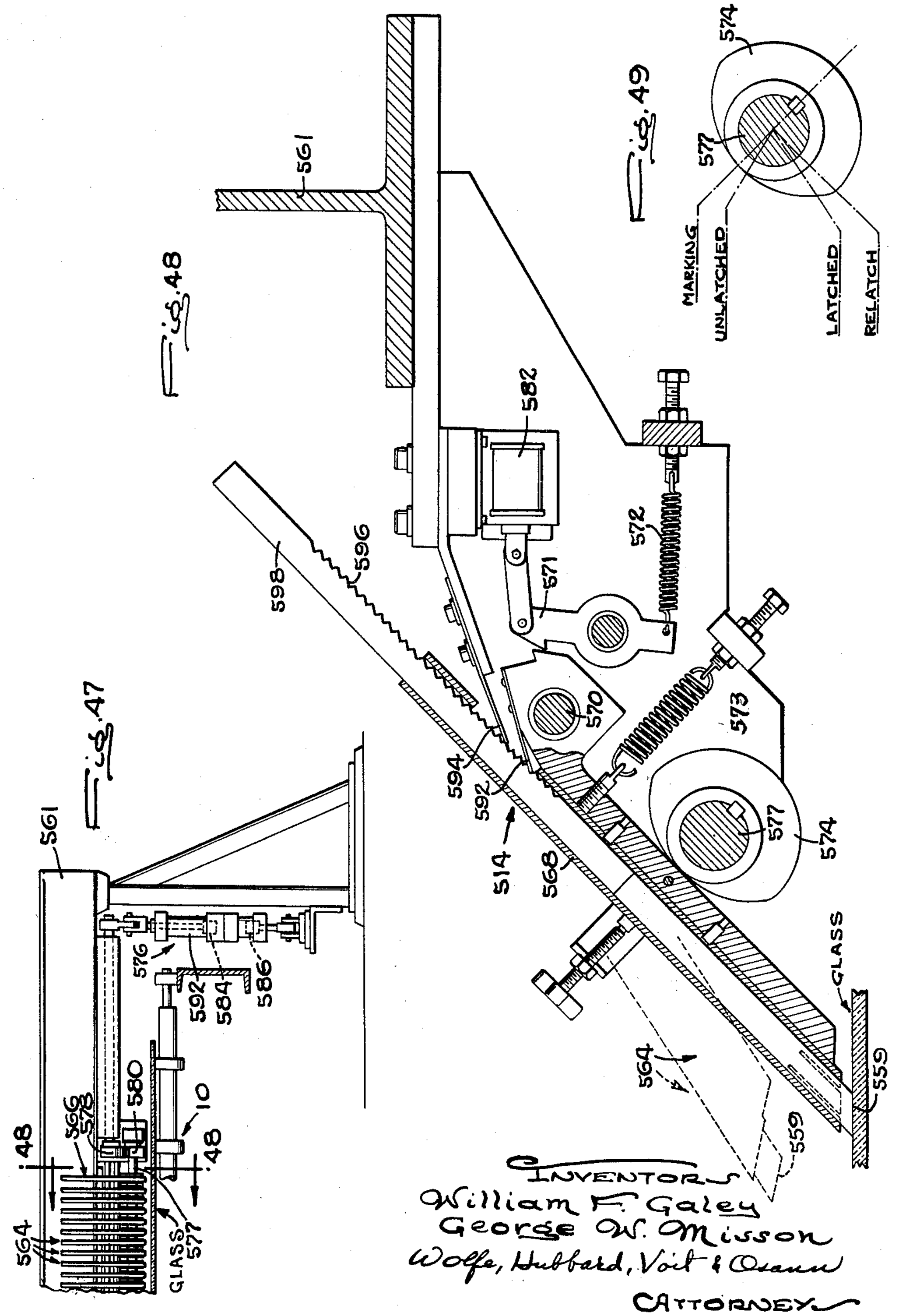

FIG. 2*a* is a table listing the defect pattern;

FIG. 2*b* is a table listing the program of sizes to be cut;

FIG. 2*c* graphically portrays the S fits for the three Z trials;

FIG. 2*d* is a table depicting the two cut logic;

FIG. 3 is a fragmentary plan view showing the bridge;

FIG. 4 is a sectional view taken substantially in the plane of lines 4—4 of FIG. 3;

FIG. 5 is a sectional view taken substantially in the plane of lines 5—5 of FIG. 4;

FIG. 6 is a side elevational view of the clock and detecting mechanism;

FIG. 7 is a sectional view taken substantially in the plane of lines 7—7 of FIG. 3;

FIG. 8 is an enlarged detail view of the edge sensing unit;

FIG. 9 is a longitudinal sectional view through the bridge taken substantially in the plane of lines 9—9 of FIG. 3;

FIG. 10 is a circuit diagram for the glass tracking means;

FIGS. 11*a*, *b* and *c*, when joined along the indicated junction lines, together diagrammatically illustrate the system for supplying defect information to, and operating the defect storage apparatus;

FIG. 12 is a side elevational view of the defect storage apparatus;

FIG. 13 is a perspective view illustrating the movement of the paper tape through the defect storage apparatus;

FIG. 14 is a diagrammatic view illustrating the path of the paper tape;

FIG. 15 is a front elevational view of the defect storage apparatus;

FIG. 16 is a sectional view taken substantially in the plane of lines 16—16 of FIG. 12;

FIG. 16*a* illustrates a fragment of glass sheet showing the defect-marks;

FIG. 17 is a sectional view taken substantially in the plane of lines 17—17 of FIG. 15;

FIG. 18 is a fragmentary front elevational view with parts broken away illustrating the drive for releasing the paper tape for movement through the punch section of the defect storage apparatus;

FIG. 19 is a plan view of the auxiliary drive for drawing the tape through the read-out section of the defect storage apparatus;

FIG. 20 is a sectional view in side elevation taken substantially in the plane of lines 20—20 of FIG. 21, illustrating the leading edge finger sensing arrangement;

FIG. 20*a* is a diagrammatic view showing the designs of the read-out and leading edge fingers;

FIG. 21 is a sectional view taken substantially in the plane of lines 21—21 of FIG. 12;

FIG. 22 is an enlarged fragmentary sectional view taken similar to FIG. 20;

FIG. 23 is an enlarged fragmentary sectional view taken substantially in the plane of lines 23—23 of FIG. 20;

FIG. 24 is a sectional view taken substantially in the plane of lines 24—24 of FIG. 15;

FIG. 25 is a fragmentary view of the drive for the paper tape rewind;

FIG. 26 is an enlarged detail view showing the dancer roll limit switches;

FIG. 27 is an enlarged side elevational view of the punch apparatus with parts broken away;

FIG. 28 is a sectional view with parts broken away taken substantially in the plane of lines 28—28 of FIG. 27;

FIG. 29 is a sectional view taken substantially in the plane of lines 29—29 of FIG. 12;

FIG. 30 is a sectional view taken substantially in the plane of lines 30—30 of FIG. 29, showing certain rockers in and the power bar retracted;

FIG. 31 is a sectional view taken similarly to FIG. 30 with certain rockers in and the power bar advanced;

FIG. 32 is a sectional view taken substantially in the plane of lines 32—32 of FIG. 34;

FIG. 33 is a fragmentary face view with parts broken away illustrating the read-out head and a portion of the tape;

FIG. 34 is a sectional view taken substantially in the plane of lines 34—34 of FIG. 15;

FIG. 35 is a diagrammatic view of the read-out head;

FIG. 36 is a sectional view with parts broken away taken substantially in the plane of lines 36—36 of FIG. 6, showing the glass clock and drive;

FIG. 37 is a sectional view taken substantially in the plane of lines 37—37 of FIG. 36;

FIG. 38 is a sectional view taken substantially in the plane of lines 38—38 of FIG. 36;

FIG. 39 is a sectional view taken substantially in the plane of lines 39—39 of FIG. 38;

FIG. 40 is a perspective showing the glass clock drive roller mounting;

FIG. 41 is a sectional view taken substantially in the plane of lines 41—41 of FIG. 36, showing the glass clock cams;

FIG. 42 is a sectional view taken subtantially in the plane of lines 42—42 of FIG. 36, showing the glass clock reset cam;

FIG. 43*a*, *b* and *c*, when joined along the indicated junction lines, illustrate the wiring diagram for the system diagrammatically shown in FIG. 1;

FIG. 44 is a timing diagram;

FIG. 45 is a view illustrating the conveyor clock;

FIG. 46 is a diagram of the leading edge finger control circuit;

FIG. 47 is a fragmentary plan view of the S marker apparatus;

FIG. 48 is an enlarged sectional view taken substantially in the plane of lines 48—48 of FIG. 47; and FIG. 49 is a diagram giving the cam positions.

While the invention is susceptible of various modifications and alternative constructions, an illustrative form of the invention has been shown in the drawings and will be described in considerable detail. It should be understood, however, that there is no intention to limit the invention to the form disclosed, on the contrary, the invention is to cover all modifications, alternative constructions and equivalents falling within the spirit and scope of the invention as expressed in the appended claims.

GENERAL APPARATUS ORGANIZATION

Upon more specific reference to the drawings, it will be seen that the invention is applied to apparatus employed in the manufacture of plate glass in the form of sheets or a ribbon. In general, the industrial apparatus illustrated provides means for partitioning the glass into saleable sizes, excluding the defect containing portions. To this end, as illustrated more particularly in FIGURE 1, with comprises an overall schematic representation of the apparatus, the glass is conveyed from a source (from right to left in FIGURE 1) by means of a roller conveyor 10 to a cutting apparatus for making a transverse cut across the glass sheet or ribbon width, herein called a Z cut, and a set of second cuts herein called S cuts, to slit or slice the cut off Z piece into smaller widths. For making the Z cuts, there may be employed the cutting apparatus shown in application Serial No. 785,510, filed January 19, 1959, by Charles O. Huffman, William F. Galey and George W. Misson, entitled Glass Cutting Apparatus, and now abandoned. As described more fully in said application Serial No. 785,510, and as shown diagrammatically in FIG. 1, a suitable Z cutter includes a carriage 11 adapted to receive and move longitudinally with glass sheet on the conveyor. The carriage 11 is provided with a scoring device 12 positionable lengthwise of the sheet relative to its leading edge according to the length of a desired cut (Z length) and movable by power across the sheet to score the glass, and a snapping mechanism to run the cut along the score line. The new Z length of glass is separated from the sheet for movement ahead of the remainder of the sheet along the glass conveyor; the longitudinal position of the scoring device 12 relative to the leading edge of the sheet on the conveyor, and thus the length of the cut-off Z length of glass, is determined by a signal supplied through the connection 13 to means for determining the desired Z length. Marks indicating the S locations for the S cuts may be made on the individual Z lengths of glass after cut by the Z cutter by marking apparatus such as that shown diagrammatically in FIGURE 1 and including devices for applying marks to the glass. The S cuts may be made by cutting apparatus shown in application Serial No. 769,223, filed October 23, 1958, by Charles O. Huffman, William F. Galey, and George W. Misson, entitled Glass Cutting Apparatus, Patent No. 3,146,926, arranged in any desired manner downstream of the marking apparatus. For example, side lines or conveyors may be employed for carrying different Z lengths to separate S cutting apparatus, thereby speeding up the cutting operation to maintain pace with the glass manufacture.

In order to provide the requisite information as to defects appearing in the glass, which information is used in determining the manner of partitioning the glass, the glass is first manually inspected for the presence of defects, and those of such severity as to affect its quality are dimensionally located, as shown in FIG. 2, by colored crayon marks (FIG. 16*a*) placed on the surface of the sheet or ribbon. The Z and S cuts are made according to cutting determinations evolved by computation to partition the glass into smaller defect-free rectangular pieces excluding the defect containing areas. While the expression "defect-free" is used herein, it is recognized that no portion of the glass is fully defect-free, and by this expression is meant free from defects of such severity as would lower the quality of those areas of the glass as might contain them to below a certain specified (glazing or mirror) grade. Necessarily, therefore, "defect-free" also requires the standard being applied, that is, free from "mirror" or "glazing" defects.

In the present industrial apparatus, computations are made automatically by a computer 16 supplied with defect location information. A computer having means particularly suited to making the requisite computations is shown in the copending application, Serial No. 850,360, filed November 2, 1959, by William F. Galey, Joseph A. Gulotta and Forrest K. Unbel, entitled Length and Area Partitioning Methods and Apparatus. The computer 16 is supplied with defect location information, and at a speed such that the glass may be cut according to the cutting determinations made by the computer in pace with its continuous production and movement along the conveyor to the glass cutting apparatus. The cutting determinations are made following a logic involving fitting or piecing out different combinations of various programmed sizes from the usable, defect-free areas of the large glass sheets or ribbon. The computer may be installed at any convenient location near to or remote from the production line and is supplied with defect information, and transmits commands to the glass cutting apparatus designated Z cutter and S cutter in FIG. 1, through suitable electrical connections.

In order to make the computations by means of which the cutting determinations are evolved, the computer is supplied upon its command with information as to the defects in the glass. Mounted over the conveyor on a bridge 18 located spaced from the glass cutting apparatus is a photosensitive defect detection apparatus which examines the glass for the presence of defect-marks as it moves along the conveyor past the bridge and provides dimensional information as to the location of the defects. This information is supplied to a defect storage apparatus 24 which may be located either at the computer installation, or elsewhere, and is provided to produce a secondary record to store the defect location information so that it is available to the computer when required. This secondary record of the defects location is made in pace with the movement of the glass along the conveyor and, in the present case, comprises a paper tape prepared as an analogue of the defect bearing glass sheets or ribbon. This secondary record provides the defect location information in a form that is readily usable, namely, in the form of a hole punched in the tape at a dimensional location which corresponds to the dimensional location of the defect with respect to the leading edge and the side edge of the glass sheet or ribbon.

The defect storage apparatus 24 provides means for supplying information as to severity level as well as presence, to the computer 16. With such information, the program in the computer may include pre-established grades of glass as well as sizes. As shown schematically in FIGURE 1, the defect storage apparatus 24 includes separate defect storage units 26, 28, 30, one being adapted to record "mirror" defect information, and one being adapted to record "glazing" or "total" defect information. There happens to be three completely separate paper tape units in the apparatus depicted so as to provide a spare unit and permit one of the main units to be stopped.

Each defect storage unit includes, as illustrated more particularly in FIGS. 12–15, separate punch and read-out sections. The storage units may be arranged in any convenient manner, but (taking the unit 26 as an example) are mounted vertically in a cabinet, and each comprises a vertical frame having means at the lower end for support of a supply roll 32 of paper tape, which unwinds to supply the tape 34 which is fed upwardly to a rewind roll 36 at the top of the unit frame 37. The path of the paper is illustrated in FIGS. 13 and 14 and proceeds from the supply roll upwardly through the punch section 38 and the read-out section 40, at a rate determined by the speed of movement of the glass on the conveyor.

The paper is drawn through the read-out head 42 of the read-out section by a paper drive which comprises sprockets 44 engageable in holes in the edges of the paper tape driven by a forward motor 46 by means of a transmission mounted on the frame. The transmission is controlled from the computer 16 so that a defect information containing portion of the paper tape is moved into the read-out head and stopped for read-out purposes and then advanced following the read-out operation.

The paper tape is released from the supply roll 32 by a paper indexing means which includes sprockets 48 engageable in the holes of the paper tape driven by a drive motor 50 coupled to a one-revolution clutch 52 which connects the motor to the sprocket 48 to operate it intermittently and thereby feed the paper at a timed rate into the punch section 38 of the apparatus. The motor 50, clutch 52, and sprocket 48 are all suitably mounted on the frame adjacent the supply roll 32. This one-revolution clutch 52 is adapted for operation in accordance with the speed of the glass on the conveyor 10, so that movement of the paper tape through the punch section, while intermittent, is at the average speed to scale of the movement of the glass.

The punch holes are formed in the paper tape 34 by a punch mechanism in the punch section which includes two rows of punches 54 (FIGS. 30, 31) each punch being selectively operable to be driven through the tape 34 by means of a motor driven, intermittently operated, power bar 56. A one-revolution clutch 52 (FIGS. 27, 28) connected to operate the power bar 56 is controlled so as to be synchronized with the paper movement and operates the punches during the period the paper is stopped in its intermittent feed through the punch section.

The read-out section 40 includes a read-out head 62 (FIG. 32) which has electrically energized fingers 64 that may be pivoted into contact with the paper tape when the latter is stopped in the section. Bus bars 65 in the base plate under the paper tape which extend in the direction of paper movement, are contacted by and thus energized by a finger extending through any defect hole to indicate the S location of that defect hole. Selected Z lengths of the tape stopped in the read-out head 62 may be read-out by pivoting banks of the fingers 64 into tape contact upon command of the computer, for supplying defect information as to the corresponding Z lengths of the glass sheet or ribbon of which the selected length of tape comprises a record. This S location of any defect hole in the portion of a tape read-out is the defect information supplied to the computer 16 through suitable connections.

All of the components of the defect storage apparatus 24 are operated in timed relation either directly or indirectly with the movement of the glass on the conveyor 10, for example, the paper indexing sprocket 48 is operated intermittently to feed the paper tape through the punch section 38, while operation of the punch mechanism is synchronized with the paper movement. For the control of these and other components of the apparatus, referring to FIGS. 1, 6 and 7, a glass clock 66 is provided which, as illustrated particularly in FIGS. 36–42, is driven by means including an upstream roller 68 (FIG. 7) carried in contact with the surface of the glass and a downstream roller 70 (FIGS. 6, 7) also carried for contact with the surface of the glass. The glass clock includes a set of cams 71 (FIG. 43*b*) which are driven according to the speed of the glass by either the upstream or downstream drive roller. An auxiliary clutch 72 is interposed in the drive between the downstream roller 70 and the cam shaft 73 so as to provide means for disconnecting the downstream roller 70 from drive relation until the trailing edge of the sheet is past the upstream roller 68. Switches designated generally 74 (FIG. 43*b*) are associated with each cam to produce timed electrical pulses as shown in the timing diagram FIG. 44. These pulses are used to time the operation of the different components of the apparatus.

In order to start and stop the operation of all the components of the defect storage apparatus 24, as a glass sheet passes to and beyond the location of the defect detection apparatus on the bridge 18, a set of switches is mounted on the bridge in position to be physically activated by the glass sheet or ribbon. These switches are referred to herein as glass present switches, and their locations appear in FIG. 7 under the designations S*w* #1 to S*w* #8.

*Partitioning.—A method*

Turning now to a more detailed consideration of partitioning a sheet or ribbon of glass into smaller sizes, this method involves what may be termed a two-cut logic.

Primarily, in cutting plate glass as a sheet material, it should be noted that three basic cutting requirements are respected.

First, the sheet or continuous ribbon is to be partitioned into rectangles of prescheduled or programmed dimensions, and grades, as distinguished from an operation in which the defective area is merely cut out of the sheet or in which the largest available defect-free piece of sheet material is always cut. The scheduled sizes are typically very much larger than the rectangular defect-bearing remainders which must be discarded.

Second, each cut must extend in a straight line completely across a dimension of the glass piece involved. This cutting requirement is inherent in the nature of glass since the cutting process is one in which the glass is scored and snapped. The same condition is significant for other sheet materials to the extent that the time and apparatus expense associated with cuts of partial lengths or cuts which turn corners are unduly high.

Third, the piecing or partitioning must be selective so that the scrap is of minimum area consistant with the choice of sizes into which the glass can be partitioned and even respective quantity requirements.

The glass sheet, as described in connection with the industrial apparatus embodiment of which a general description has been given, may, for example, be quarter-inch plate produced as sheets or as a continuous ribbon oven 10 feet wide at a rate in the vicinity of 200 lineal inches per minute. The Z cut, made by the Z cutter (FIG. 1) is the first cut of each operation, and the set of S cuts, the locations for which are applied to the Z lengths by the S marker, follow to slit or slice the cut off Z pieces into smaller widths and eliminate the defects. This is the two-cut logic; the manner in which it is advantageously and uniquely applied follows.

The defect containing sheet or ribbon of glass constitutes a primary record of the defects contained in it. According to this invention, however, in order to make the defect information available upon command for computation purposes, a secondary record is made of the defects in the glass. With defect information supplied upon command from the secondary record, and pre-established desired grades and sizes, the usable areas are pieced out by following the two-cut logic and excluding the defect containing portions of the glass.

Manual, visual inspection of the glass sheet or ribbon locates the defects which are present. The location of the defects is, as previously indicated, by a crayon mark, for example, as shown in FIG. 16*a*, which is placed on the glass by the inspector. For the purpose of usefully relating the defect locations to given desired sizes of the glass, a basic dimensional unit is established for which all the length and width requirements are integral multiples With a ribbon or sheet 124 inches wide, as shown in FIG. 2, a unit of 2 inches has been chosen, giving the glass an effective width dimension of sixty-two units (S dimension). The glass is measured in units back from the leading edge along the length or Z dimension, and the width or S dimensions are measured from one of the side edges. The glass thus is measured, and the defects located, by means of a mosaic of 2 inch squares on the glass. To assist the inspector in placing the marks on the glass, thereby insuring that each mark is made within the boundaries of the square of the mosaic to indicate the presence of a defect in that square, the glass is viewed during inspection against a grid of lines extending parallel to the direction of movement of the glass. The crayon mark is then made so that it extends in a transverse direction across the imaginary longitudinal center line of the mosaic in which the defect lies. The form of the mark actually applied is shown in FIG. 16*a*. By using the grid, the S coordinate of the defect is thus precisely established while the Z coordinate is automatically determined by the position of the defect from the leading edge of the glass.

In the foregoing manner, the information as to defect location is stored directly on the glass which thus comprises a primary record. The secondary record of the defect location information also contains the dimensional location of each defect square with respect to the leading edge and the side edge, and thus comprises an analogue of the defect marked glass. As previously indicated, the present method contemplates partitioning of the glass sheet or glass ribbon into desired sizes which are graded as to quality. In order to accomplish this, separate secondary records in the form of separate paper tapes are prepared in the defect storage apparatus 24 so as to provide separate sources of glazing and mirror defect location information. In the manual inspection of the glass sheets or ribbon for defects, the location of the defect as well as its severity is marked on the glass. This is done by using different color crayon marks to indicate the difference in severity. Thus "glazing" or "total" defects, which are of a severity that would lower the grading quality of an area containing them so that it would be judged below glazing grade, or cullet, are marked on the glass using a black crayon. On the other hand, defects which would be acceptable in glazing grade glass pieces, but not in mirror grade pieces, are marked in red on the glass by the inspector.

Therefore, one of the separate secondary records is prepared to contain information giving the location of total defects, while the other secondary record is prepared to contain mirror defect location information. This is represented schematically in FIGURE 1 which shows three separate units 26, 28, 30 in the defect storage apparatus 24, one for "total" defect information, one for "mirror" defect information, and a third spare tape which in the present system may be used to record either mirror or total defects so as to permit repair or maintenance of one of the main storage units.

The information as to defect location is recorded on the continuously moving paper tape by punching holes in the tape which are dimensionally located with respect to imaginary crosslines corresponding to the glass sheet leading edge, and lateral longitudinal lines adjacent the margins of the tape, corresponding to the glass side edges. In effect the mosaic of 2" squares on the glass is transposed to the taper tape, shrinking in the process so as to permit the use of a narrow tape such that a defect in a 2" mosaic square on the glass is represented by a rectangular defect punch hole ⅛" long by $\frac{3}{32}$" wide on the tape. Furthermore, the glass width is divided on the tape into three bands of mosaics so as to leave a pair of longitudinal hole-free reinforcing strips on the tape as well as marginal strips.

In this manner, the information as to location and severity of defects on an entire sheet of glass, or a predetermined length of ribbon glass, may be made available in a readily usable form to the computer. While the secondary record is made in pace with the movement of the glass on the conveyor, the computer may receive the accumulated information as to given lengths of the glass to permit the systematic fitting of all programmed widths and lengths into the available defect-free areas, in carrying out the two-cut logic followed in this partitioning method.

The actuation of the punch mechanism of the defect storage apparatus 24 is controlled in accordance with defect caused signals received through information supply channels from the photosensitive apparatus.

The punch mechanism of each defect storage unit, as shown in FIGS. 30–32, includes sixty-two selectively operated punches 54 mounted in two transverse rows of thirty-one punches each. This provides one punch for each longitudinal mosaic strip. The photosensitive defect detection assembly as shown in FIG. 3 includes sixty-two photosensitive elements, one corresponding to each punch, in a like manner mounted in two rows of thirty-one elements each on a bridge 18 extending across the conveyor 10 so as to be carried over the glass moving along the conveyor. Each photosensitive element 20 is positioned to view a strip of glass one imaginary mosaic in width and in this manner is responsive to a defect appearing only in the strip at a given S coordinate; that is, at a given lateral dimension from one side edge. A signal variation from the photosensitive element, produced by a defect mark, is used to control the corresponding punch 54 causing it to operate and produce a hole in the corresponding mosaic in the paper tape 34, recording the defect.

Returning now to FIGURE 1, the information required to make the computations for partitioning the glass is the location of the leading edge of the glass, the location of the defects, the severity of the defects, that is, "mirror" or "glazing," and the program of sizes to be cut.

With this defect information available on the mirror and glazing defect paper tapes in the defect storage apparatus 24 the different tapes can be read-out into the computer 16 to supply data as to defect severity as well as presence. The computer 16 receives the data and by size programming pieces out the required sizes from the defect-free areas of the glass.

Size programming here is the quantitative demand description covering both the absolute sizes and the relative demand for them. As to the sizes themselves, the lengths and widths of the various rectangles to be cut are arranged to group the respective width dimensions sharing a common length dimension (FIG. 2*b*). All of the length dimensions are thus grouped, each associated with one or more width dimensions. The relative demand for the different length by width sizes is preferably presented in a two-part analysis. Thus, a numerical value is established for each size so that values of groups of sizes can be accumulated and compared. Further, a rank or order of priority is established for the respective width dimensions associated with each length dimension.

In accordance with the two-cut logic, the trials for the first cut (FIGS. 2*c*, 2*d*) correspond to the different programmed lengths as measured from the leading edge of the glass. Thus for each programmed length a trial length of the glass sheet (or ribbon) is considered for which either all or part of the total width are available for partitioning as defect-free spans between defects, depending upon the number and locations of the defects. Each defect will be contained in a defect strip having a dimension of the programmed length being considered.

Next the programmed widths for that particular programmed length are fitted into the available widths according to an assigned rank. The waste, which includes unfitted portions of the defect-free widths as well as the defect strips themselves, is minimized by choosing the number and variety of programmed widths that best partition the available defect-free widths. For each programmed length and corresponding widths thus tried, the values of the programmed sizes utilized are accumulated as the value per cross cut.

The steps of fitting the programmed widths into available defect-free widths and subsequent value accumulations, is repeated for each programmed length before any cutting decision is made. In effect, a number of trial first cuts across the width of the glass are made and by this logical process the cut for which the best fit is provided, i.e., that for which the value of the fitted programmed sizes is highest, is chosen. After the chosen cut determination has been made, commands for cutting that programmed length and subsequently cutting the fitted widths of that programmed chosen length are issued. A large number of programmed lengths or trial cross cuts may thus be considered and whether the first chosen cut is the smallest or the largest or an intermediate one of the programmed lengths depends upon the particular defects and cutting program. It will be recognized, of course, that as larger dimensioned cross cuts (i.e., programmed lengths) are considered, larger numbers of defects are probable. The values of larger sizes, however, may counterbalance the larger absolute waste per cut to in the long run provide the most efficient or least wasteful operation consistent with meeting the production requirements.

After a cutting determination has been made, starting from the edge of the cut which, in effect, is a new leading edge, the steps are repeated. Thus each programmed length is again considered but with respect to the new leading edge. Where the glass production consists of sheets, to avoid leftover lengths, a Z is always chosen which is part of an exact fit of the various programmed Z dimensions in the total remaining length of the sheet. On the other hand, where the glass is produced in the form of a ribbon, all the programmed sizes are considered with respect to each new leading edge. The defect locations with respect to the leading edge are changed, of course, and the available widths are re-determined. After again fitting the programmed widths into the available widths for each programmed length and accumulating the value of the sizes which would be cut, the next programmed length representing the best value is selected as the second cross cut in the repeated procedure. The widths for that second cut are cut or slitted and the fitting procedure is initiated again with respect to the newly created leading edge. The process continues a decision at a time, for the lengths of the individual sheets, or endlessly for the ribbon.

*Example of the method*

A defect-spotted section of a sheet or ribbon of glass is shown in FIG. 2. The defect areas are intended to be random since in actual production their number and location cannot be predicted. The defects are marked on the glass with reference to the locating edges, or reference lines existing as physical edges, in the manner shown in FIG. 16*a*.

While only a short section of glass is shown in FIG. 2 it will be understood that the process of preparing the secondary record continues until defect information on the entire sheet is recorded, or, in the case of ribbon glass, in never ending fashion save if a break occurs in the ribbon.

The table of FIG. 2*b* illustrates a simplified program of sizes to be cut in which eight sizes are listed which may be reduced to three different length or Z dimensions, each having a group of two or three width or S dimensions (35, 20, 9), associated with them. For simplicity, program of sizes for only one grade of glass are listed, although it will be understood that another series of sizes may be programmed for a different glass grade. In the present example, therefore, only one tape in the storage apparatus 24 would be required to supply information as to defect location while in actual practice the program of sizes would usually include some for both mirror and glazing grade and the appropriate tape interrogated for the requisite defect location information upon command by the computer. Considering now the example shown, for any given Z cut along the length of the glass sheet there may be a choice of S cuts. In the table of FIG. 2*b*, the larger of each S in a family of S dimensions for a particular Z ranks over each smaller S. Furthermore, each Z x S size is assigned a value which, in this particular case, corresponds to its S dimension of that size. This means, for the example indicated, that different areas having the same S dimension are of equal value, but this is not necessarily anomalous as will be seen.

The computer, therefore, is supplied with defect information upon command, from the paper tapes, and with the pre-established sizes the usable areas are pieced out by the two-cut logic (as shown in the table of FIG. 2*d*). Accordingly, each of the Z dimensions (35, 20 and 9) is made the basis of a trial or tentative first cut as measured from the leading edge of the glass. Then, as measured from the reference side edge of the glass, each defect is marked off as a strip one unit wide leaving particular available defect-free widths.

In fitting the S dimensions into an available width, the minimum waste partition is resolved by employing the highest ranked S's wherever a choice occurs. If there is no exact partition, the available width is decreased by one, and the fit again tried. This process is repeated until a perfect partition is gained or the defect-free width is exhausted. FIG. 2*c* graphically portrays the S fits for the three Z trials tabulated in FIG. 2*d*. The cross-hatched area represents the defect strip; the single-hatch areas represent the glass discarded as cullet with the defect strip if the Z cut is elected, due to the impossibility of making an initial fit. Sufficiently large waste pieces may be saved, if desired, piecing out special or unprogrammed sizes.

By totalling the assigned values of the utilized sizes for each trial Z, the Z choice is dictated by the highest accumulation. In this case the Z of 20 is chosen since the value is 58—only two unit defect strips plus two additional unit strips of unfittable waste glass are involved.

In the event of a tie in summed values, the tie is systematically broken by initially electing to pick the first (or the last) of tying values encountered and choosing the order of the Z trials accordingly. For this example, while no tie was present, the Z trials were made in the order of decreasing Z length and had a tie of largest value occurred it would have been broken in favor of the first totaled value, i.e., the largest Z.

With the choices of rank in making S fits, of value in choosing a Z after trial fitting, and of order of Z trials for breaking ties, practically any programming demand can be anticipated without requiring human judgment after the program has been set up. It will be appreciated, with the example illustrated, a minimum area waste per Z unit length logic is dictated by making value proportional to S. If value were proportional to Z x S in dimensional units, then the Z of 35 would be chosen in this example, despite the larger amount of waste. If in the S fitting the rank were not in the order of the S dimension, ties of partitioning in the S dimension would be broken in favor of the smaller S's and they would, of course, be cut. In the long run (i.e., a day's, a week's, a year's production), the waste is by definition minimal since the programmed sizes have been cut in the programmed order to meet the demand thus analyzed.

To avoid leftover lengths, a Z is always chosen which is part of an exact fit of the various Z dimensions in the total length. If the highest value Z is not available, the next highest is chosen, and so on. In this instance, any of 9, 20 or 35 may be chosen as the first cut without defeating the lengthwise fit. Choice of a Z of 20 in the first cut leaves 70 units, into which two Z lengths of 35 may fit. However, a Z of 20 (or 9) would be eliminated from consideration for the second cut. Usually, by filling in the program with a large number of Z's, a greater number of lengthwise choices remain open. The number of trial Z's which are subject to the S trial partitions and valuation are, of course, increased, but the burden of added decisions is lightened by their still systematic resolution.

PHOTOSENSITIVE DEFECT DETECTION APPARATUS

Referring to the details of the photosensitive defect detection apparatus shown in FIGS. 3, 4 and 7, the apparatus provides a means of examining the glass for the defect-marks on the surface, and, in the present case, is mounted on a bridge 18 which spans the conveyor 10. The photosensitive elements 20 are arranged to respond when a defect mark passes and are connected to actuate the punch mechanism of the defect storage apparatus such that it punches a hole in each unit square on the tape corresponding to a defect containing unit square on the glass. The unit square which is punched on the tape is located by coordinates the same as the defect containing unit square of the glass.

A preferred arrangement for the photosensitive elements includes a total of 62 elements mounted on the bridge so as to be directed downwardly facing the glass on the conveyor, and, in the present instance, arranged in two staggered rows (one row each side of the bridge) containing 31 elements each so that a single element is mounted over each of the 62 mosaic elements in the full width of the glass. In this case, the first or upstream row includes the elements 20 for the odd numbered mosaic elements, while the downstream (second) row includes the elements 20 for the even numbered mosaic elements. As indicated in FIGS. 11 and 43*a*, the photosensitive element 20 may be of the variable resistance type comprising material such as lead sulphide, or the element may be a photosensitive semi-conductive diode. As shown herein, the element is of the type having relatively low conductivity which increases as a function of the increase in the amount of light received. Each photosensitive element is connected to supply a response signal which varies responsive to a defect mark passing the element, which signal, through a channel (FIG. 11*a*), is used to control the actuation of the corresponding punch 54 of the punch mechanism.

As shown in FIGS. 7 and 43*a*, light is directed toward each photosensitive element 20 by individual lamps 75 mounted below the conveyor 10, the light received by each photosensitive element 20 thus being intercepted by the glass sheets or ribbon passing the element locations. The field of each photosensitive element 20 is restricted as by a mask (not shown) over its face, so that the element examines only a point area on the glass, and the element is aligned with the imaginary center line of the mosaic element over which it happens to be located so that as the glass moves, the point area of the glass viewed by the photosensitive element travels along this mosaic element center line.

In the present case, the bridge is in the form of lower and upper sections 76, 77, the upper section including a rigid channel beam 78 (FIG. 5). The bridge is mounted for movement on fixed supports 79 on each side of the conveyor. The upper section 77 of the bridge is carried for movement vertically relative to the lower section 76. Both sections of the bridge are mounted for movement together sideways with respect to the conveyor. In this way the alignment between the upper and lower section is always preserved while permitting lateral motion of the bridge with respect to the conveyor. The upper bridge beam is raised by a pressure fluid operated piston 80 (FIG. 9) acting through a link 82 and pivotable levers 84, 86 mounted under the beam. Pressure fluid is supplied to operate the piston by suitable controls so that the upper bridge beam may be raised to allow an excessive thickness of glass to pass the bridge in the event glass sheets stack on the conveyor due to an interruption downstream in the glass flow.

The bridge 18 is slidably mounted on V-ways 88 provided on the fixed supports so as to permit controlled sideways movement to maintain alignment of the defect detection apparatus and glass notwithstanding lateral movement of the edge of the glass. In accordance with one feature hereof, the bridge 18 is automatically shifted laterally by hydraulic tracking means controlled to position the beam in an extremely precise manner according to any lateral movement of the edge of the glass, so that the photosensitive elements on the bridge are maintained in alignment with the proper mosaics notwithstanding any weaving of a glass ribbon, or variations in the positions of the edges of the glass sheets that move successively past the bridge.

*Glass tracking device*

FIGS. 3, 4, 8, 10 illustrate the tracking device used for automatically sensing the exact position of the edge of the glass on the conveyor, and providing a means for controlling the power supplied to position the beam so that it follows up the position of the glass. As shown in these figures, a pressure responsive means 90 is carried by the beam so as to straddle one edge of the moving glass sheet or ribbon. This pressure responsive means has an air nozzle 92 on one side of the glass directing a stream of highb pressure air derived from a source past the edge of the glass toward a sensing device 94 having an orifice 96 on the other side of the glass. Air pressure developed in the orifice 96 serves as an indication of the position of the edge of the glass and is used as a pilot pressure to actuate a two-way, balanced hydraulic valve 98 used to control the power piston 113 operable to position the bridge 18.

Accordingly, the tracking device orifice 96 is connected, as shown in FIG. 10, by an air line 100 to a suitable means 101 for adjusting the movable valve member 102 in accordance with the variations in pressure developed in the orifice. The valve member 102 is adapted to connect the lines 104, 106 to a pump 108 and sump 110, to the left and right cylinder chambers 112, 114 for shifting the power piston 113 which is connected by a rod 116 to the bridge. A suitable device for the adjusting means 101 is diaphragm detector North American No. H–2010–013–04. Thus, a decrease in the pilot pressure, due to the glass sheet edging to the right (in FIG. 10) and covering the orifice 96, which would require the bridge 18 to move to the right to maintain the proper alignment, causes the valve member 102 to shift to the right so as to supply pressure fluid from the pump 108 through the high pressure lines 104, 122 to the left power cylinder 112. The piston 113 is thus moved to the right to move the bridge sections 76, 77 to the right until the bridge and glass are exactly in alignment, under which condition the valve member 102 is shifted to the position shown in FIG. 10. Similarly, movement of the edge of the glass to the left (FIG. 8) results in an increase in the pressure developed in the orifice 96, via the detecting means connected to the hydraulic valve 98, shifts the valve member 102 to the left causing pressure fluid to be supplied from the pump 108 through the line 126 to the right cylinder chamber 114. The bridge sections are thereby moved to the left to follow the glass and maintain the alignment of the photosensitive defect detection assembly on the bridge.

DEFECT SEVERITY DISCRIMINATOR

Now referring to the diagrammatic illustration of FIGS. 11*a*, *b* and *c* which show the circuit for controlling the operation of the defect storage apparatus including the separate channels for transmitting information as to defect location and severity to this apparatus, each photosensitive element 20 is connected to a preferred means for discriminating between photosensitive element response signal variations caused by black total defect marks on the glass, on the one hand, and red mirror-defect marks on the glass, on the other hand.

In the present case, this discriminating means comprises a discriminator circuit 128, the wiring diagram for which is shown in FIG. 34*a*. Referring to this figure, it will be seen that the photosensitive element 20 for each discriminator circuit is connected as part of a potential dividing circuit 129 across an alternating current voltage source designated 110 v. In this manner, the 62 photosensitive elements 20 are connected to 62 discriminator circuits 128. These 62 discriminator circuits, as shown in FIG. 11*a*, in turn supply the individual ones of 62 buffer storage circuits 130 through the output connections 132, 134 of each discriminator circuit. The buffer storage circuits 130 supply signals through connections 334*a* to 334*e* to coils 140 of individual punches 54 of the punch mechanisms of the storage units. The photosensitive element circuits, discriminator circuits and buffer storage circuits constitute the channels for the supply of defect information to the punch mechanism of the defect storage apparatus. With the switches 179*a*, 179*b*, 184, 185 on positions shown in FIG. 11*a*, sets of buffer storage circuits A are read out while the other sets of buffer storage circuits B are supplied with defect information.

Accordingly, since the presence of a defect in the glass sheet or ribbon is indicated by a crayon mark on the glass surface within the boundaries of the mosaic element containing the defect, as the defect-spotted glass moves past the defect-detection apparatus on the bridge 18, each defect mark produces a momentary change in the intensity of the light received by a photosensitive element 20, and a corresponding change in its conductivity.

To distinguish between the severity of the defects in the glass in a manner that will be registered by the photosensitive elements 20, crayon marks of different color and hence effect on the elements, are applied to the glass. It is preferred to use either a red crayon mark for indicating a mirror defect, or a black mark for indicating a glazing (total) defect. It has been found that as the black mark passes the field of the photosensitive element 20, the transmission of light through the glass sheet or ribbon to the element drops to an insignificant value for the time period, depending on the speed of the glass conveyor, that the mark on the glass is interposed between the light source and the element. This produce a drop in conductivity to an insignificant value. It has been found some light is transmitted through the red mark so that a red mark produces a smaller reduction in conductivity.

Accordingly, the amplitude of the current in the potential dividing circuit 129 (FIG. 43*a*) connected to the photosensitive elements 20 varies when defect marks are present in the mosaic squares viewed by that element. The current is at a maximum under defect-free conditions when the intensity of the light received by the element is unchanging. When a black mark appears to block out the light to the phototube, the signal drops to zero. When a red mark appears, the signal drops to about ½ maximum amplitude.

A typical organization for the discriminator circuit 128 is shown in FIG. 43*a*. The junction between the elements of the potential divider 129, formed by the photosensitive element 20 and a resistor 142, is connected to the control electrode 144 of a first amplifying discharge device 146, herein shown as a triode. The latter has its anode 148 connected through parallel load resistors 150, 152, formed as potentiometers having wipers 154, 156 connected to the control electrodes 158, 160 of a second and third relay-operating amplifying discharge device, respectively, also shown as triodes. By means of a bias voltage shown as a battery 166 applied to the control electrode 144 of the first amplifying triode 146, the latter tube is rendered normally conductive while the resistance of the photosensitive element 20 is low due to the high intensity of light received through defect-free glass passing the element. A defect mark passing the photosensitive element 20 causes a decrease in its conductivity and an increase in the voltage drop across the element, thus reducing the bias on the control electrode 144 of the first tridoe 146. The arrangement is such that a black defect mark changes the bias so that the first amplifying triode 146 is cut off, while a red defect mark changes the bias to reduce the anode current of the first amplifying tube. In the preferred arrangement, both the second and third triodes 162, 164 are biased below cut-off, while the first triode 146 conducts an anode current indicating defect-free glass. By suitable adjustment of the wipers 154, 156 of the potentiometers, for example, the third amplifying triode 164 is rendered conductive to pick up the contacts 168 of a relay 170 in its anode circuit when the anode current in the first triode 146 drops due to a red-defect caused change in bias. When the first triode 146 is cut off by a black defect mark caused change in bias, both the second and third triodes are rendered conductive to pick up the contacts 168, 172 of both relays. The contacts 168, 172 of the relays 170, 174 are connected to a suitable source of D.-C. voltage so that when the relays are energized to pick up the contacts, a pulse is transmitted through one or both of the output lines 132, 134 to the buffer storage circuit associated therewith. As shown herein, a red defect-mark on the field of the element 20 results in the energization of the relay 170 in the plate circuit of the third triode 164 which, when the contacts 172 are picked up, energizes the output line 134. This line 134 is, therefore, the "mirror" defect line and carries a mirror defect pulse to the buffer storage circuit in the channel. Pulses through both output lines 132, 134 indicate the more severe glazing defect which is to be registered on both the mirror secondary record and the glazing secondary record and which, when in a portion of any glass sheet or ribbon, must be excluded by the cutting process since its presence lowers the grade below glazing or mirror grade. The line 132, therefore, is the "glazing" defect line and carries a glazing defect pulse to the buffer storage circuit in the channel. The "mirror" defect line 134 will carry any "glazing" defect pulse and also a pulse indicating the less severe mirror defect.

Figure 43B:
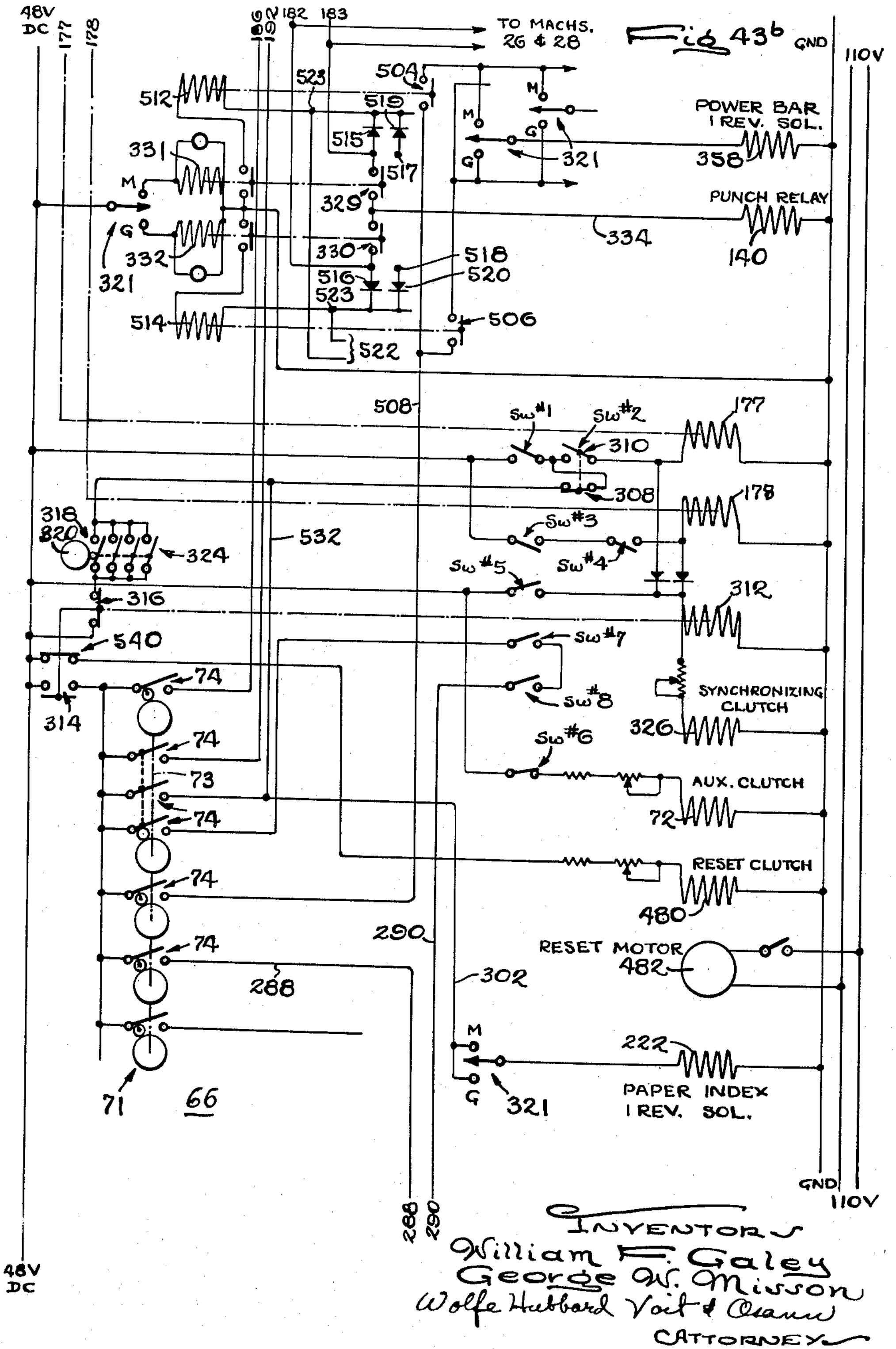

While the discriminator circuit 128 for each photosensitive element 20 is effective to discriminate between defect-mark free glass, mirror-defect marks, and glazing-defect marks, it is not effective to distinguish between these conditions and the passing of the leading or trailing edge of a glass sheet or ribbon, which as it intercepts the light to the photosensitive element, interrupts the transmission and appears when viewed by the element similar to a mark. Therefore, it is preferred to employ some means for blanking out spurious signals due to the passing of the glass leading and trailing edge by the rows of photosensitive elements, row 1 (FIG. 7) including the odd numbered elements 20 and row 2 including the even numbered elements. One such arrangement is shown in FIG. 43*a*, wherein a normally opened relay operated switch 175 is in the line 176 connecting the D.-C. power supply to the contacts 168, 172 of the discriminator circuit output relays 170, 174. The arrangement here is such that in order for the discriminator circuit 128 to develop a defect-mark response signal in either output line 132, 134 leading to the buffer storage networks, the switch 175 must be closed. The switch 175 for the discriminator 128 for the first odd numbered photosensitive element 20 in row 1 is operated by a row 1 blanking relay 177 which, as shown in FIGS. 7 and 43*b*, is actuated by glass present switches S*w* #1 and S*w* #2 located adjacent the row 1 elements on the bridge 18. It will be recalled that each photosensitive element 20 is associated with a single discriminator 128. In this arrangement, the outputs from all the discriminator circuits 128 for the row 1 photosensitive elements 20 are blanked out by the row 1 blanking relay 177. The connections are not shown from the relay operated switch 175 to the discriminator circuits 128 associated with the other odd numbered photosensitive elements 20, however it will be understood that these connections are all arranged in parallel with the connection 176 shown extending from the blanking relay switch 175 and the output relay contacts 170, 174 in the discriminator circuit depicted for the first photosensitive element 20 in row 1.

In a similar way, a normally opened blanking switch 175' is connected in the line 176' leading from the D.-C. power supply to the output relay contacts (not shown) for the discriminator circuits 128 connected to each of the even numbered, or row 2 photosensitive elements 20. Similarly, a blanking relay 178 is provided (FIG. 43*a*). This row 2 blanking relay 178 is operated by glass present switches S*w* #3 and S*w* #4 which are located adjacent the row 2 elements on the bridge 18. As indicated in FIG. 7, glass present switch S*w* #1 is $\frac{1}{16}$ inch upstream of the center line of the row 1 photosensitive elements 20, while glass present switch S*w* #2 is $\frac{1}{16}$ inch downstream of the center line. Glass present switch S*w* #3, as indicated in FIG. 7, is $\frac{1}{16}$ inch upstream and glass present switch S*w* #4 is $\frac{1}{16}$ inch downstream of the center line of the row 2 elements. Therefore, as the leading edge of an uncut sheet reaches the bridge, it first actuates glass present switch S*w* #1 which, it will appear from FIG. 43*b*, connects the D.-C. power supply to the glass present switch S*w* #2. When this latter is actuated after the leading edge has passed the center line of the row 1 elements 20, and thus is past the point area on the glass viewed by these elements, glass present switch S*w* #2 is actuated and energizes the blanking relay 177. Its contacts 175 (FIG. 43*a*) are pulled in which connects the D.-C. power supply to all the output relay contacts 168, 172 in all the discriminator circuits for row 1 photosensitive elements. The remaining $1\frac{15}{16}$ inch of the first mosaic element remains to be viewed by the row 1 photosensitive elements such that a defect mark in the first mosaic element will cause one or both of the output relays of the discriminator circuit 128 to be energized and produce the output signals in the event a defect mark is present in any one of the first mosaic elements. In a similar way, the row 2 blanking relay is energized by glass present switches S*w* #3 and S*w* #4 after the leading edge of the glass passes the center line of row 1 photosensitive elements. As the trailing edge of glass passes glass present switch S*w* #1, this latter is deactuated causing the blanking relay switch 175 to open thus preventing a spurious pulse due to the passage of the trailing edge. Likewise, as the trailing edge of a glass sheet passes glass present switch S*w* #3, the row 2 blanking relay 178 is de-energized causing its contacts 175' to drop out and prevent a spurious pulse from any or all the row 2 discriminators.

BUFFER STORAGE

As set forth in the preceding section, the discriminator circuit 128 associated with each of the 62 photosensitive elements 20 is effective to produce a response signal pulse upon the detection of a defect-mark by the element. Moreover, by means of the discriminator circuit 128 pulses are produced in one or both output lines 132, 134 leading to the buffer storage circuits 130, the pulse in one line (134) only registers the presence of a mirror defect while a pulse in both lines indicates the more severe total or glazing defect.

It is evident that the time when a defect-mark pulse is produced is dependent upon the Z distance of the defect-mark on the glass from the leading edge of the uncut sheet or ribbon. As shown in FIG. 16*a*, the defect-mark is a transverse crayon line located by means of a grid to insure that it extends over the center line of the mosaic. However, the mark may be located at any point in a particular mosaic in the Z direction. Therefore, a pulse indicating a defect-mark may be produced at any instant during the period required for the full 2 inch mosaic to pass by the aligned photosensitive element 20. In the present arrangement, it is preferred to operate the punches 54 of the punch mechanism to punch a defect hole in a particular tape mosaic only after the entire corresponding mosaic on the glass has been viewed in the lengthwise (Z) direction by the photosensitive element 20 connected to detect the presence of a defect. As a means for temporarily storing the information about defects until the full mosaic has been viewed, there is herein provided a pair of separate buffer storage networks A, B, for each of the output lines 132, 134 of the discriminator circuits 128. Separate buffer storage circuits are connected to each output line 132, 134 so that one circuit is operative to store mirror defect information while the other circuit stores glazing defect information. Since the buffer storage circuits operate in a similar way, a typical one which happens to be connected to the photosensitive element 20 over the first mosaic and in row 1 on the bridge will be described with an explanation of its operation with relation to the others.

Referring to FIGS. 11*a* and 43, separate output lines 132, 134 are connected from the discriminator 128 to the buffer storage circuit. These lines supply pulses from the discriminator to the buffer storage circuits according to the severity of a defect detected by the photosensitive element with which the discriminator circuit is associated. The arrangement is such, as described hereinbefore, that a mirror defect mark on the glass produces, via the discriminator circuit 128, an output pulse in one output line 134. A glazing defect mark denoting a more severe glazing defect via the discriminator circuit causes an output pulse in both lines 132 and 134. Thus the pulse in the other line 132 indicates the detection of the more severe "glazing" defect and that the portion of glass containing that glazing defect is cullet and must be excluded by the glass cutting operation.

These output lines 132, 134 from the discriminator circuit 128 are supplied to separate buffer storage circuits labeled "M" and "G," for convenience. Each buffer storage "M" and "G" circuit has "A" and "B" memory networks. These A and B networks are alternately operated, in synchronism with the movement of the glass, for storage and read-out of defect information involving successive mosaics. In this way one A or B network at a time is connected to an associated output line from the discriminator 128 to receive information, while the other A or B network is connected to the punch mechanism of the defect storage appartus 24 to supply defect information received as to the mosaic just past. To synchronize the storage and read-out of the A and B networks with the movement of glass, each output lines 132, 134 from the discriminator circuit 128 is connected directly to relay controlled switches 179*a*, 179*b* which connect the output line to the A and B networks. The relay 179 is supplied with signals by the glass clock 66 which, as described in general before, comprises a timing mechanism driven by the glass and emitting signals synchronized with the glass movement. In this case, the relay 179 controlled switches 179*a*, 179*b* are operated by the pulses from the glass clock to connect output lines 132, 134 from the discriminator circuit to one or the other of the associated pair of A, B networks for the period that the respective photosensitive element 20 requires to view a single mosaic square in the lengthwise Z direction. As the point field viewed by the element 20 passes to the next mosaic, each discriminator output line 132, 134 is switched by the glass clock pulse and the switches 179*a*, 179*b* to the alternate networks A or B. Should a defect indication pulse be produced in either or both output lines 132, 134 from the discriminator circuit 128, this pulse is transmitted to the A or B network that happens to be connected to the respective output line. Referring to FIG. 43 for the details of the A, B networks, it will be seen that this input pulse is effective to energize the relay 180 in the network, picking up contact 180' associated with the relay and thus sealing in the relay. Should a second defect caused pulse happen to be received while the same network is connected to the discriminator, the new pulse will have no effect on the relay 180 which remains sealed in. Timed with the passing of the mosaic from under the first photosensitive element 20 in row No. 1 which occurs simultaneously for all photosensitive elements in that particular row, the glass clock emits a pulse to the memory selector rely 179 which shifts the switches 179*a*, 179*b* to connect the alternate A or B network to the discriminator circuit.

During the period when the A and B network is disconnected from the discriminator circuit output lines 132, 134, the defect information which was previously received by that network is read-out. The arrangement thus provides buffer storage while the photosensitive element 20 views the full length of the mosaic. The presence of a defect anywhere in that mosaic is read-out while the next mosaic is being viewed, to control the actuation of the defect storage tape punch.

Read-out of the A or B network is achieved, as shown in FIGS. 11*a* and 43*a*, by connecting the respective network to the defect storage unit. In the present case this connection is provided by conductors 182, 183 leading from a second switch 184, 185 operated by the same relay 179 operative to select the memory circuit. This glass clock operated relay 179 is effective, therefore, to alternately connect the discriminator circuit 128 to, and read-out, each memory network A or B.

The memory network relay 180, as shown in FIG. 43*a*, includes three sets of contacts 180', 180'', 180'''. With the upper set of contacts 180''' picked up when the relay 179 is energized by a defect-pulse from the discriminator 128, lines 181 or 181' leading to a source of D.-C. voltage are connected through the relay contacts 180''' and a conductor to the read-out switch 184, 185. When this latter switch is actuated to read-out the memory network, the output conductors 182, 183 leading from the switch to the defect storage unit, are energized to supply a signal pulse thereto. If the mosaic is defect-free so that the relay 180 is not energized to pick up the upper set of contacts 180''', no output signal is transmitted to the defect storage apparatus.

After read-out of each A or B network, and prior to reconnection of the network to the discriminator circuit 128, the present system provides means for erasing any information as to defects stored in the network. For this purpose, as shown in FIG. 43*a* means are provided for deenergizing the network relays 180 at the end of each read-out period so as to prepare each memory network for reconnection to the discriminator circuit. Of course, the erase signal is only required when a network relay 180 has been energized by a defect-mark caused pulse. As shown, the coils 188, 190 of a pair of erase relays are connected in parallel to receive erase signals through a conductor 192 leading to the glass clock. The erase signals are appropriately timed to occur at the end of the read-out period, as shown in the timing diagram FIG. 44. The erase relays are alternately operated by means of a relay 186 connected in parallel with the memory selector relay 179 and therefore operated with it and in accord with the selection of the A or B memory network. The erase relays 188, 190 are operated to drop out or pick up their contacts 194, 196 which are in the lines 181, 181′ supplying the memory network relays 180. By opening the lines 181, 181′ the nework relays 180 are de-energized to erase the defect condition wherein the relay 180 is sealed in.

In summary, therefore, buffer storage is provided because in this system information as to the presence of defects in a two inch mosaic is not obtained until the full length of the mosaic is viewed or scanned by the photosensitive element 20. Each element views a point area of the mosaic lying along the center line of it. Thus the buffer or temporary storage is provided to save up the information about defects until the full mosaic has been scanned. This also serves to avoid mixing up information on two successive mosaics, since the instant the point area of the photosensitive element passes to the next mosaic the alternate memory network is utilized, while the first memory network is read-out into the punch mechanism of the defect storage unit. The memory networks are labeled A and B for convenience. They each include, as shown in FIG. 43*a*, a network relay 180 that has three sets of contacts 180′, 180″, 180‴. An associated pair of A and B networks is provided for each output line 132, 134 leading from the discriminator circuits 128 and containing defect response signals indicating glazing and mirror defects respectively. Each of the output lines 132, 134 are connected to one of the A or B memory networks associated with it while the other network is read-out. The A and B memory networks are selected by means of a selector relay 179 energized by pulses from the glass clock 66. These pulses, as shown in the timing diagram of FIG. 44 are of the same duration as the time between them, and thus provide for equal periods for receiving defect signals and for read-out.

DEFECT STORAGE APPARATUS

Each defect storage unit, as shown in FIGURES 12 and 15, includes a frame 200 having a pair of cross-braced vertical side frame members 202, 204. The complete frame with the supported components is adapted for horizontal movement by means of a roller slide 205 shown in detail in FIG. 16, and carried on the outer side of each side frame member 202, 204 and the side walls of the cabinet which serves to house the unit. The cabinet may have separate sections one for each storage unit, and the required power supplies for operating the units may also be mounted in the cabinet. By mounting the defect storage unit frame 200 for movement into and out of the cabinet, access is provided to the rear side of the unit for maintenance and other purposes.

*Paper control*

Referring now also to FIGS. 13 and 14, which show the paper path in greater detail, when the parts of FIG. 14 are joined along the junction line shown, it will be seen that the paper tape path extends, as it does in FIG. 13, continuously from the supply roll 32, carried at the lower end of the storage unit, upward in substantially the same plane, to the rewind roll 36 carried at the top of the unit.

As shown in FIG. 14, the supply roll 32 is carried on a spindle 210 which turns as the tape 34 is unwound from the roll. The tape 34 is led over a pair of rollers 212, 214 the first of which is motor driven by an unwind motor 216 to unwind the paper, and between a pinch roll 218 that rests on the paper and between the pair of rollers 212, 214 so as to place a slight drag on the paper tape as it unwinds. The paper tape 34 then passes in a loop around a dancer roll 220 and upwardly to pass around the paper indexing sprocket 48, the teeth of the latter engaging as shown in FIGS. 17 and 18, in the holes provided along the marginal edges of the tape.

In this arrangement the paper tape 34 is drawn out of the bight around the paper supply dancer roll 220 by means of the paper indexing sprocket 48. This sprocket 48 is driven by the paper indexing motor 50, as shown in FIGS. 17 and 18, through suitable gearing and a one-revolution clutch 52 which is effective to connect the paper indexing motor and the sprocket to release the paper for movement into the punch apparatus at an intermittent rate. The one-revolution clutch 52 is actuated, referring to FIG. 43*b*, by pulses derived from a cam 74 of the glass clock 66. As will be seen from this latter figure, when the glass clock 66 is energized and operated by a glass sheet moving along the conveyor, pulses are supplied to the one-revolution clutch 52 to synchronize the operation of the latter with the movement of the glass sheets or ribbon past the photosensitive defect detection assembly. In the present arrangement it is preferred to have the indexing motor 50 continuously operating and the one-revolution clutch 52, which may be of any conventional construction, actuated by a solenoid 222, as depicted in FIG. 14, which, in turn, is connected to the glass clock 66 to receive the pulses. The release of the paper tape from the loop around the lower dancer roll 220 and supply roll 32, is timed so as to be at the average speed to scale of the movement of the glass along the conveyor. The movement of the paper tape through the punch section is intermittent so that while the paper is stopped the punches 54 may be actuated to produce defect indicating holes.

In order to maintain the paper tape 34 under proper tension in the punch section, slight forward tension is applied to the paper by means of a pinch roller 223 (FIG. 14) which is a rubber roller engaging the surface of the paper tape and tending to move the same in a forward direction, pinching the paper between the edge of the roller and a cylindrical steel idler roller 224. The pinch roller 223 is belt driven by a motor 225 which is connected to operate the pinch roller through a clutch 226 such as a conventional hysteresis clutch, which slips so as to permit the application of a steady but not excessive tension to the paper and maintain its intermittent, yet uniform and constant tension feed through the punch mechanism. The paper is thus held under tension so that the punch holes may be formed in a proper manner.

Figure 43C:
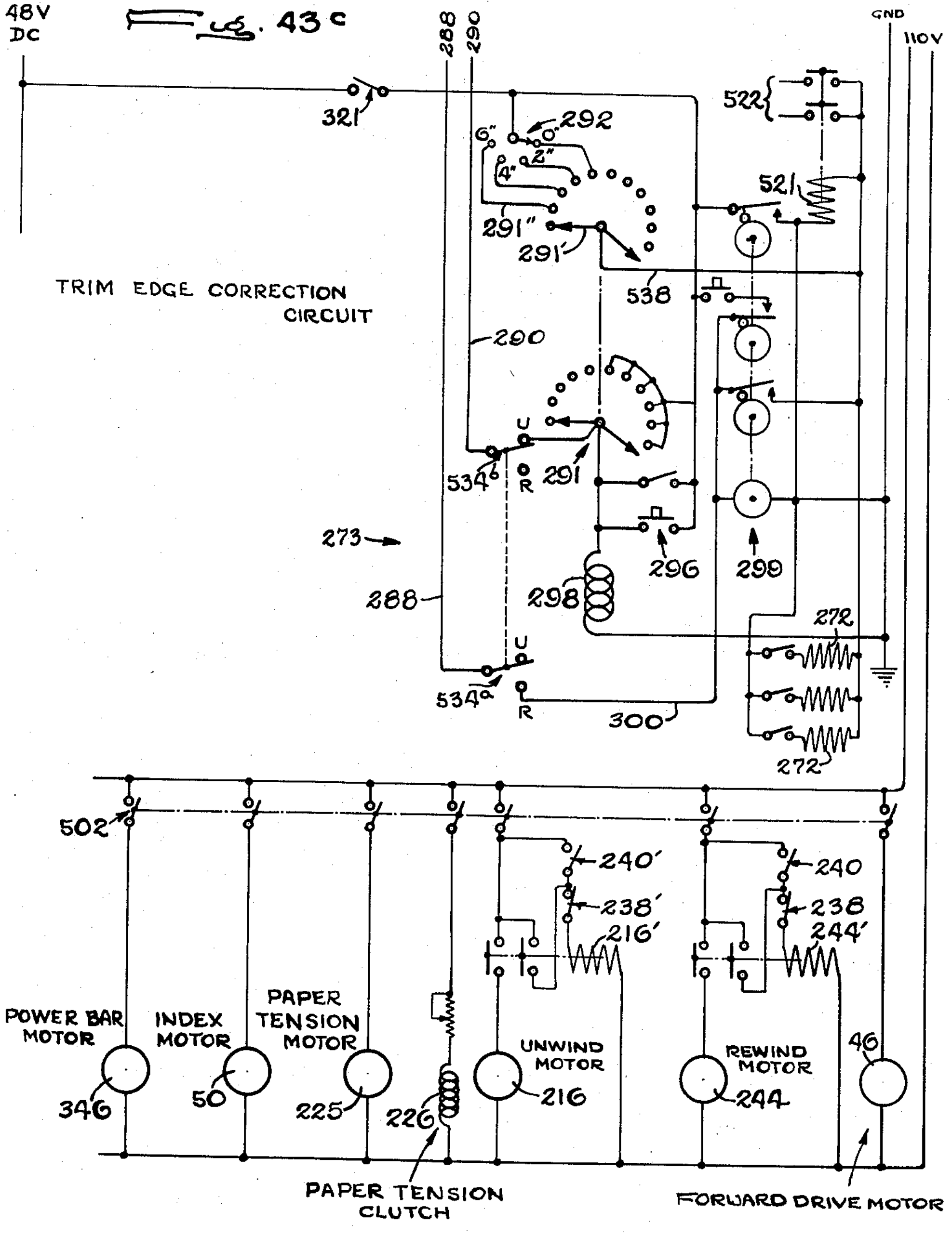

After passing vertically through the punch section and past the punches 54 the paper tape is threaded around a take-up roller 227 shown in the lower left-hand portion of FIG. 14. The take-up roller is movable horizontally and is biased to the left by means of a spring 228 so as to maintain tension in the paper tape. This loop around the take-up roll 227 provides for some temporary take-up of any slack in the paper tape between the punch section and the read-out section above. The paper then changes direction around an idler roller 229 and is led through the read-out section to the paper feed sprocket 44. The paper tape, after passing over the paper feed sprocket 44 passes around a first roller 230 and over a dancer roll 232 and then an idler 233 to the rewind roll 36 of tape. The rewind roll 36 of tape is carried on a spindle 236 which is operated by a motor 244 controlled as by means of limit switches 238, 240 which in this case are shown as microswitches operated by the dancer roll 232 as shown in FIGS. 24, 26 and 43*c*. These switches 238, 240 may be actuated by a lever 242 carried for movement with the arm 232′ carrying the dancer roll 232 and the counterweight W for pivotal movement, and are arranged to be actuated at the limits of movement of the dancer roll assembly so as to control the rate at which paper is drawn from the loop around the dancer roll. A similar arrangement of limit switches 238', 240' operated by the dancer roll 220 controls the relay 216' and unwinds motor 216. The switches 238, 240 are connected to operate a relay 244' as shown in FIG. 43c so that when the dancer roll 232 swings to its full loop position (FIG. 26) the relay 244' is energized by closing the normally open switch 240, which starts the rewind motor 244 to draw paper from around the dancer roll. The relay 244' is sealed in through the normally closed limit switch 238. When the dancer roll 232 swings to its other position, as shown in FIG. 24, the limit switch 238 is opened to deenergize the relay 244' and stop the rewind motor 244. The limit switches 238', 240' for the rewind motor 216 are operated and control the relay 216' in a similar manner.

The feed of the paper tape 34 through the read-out section of the defect storage unit 26 is controlled by the computer 16 so that the tape is advanced to desired positions in the read-out head of the defect storage unit and stopped for interrogation for defect information. The movement of the tape is produced by operating the paper feed sprocket 44 by means of the forward drive motor 46. This motor 46 is connected by a transmission to the sprocket shaft 250. As shown in FIG. 19, the motor shaft 252 is connected at one end through a brake clutch assembly 254 to gearing which extends to the shaft 250 for the sprocket 44. The other end of the motor shaft 252 is connected through a gear speed-reduction unit 256 and through a brake clutch unit 258 to the drive shaft 250 for the sprocket. With this arrangement, the sprocket 44 may be operated at either a high or low speed by selective energization of the clutches and de-energizing both brakes of the assemblies 254, 258. A leading edge finger operated paper positioning brake 260 is also provided which, when energized, stops the shaft 250 for the sprocket 44 and provides means to control the position of the paper tape precisely.

The control for the brake clutch units 254, 258 which may be any suitable electric or magnetic brake and clutch assemblies, for example, include (as shown in FIG. 46), limit switches 262, 264 associated with the take-up roll 227 which, when actuated, connect one or the other of the clutches to a source of D.-C. voltage. The brakes are also energized by means including the limit switches 262, 264 to stop the motion of the sprocket 44 when the loop around the take-up roll decreases to its smallest size to prevent any greater tension being applied which might result in tearing the tape. When the leading edge finger operated positioning brake is released so as to permit the sprocket 44 to turn and draw the paper through the read-out section, one or the other of the electrical clutches of the assemblies 254, 258 are energized so as to move the paper tape at the high or low speed. It is preferred to have the paper move through the read-out section at an initial high speed until the tape in the read-out section catches up and is synchronized with the tape in the punch section. The movement of the paper tape thus is halted in the read-out section in order to permit interrogation of a portion of it, while the paper tape is regularly advanced through the punch mechanism and is accumulated around the take-up roll. The initial high-speed period is followed by a slow-speed period in which the sprocket 44 is driven to move the paper tape at a speed which is slightly greater than the average speed of paper tape through the punch section. While the change from fast to slow speed may be accomplised in any desired manner, it is preferred that the clutches of the assemblies 254, 258 be controlled by the limit switches 262, 264 actuated by the take-up roll 227. During paper tape read-out, a length of tape is accumulated around the take-up roll 227. In the present arrangement, storage for approximately 9 mosaic of tape is provided in the loop around the take-up roll, which is the amount of tape produced in the time required for 9 mosaic of glass movement and in which time the computer makes the required computation.

Control of the movement of the paper tape through the read-out section is achieved in the present instance by controlling the paper positioning brake 260 and the brake-clutch assemblies 254, 258 associated with the forward drive motor. In this case, the operation of the forward drive sprocket 44 to move the tape through the read-out head is directed from the computer so as to position the tape for interrogation of the defect information it contains. For this purpose, above the read-out section there is provided an arrangement of leading edge fingers 270 (FIGS. 20–23) which record the presence of a leading edge perforation in the tape. Such a leading edge hole is punched in the paper tape preferably in one of the rows laterally adjacent the defect hole rows, and in alignment with the leading edge finger assemblies, by means of a leading edge punch 271 (FIG. 29) included in the first row of punches in the punch mechanism. The coil 272 for the leading edge punch 271 is energized by a signal derived from a leading-trailing trim circuit 273 shown in FIG. 43c and is operated in the same manner as the defect hole punches by the power bar 56.

Each leading edge finger 270 may comprise a suitable sensing element such as a thin resilient wire which is shown in FIG. 21 supported adjacent the marginal edges of the paper tape by means (FIG. 21) of a fixed, horizontal bar 274 drilled with slanted holes 275 to receive a piece of insulation through the center of which the wire fingers extend. The fingers are thus carried by the bars over the paper tape and are inclined so as to permit motion of the tape past the fingers. A row of fingers is carried adjacent each of the marginal edges of the tape, in the present instance so as to have even drag on both sides of the piper. The leading edge finger assembly on one side of the unit through suitable electrical connections shown in FIG. 46, controls the operation of the paper positioning brake 260 and the brake-clutch assemblies 254, 256 associated with the forward drive motor. For this purpose, as shown in FIGS. 20–23, the individual leading edge fingers 270 are insulated from each other and from the bars carrying the assembly so that the fingers 270 may be individually and selectively energized upon command from the computer 16. These fingers are provided in sets of 128, as shown in FIG. 20, one for each of the 90 mosaics the entire length of a 180 inch uncut glass sheet, or to provide means for sensing a leading edge hole spaced every 128 mosaic in the case of a ribbon. Any one of the 128 fingers may be individually energized so as to halt the paper tape in a particular location when a leading edge hole moves into coincidence with the finger. A bus bar 277 in the plate under a set of fingers is connected, as shown in FIG. 46, to the circuit controlling the positioning brake 260 and the brake clutch assemblies 254, 258.

As shown schematically in FIG. 46 for a single storage unit, although it will be understood a similar circuit is provided for each of the three units so that the paper tapes of two or all three defect storage units may be operated in unison by interconnecting the leading edge fingers 270 of the three units, the fingers 270 of the leading edge finger assembly at one side of the unit are individually connected to the computer 16 so that the fingers may be selectively energized from the computer. With this arrangement, the first leading edge finger 270 (the right hand finger 270 in FIG. 20*a*) may be energized so that the paper tape 34 of the particular defect storage unit is advanced from the punch section 38 through the read-out section 40 until the leading edge hole in the tape moves into coincidence with the energized finger 270. When this occurs a circuit is made through the bus bar 277 (FIG. 46) which energizes the positioning brake coil 260 and thereby stops the paper tape drive sprocket 44. The tape is thus stopped with the portion of the tape beginning at the unit square containing the leading edge hole lying in the read-out head 42. Where the tape contains defect data of one quality grade for an uncut glass sheet 180 inches in length (90 unit squares), with the first leading edge finger 270 energized in this manner the portion of the tape containing the defect data for the full length of the glass sheet beginning at the actual leading edge lies in the read-out head 42 with the 1st unit square under the first row of read-out fingers 64, the 2nd unit square under the second row of read-out fingers 64, and so on to the 90th unit square. It is a feature of the paper tape control, therefore, that the tape in each storage unit may be advanced to position the tape for read-out of defect data concerning the full length of an uncut glass sheet, beginning at the actual leading edge. Furthermore, after a trial Z is chosen the tape may be repositioned for read-out of defect information as to the remainder of the uncut sheet relative to the new leading edge. To achieve this result the first leading edge finger 270 is deenergized and the succeeding finger 270 corresponding to the chosen Z, energized. In the circuit of FIG. 46, when the previously energized leading edge finger is deenergized, the circuit is interrupted through the bus bar 277 thus releasing the positioning brake coil 260 and coupling the high-speed clutch 254*c* to start the advance of the tape at high speed by operating the drive sprocket 44. The advance of the tape continues until the leading edge hole in the tape moves into coincidence with the ienergized leading edge finger 270 to stop the tape with the new leading edge under the first row of read-out fingers 64.

Referring to the diagram of FIG. 43*c* for the details of the control means for producing the leading edge holes in the tape, it will be seen that the leading edge trim circuit 275 shown in the upper part of this figure, is connected by two conductors 288, 290 to the portion of the control circuit including the glass present switches SW #7 and SW #8 and glass clock 66 depicted in FIG. 43*b*. These conductors 288, 290 provide means for supplying pulses to the leading edge trim circuit derived from the glass clock, which pulses are utilized for operating a stepping switch 291 included in the circuit. The circuit also includes a control device 292 for setting the amount of leading edge trim desired.

By means of this tirm circuit 273, provision is made for preordaining the amount of leading edge trim to be taken from an uncut sheet. In this instance, to provide for trim on the leading edge of the glass sheet, entails locating the leading edge hole, designating the leading edge of the glass, in accord with the trim desired. For this purpose the device 292, which may be a switch on the control panel for the apparatus, is set manually in in one of four positions, for zero, two, four, or six inches of trim, i.e., a trim cut one, two or three unit squares wide. A second switch (not shown) may also be provided for setting the width of trailing edge trim to be taken, preferably again one, two, or three unit squares wide. A trim cut at the trailing or leading edge is sometimes required in the trimming of mechanically polished plate glass due to the presence of red edge, which is a band of imperfectly polished glass containing rouge which produces a red effect at the leading or trailing edge of the glass sheet. There may be other types of defects present at the leading or trailing edge of the sheet which may be noted upon visual inspection. In the present case the computer 16 provides means for accumulating the trim cut widths and operates to command the final Z cut from a sheet so as to leave the required width of trailing edge trim.

Referring to FIG. 43*c*, the trim circuit 273 is effective to operate the defect storage apparatus to take into account the leading edge trim as set on the device 292. The arrangement is such that the punching of the leading edge hole in the tape is delayed according to the amount of leading edge trim set on the device 292. Thus where zero trim is to be taken a leading edge hole is produced in the paper tape without delay in response to the leading edge of the uncut glass sheet moving into contact with and thereby actuating the glass present switch Sw 7 adjacent row 1 of the photosensitive elements on the bridge 18. In the case of ribbon glass, it should be noted, a leading edge hole is made every 256 inches, under the control of an accumulator circuit, shown in FIG. 43*c*, which automatically operates the leading edge hole punch every 128 mosaic. It will be understood that it is not required to take trim cuts where continuous ribbon is on the conveyor and, therefore, the circuit of FIG. 43*c* includes a switch to connect either the stepping switch 291 or the accumulator for operation depending whether the present apparatus is set up for uncut glass sheets or ribbon glass in a manner to be described hereinafter.

In the arrangement in the punch mechanism, it is preferred that the leading edge punch 271 be included in the first (upstream) row of punches. The leading edge trim circuit provides for delaying the punching of the leading edge hole up to three mosaic to preordain the amount of leading edge trim. Accordingly, the leading edge hole will be positioned either laterally adjacent the first defect information containing mosaic row in the tape, just below an imaginary line on the tape indicative of the actual leading edge of an uncut sheet or up to three mosaics downstream of the first row, depending on the amount of leading edge trim which it is desired to take on a particular uncut glass sheet.

By means of the glass clock 66 pulses are transmitted through the glass present switch Sw 7 to the leading edge trim circuit. This glass present switch Sw 7 is actuated by the leading edge of the glass as the glass approaches the bridge. As shown in FIG. 3, this glass present switch Sw 7 is positioned at a point upstream of the bridge and just adajacent row No. 1 of the photosensitive elements so that an initial pulse is transmitted to the trim circuit as the leading edge of an uncut glass sheet reaches the first row of elements. This pulse may be utilized to energize the leading edge punch coil 272 so that a leading edge hole is punched without delay as the leading edge of the uncut glass sheet actuates the glass present switch Sw 7, or by setting the dial 292 the leading edge hole may be punched after a delay of up to three mosaic. This is achieved by means of the dial on the device 292, and the stepping switch 291. With this arrangement, successive pulses supplied to the stepping switch 291 from the glass clock 66 advance the latter until its position coincides with the position of the preset dial. The stepping switch 291 is connected to a source of D.-C. voltage which is applied through the switch to the set of paralleled leading edge punch coils 272 for the different storage units. Since two or all three of the defect storage units are operated in unison, the punch coils 272 are connected in parallel and individually connected to receive punch pulses when the respective defect storage unit is in operation.

The trim-edge circuit also provides a means for resetting the stepping switch to its initial position, shown in the present case to comprise a manually operated homing switch 296 for controlling a motor 298 driving the stepping switch 291.

While the leading edge hole is provided in the foregoing manner when sheets of glass are conveyed to the glass cutting apparatus 12, 14 when a continuous ribbon moves along the conveyor 10 a leading edge hole is periodically punched to constitute a reference point on the paper tape. The latter is accomplished by means of a counting device 299 which is stepped along by periodic pulses supplied from the glass clock 66 through the conductor 300. Upon accumulating 128 pulses, indicating the passage of 128 mosaics of glass, the counting device 299 is effective to connect the D.-C. voltage from a power supply line to the set of punch coils for the defect storage units and thus cause a leading hole to be punched in the tape or tapes.

To control the forward drive sprocket 44 shown in FIGS. 14 and 19, the leading edge fingers 270 are selectively energized from the computer. The paper tape advancing by means of the forward drive sprocket may be halted at any desired position by energizing one of the leading edge fingers. Referring to FIG. 20*a* for example, it is seen that the read-out fingers 64 and leading edge fingers 270 overlap at the adjacent ends of the respective sections. By energizing the first leading edge finger (270) the paper tape will be halted with the defect information containing portion in the read-out head 62. With a leading edge hole in the tape laterally adjacent the first defect-information containing mosaic, when the first leading edge finger 270 is energized, the first defect containing tape mosaic is under the first rank of read-out fingers 64. With a leading edge hole in the tape in either the 1st, 2nd or 3rd mosaic element downstream of the first defect information containing mosaic elements, the tape will advance to a position where 1, 2, or 3 mosaic elements extend beyond the fingers 64 of the read-out head 62. A leading edge width of 1, 2, or 3 mosaic elements ( the amount of trim) in this manner is excluded from interrogation since it is beyond the read-out fingers 64 in the head 62 and the read-out will thus commence at the 2nd, 3rd or 4th defect information containing mosaic elements in the tape.

Referring again to the control circuit shown in FIG. 43*b*, a connection 302 is shown in this circuit to supply pulses from the glass clock 66 to the solenoid 222 controlling the paper indexing motor 50. An initial synchronizing pulse is provided by glass present switches S*w* #1 and S*w* #2 which are located a short distance apart and upstream of the bridge so as to be successively operated. The arrangement is such that when glass present switch S*w* #1 is closed, a signal is passed through the second normally closed contacts 308 of switch S*w* #2 thus providing an initial pulse which terminates the short instant later when switch S*w* #2 is actuated. This initial pulse supplied to the solenoid 222 for the one-revolution clutch causes the indexing motor 50 to advance the sprocket 48 and thus synchronizes the release of the paper with the movement of the glass. Upon engagement by the leading edge of the glass with glass present switch S*w* #2, the first set of contacts 310 are closed causing the clock selector relay 312 to be energized, which relay 312 picks up its contacts 314 thereby energizing the glass clock 66 and opens the normally closed contacts 316 in the line energizing the conveyor clock 318. In this manner the glass clock 66 is energized for the transmittal of pulses to time the various components of the system.

A conveyor clock 318, shown in FIG. 45, is operated during the period when no glass is present under the bridge 18 over the conveyor 10, and supplies pulses to continue the advance of the paper through the paper storage unit but without regard to absolute and precise synchronism with the movement of any glass. This conveyor clock 318 includes a cam 320 connected to a continuously operating roller of the conveyor 10 and has associated switches 324 which are arranged to open and close and produce pulses timed with the conveyor speed. Simultaneously with the energization of the clock selector relay 312 by the closing of glass present switch number 2 a glass clock synchronous clutch 326 is also energized so as to connect the glass clock shaft 328 and cams 71 carried thereon with the transmission for driving the clock, which transmission is operated by the upstream or downstream drive rollers 68, 70 in contact with the surface of the glass on the conveyor.

Referring to the timing diagram of FIG. 44 which illustrates the sequence of the pulses emitted by the clock, it will be noted from this figure that a pulse I is transmitted to operate the solenoid 222 controlling the one-revolution clutch 52, following a time delay from the start of the cycle of operation. This delay corresponds to the movement of 2 inches of glass or 1 mosaic element on the conveyor. Thus the one-revolution clutch 52 is initially operated responsive to the actuation by the leading edge of the glass of glass present switch S*w* #1, and this one-revolution clutch for paper indexing is then intermittently operated by pulses emitted from the glass clock 66 so that the motion of the paper is synchronized with the movement of the glass. It will also be noted that the paper indexing one-revolution clutch 52 is operated at an instant prior to the leading edge of the glass passing the first row of photosensitive elements 18 in the defect detection assembly, so that the motion of the paper is in synchronism with the glass prior to when the first defect holes are made in the tape.

*Punch section*

The punch section, as FIGURES 15, 29–32 show, includes a punch mechanism having punches 54 which may be selectively actuated to produce a perforation in the paper tape in a mosaic corresponding to a mosaic containing defect on the glass. The information as to defect locations is supplied to the punch mechanism through separate channels, shown in FIG. 11, leading from the elements 20 of the photosensitive detection apparatus, through the discriminator 128 and buffer storage circuits 130. In addition to the defect hole punches 54, there are also provided punches 271 for making perforations in a row at one side of the tape for recording as a reference point the location of the leading edge of an uncut sheet or ribbon of glass.

As previously indicated, the photosensitive elements 20 and the punches 54 for making the defect holes are similarly arranged in two staggered rows of 31 of the respective devices each. In this manner the odd-numbered mosaics are viewed on the glass as it passes the bridge by a photosensitive element 20 in the first and the even numbered mosaics by an element 20 in the second row, the first row being upstream. The punches 54 are similarly arranged. While the paper tape is stopped in its intermittent motion through the punch section, when glass is passing the bridge 18, a defect-mark caused change in condition of any photosensitive element 20 causes the corresponding punch in either the first or second row to be actuated to form the hole in the tape.

Figure 11B:
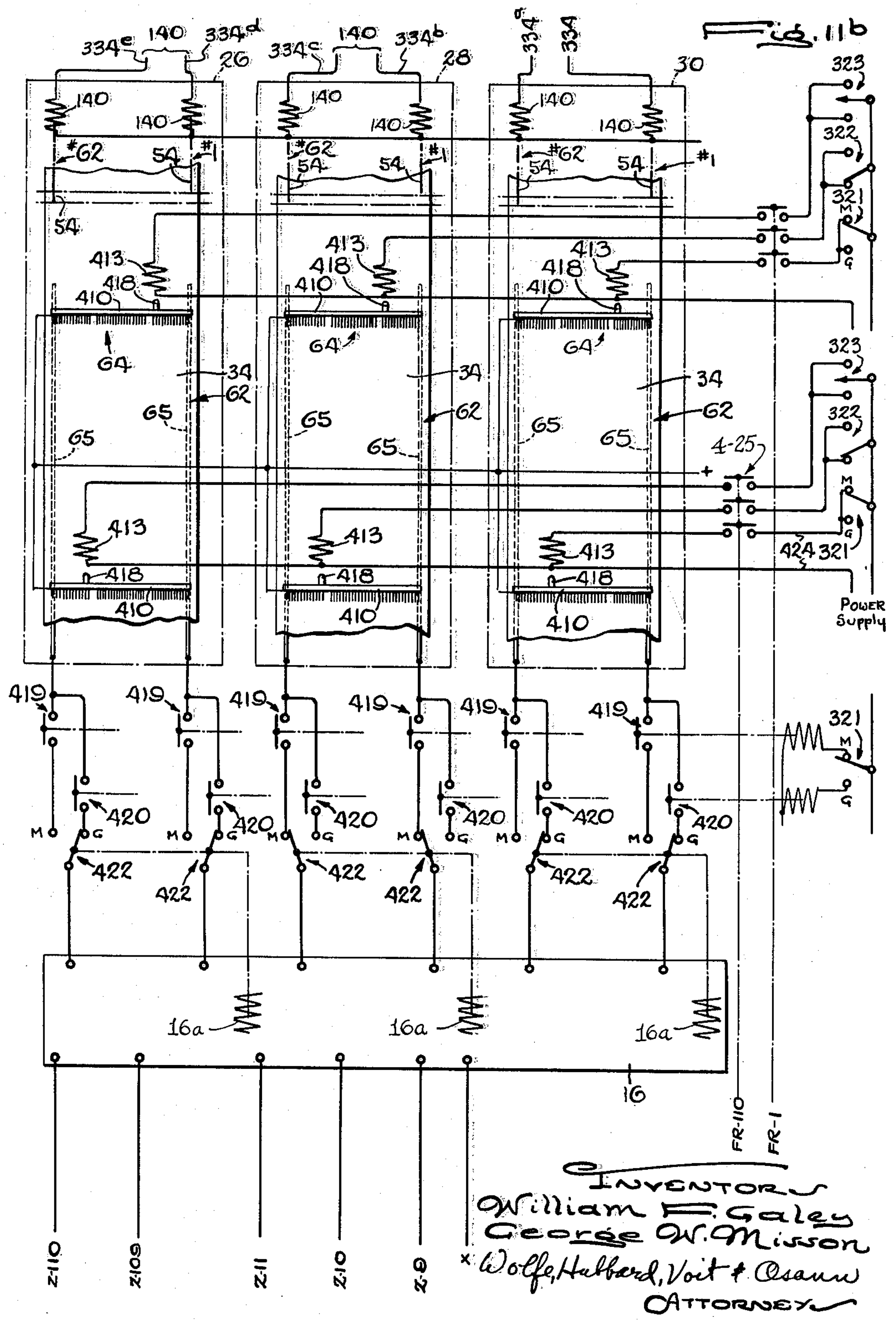

In the present instance, there are separate defect storage units 26, 28, 30, as shown schematically in FIGURE 1, for making mirror defect and glazing defect records, as well as a spare unit. Referring again to FIGS. 11*a–c*, there are conductors 182, 183 leading downward in FIG. 11*a* from each buffer storage network 130 to supply the defect response signal from each photosensitive element of the total of sixty-two to the switching circuit shown in the lower portion of FIG. 11*a*. The memory and buffer storage circuits are components of information supply channels leading from each of the sixty-two photosensitive elements 20. The information supply channels leading from the 1st and the 62nd photosensitive elements are shown and the separate conductors 333*a–e* by means of which connections may be made to the individual punch coils 140 for punches 1 and 62, respectively, of the punch mechanism for each defect storage unit 26, 28 or 30. This switching circuit serves as a means for selectively connecting the channels including the buffer storage networks to the three different units of the defect storage apparatus so that each unit is connected to receive defect information of a particular quality grade, i.e., mirror or glazing. Accordingly, a pulse emitted during read-out of memory network A or B of any of the sixty-two channels of the buffer storage is carried into this switching circuit. To carry out the function of this circuit to switch the defect pulses selectively to the punch units of the different defect storage units, selector switches 321, 322, 323 are used for the three storage units, each selector switch having either an M (mirror) or G (glazing) position. Each selector switch has sets of contacts associated with each channel from one to number sixty-two. In FIG. 11*a* the connections are shown only for channels one and sixty-two. It will be understood a similar arrangement is included for each of the other channels. Referring to the lower selector switch 321 for unit number 30, for example, separate sets of relay contacts 329, 330 are provided controlled by relays 331, 332. Similar sets of relay contacts are provided for the channels connected to each photosensitive element. With the switch 321 on the M position the relay 331 is energized to pick up its contacts 329 and thereby connect the mirror pulse conductor 183 of each of the sixty-two channels to this unit 30. Any defect pulses are carried through the lines 334 to the punch coils 140 (FIG. 11*b*) of the defect storage unit. It will be understood that while a single punch coil 140 is shown in FIG. 11*b*, individual punch coils are provided for each of the sixty-two punches and connections (FIG. 43*b*) are made to the punch coils from each of the channels leading from the sixty-two photosensitive elements. To connect the unit 30 for recording glazing defect information, the switch 321 is placed in the G position. In this manner the other relay 332 is energized to pick up its contacts 330 and connect the glazing defect pulse conductors 182 leading from each of the memory networks, to the punch coil 140 for each of the channels via the conductors 334. The right-hand punch coil 140 in FIG. 11*b* comprises the punch coil for row 1, punch 1, and corresponds to row 1, number 1, photosensitive element 20. The second from the right punch coil 140 is connected via conductor **334*a*** and with the switching circuit in FIG. 11*a* to the channel supplying defect information from the 62nd photosensitive element.

Turning now to FIG. 27, the punch mechanism is carried on a frame 338 which is supported on the vertical side frame members 202, 204 of the defect storage unit. The punch coils, in the form of solenoids 140, for the punches 54, are carried between side plates 340 (FIG. 29) on crossbars 344. At the lower end of the punch section is a motor 346 which supplies the power for operating the punches 54. The motor 346 and a belt driven crank 348 are carried on a base member 350 fastened to the side frame members 202, 204 of the defect storage apparatus.

Considering in more detail the construction of the punch mechanism, it will be noted upon reference to FIGS. 30–32 that the perforations are made in the tape by elongated punches arranged in parallel rows. The punches 54 are rectangular in section and are supported for horizontal sliding movement toward the paper tape, the latter being positioned in the apparatus in a vertical plane, by a fixed guide plate 352 which is formed with bores to receive the punches. As shown in FIGS. 30 and 31, the punches, when actuated, pass through the tape 34 and enter a die 354 to form a neat perforation in the tape. The punches are actuated by a power bar 56 which, as shown in FIG. 29, is mounted over the punch guide plate 352 and for movement toward the latter being slidably carried at each end on a fixed bolt 356. The power bar is actuated by the crank 348 shown in FIG. 28 when a solenoid 358 pulls in to release a one-revolution clutch 52. The solenoid 358 is supplied with pulses from the glass clock so as to cause the crank to operate the power bar synchronized with the movement of the paper tape. In the present case the power bar 56 is operated when the paper is stopped in its intermittent advance through the punch section. To connect the crank 348 to the power bar 56 the outer end of a connecting rod 360 operated by the crank is fastened to a power shaft 362 which is connected at each end to levers 364 which in turn are supported for pivotal movement at the other end on the punch frame side plate 340. The levers 364 are connected at about the midpoint to a link for reciprocation of the latter when the crank 348 is operated, the levers 364 being arranged as levers of the second class.

Rockers 368 (FIG. 30) are assoicated with each defect hole punch 54 and the leading edge hole punch 271 for selectively transmitting the motion of the power bar 56 to actuate the punches. Each rocker 368 is notched, as shown in FIGS. 30 and 31 to bear against a shaft 370 forming a sliding connection. The rockers 368 are normally pivoted to the positions shown in FIG. 32 by a spring 372 connected to the rocker and anchored to a lug 374 on the punch mechanism frame. The end of the rocker 368 adjacent the shaft 370 is connected by means of a resilient connection and rod 376 to the armature 378 of a punch coil which is electrically connected to be actuated by the defect-mark caused pulses. When a pulse energizes the punch coil to draw up the armature 378, the motion of the latter, through the yieldable connection and rod 376 pivots the rocker 368 so that the inturned end 380 overlies the punch. When the power bar 56 is advanced from the retracted position of FIG. 30 to the position of FIG. 31, the rockers 368 that are "in" are moved into contact with the heads 382 of the associated punches 54 and then drive the latter through the tape. Each rocker 368 is notched, one side being yieldingly fastened to the punch coil armature 378 and the other side being held by the spring 372. The rocker 368 thus bears on the shaft 370 to form a pivotal connection and is slidable on the shaft so that the rocker can move with the power bar 56 when the latter is actuated. In the retracted position of the power bar, as shown in FIG. 30, there is clearance between the heads 382 of the punches 54, the ends 380 of the rocker 368 when in either position, and the power bar 56, so as to permit the rocker to move in and out freely and without interference, the arrangement being such that an extremely low current in the punch coil is effective to control the operation of each punch.

To provide a positive return for the punches, a lift bar 384, shown in FIG. 29, is slidably carried on the fixed pins 356 which support the power bar 56. The lift bar 384 is actuated by the power bar on the advance stroke of the latter, and is returned by a pair of compression springs 386 with the power bar on its return stroke. Each punch has a head 382 resting on the lift bar 384.

*Read-out section*

Turning now to the read-out section in more detail, it will be noted that the read-out sections of each defect storage unit 26, 28, 30 are the same and, accordingly, one will be described. As shown for example in FIGS. 12 and 32, the paper proceeds in each defect storage unit from the punch section in a loop around the take-up roll into the read-out head 62. The paper tape is stopped in the read-out head for read-out purposes by stopping the motion of the paper drive sprocket 44. Since the paper is fed at at an intermittent but constant rate through the punch section, the extra paper between the sections for the period of read-out is held by means of the take-up roller 227. With the present defect storage apparatus connected to supply defect information to a computer 16 of the type shown in the copending application of William F. Galey et al., Serial No. 850,360, filed November 2, 1959, the time allotted for the computer 16 to choose a trial Z from a set of programmed trial Z lengths is about five seconds. In this time period, for example, a total of twenty trial Z's may be considered by the computer. At the maximum permitted glass speed somewhat in excess of 200 linear inches a minute under these conditions, a total of 9 mosaics pass the bridge during this read-out period of five seconds. Similarly, a total of nine mosaics pass through the punch section during this read-out period, so that 9 times ⅛ inch tape unit square, or 1⅛ inches is the amount of additional paper tape required to be stored around the take-up roller 227 to avoid having excessive paper tape in the punch section during the read-out period.

The present read-out mechanism provides means for interrogating a full 110 mosaics length of paper tape containing defect data. This mechanism also provides means for interrogating the tape for any length Z up to and including the maximum of 110 starting with the 1st unit square or mosaic adjacent the leading edge of an uncut glass sheet. Moreover, by coordinating paper tape position any length Z on the tape record can be interrogated, starting not only with the leaading edge but at any mosaic downstream on the tape from the leading edge. Referring, therefore, to FIGS. 32–35, the read-out head is made in two parts, a fixed frame 402 which carries banks of pick-up fingers 64 and is mounted between the side frame members 202, 204 of the storage unit, and a pick-up 404 hinged to the read-out head frame 402. With this arrangement, the pick-up unit 404 may be swung away from the frame 402 so that the paper tape may be readily threaded through the section. The pick-up unit 404 is locked against the frame by means of a pivotable locking lever 406 the end of which fits into a cam slot 408 in the frame.

The read-out head frame 402 supports 110 transverse bars 410 which are pivotally mounted by means of pointed set screws 412 at each end. Each bar 410 has a total of at least 62 depending wire fingers 64, the fingers of each bar being aligned with the fingers of every other bar. The bars are pivotable from a retracted position (FIG. 32) wherein the ends of the fingers are spaced from the pick-up unit to an advanced position where the fingers contact the paper tape, and, where defect holes appear in the tape—the pick-up unit 404. For pivoting the bars 410 and fingers 64, each bar 410 is operated by a solenoid actuator 413 having a normally retracted plunger 414 with a tip 416 of nylon or other suitable insulating material contacting a lug 418 fixed to the bar. As shown in FIG. 34, the solenoids 413, which constitute actuators for the bars 410, are lined up on a cross-plate 420 in sets of eight across the unit, each solenoid being positioned slightly in advance of the one preceding so as to be adjacent the corresponding bar 410. When the solenoids 413 are energized, the bars 410 are pivoted forwardly to the position shown for the upper bar 410 in FIG. 32, to advance the fingers 64 toward the pick-up unit 404.

This pick-up unit 404 consists of a base plate 417 having longitudinal parallel bus bars 65 embedded in its surface, one bus bar 65 under each set of longitudinally aligned fingers carried by the pivotable transverse bars 410, and therefore, for each mosaic element across the tape, that is, a total of at least sixty-two bus bars. As shown in FIG. 11*b*, means are provided for electrically connecting each bus bar individually to the computer 16 so that the requisite defect information, i.e., the S locations of unit square containing defect holes, may be supplied to the computer when required. This means includes relay operated contacts 419, 420 which are set by means of the selector switch 321–323 so that the individual bus bars 65 are connected to M (mirror) or G (glazing) output terminals according to whether the record in the associated defect storage unit contains mirror or glaz-defect information.

In order for the computer 16 to make the partitioning calculation, defect information is required in the form of the S locations of defects in any given length Z. Since the tape of each defect storage unit contains defect information of a given quality grade, the computer 16 may obtain defect information according to quality grade by selecting the appropriate defect storage unit. While the read-out procedure may vary depending on the particular computer utilized, with a computer constructed in the manner described in detail in the copending application of William F. Galey et al., Serial No. 850,360, filed November 2, 1959, and hereinbefore referred to, during an allotted read-out period of about five seconds a full set of programmed trial Z lengths are considered and one trial Z length chosen. Making partitioning calculations for the full length of an uncut glass sheet entails making successive cutting determinations until the entire sheet is partitioned. Starting with the uncut glass sheet the programmed trial Z lengths are considered relative to the actual leading edge and the best fits of the programmed widths chosen. After choosing a trial Z the programmed trial Z lengths are reconsidered from the new leading edge. To this end by means of the paper tape controls the paper tapes are advanced in the read-out heads to place the 1st mosaic following the new leading edge under the 1st row of the read-out fingers 64 in the head.

Therefore, in the operation of the entire system shown diagrammatically in FIGURE 1, where uncut glass sheets are present on the conveyor, the marks identifying the defects of an uncut glass sheet are detected by the photosensitive detection apparatus over the conveyor, and tape records prepared in the defect storage apparatus according to the defect information received from the photosensitive detection apparatus. The computing cycle begins as the tapes 34, which are operated in unison, are stopped by the paper tape control in the read-out heads with the defect information for the full sheet in the heads. As previously noted, the paper control is directed by the leading edge finger assembly of FIG. 46 of each defect storage unit, the operation of the units being coordinated by parallel connections between the leading edge finger assemblies. Completing the circuit through the leading edge finger 270 and bus bar 277 (FIG. 46), when a leading edge hole appears in each tape, is effective to start the computing cycle and, therefore, coordinates the operation of the computer 16 and the defect storage apparatus.

To consider the programmed trial Z lengths, the computer receives defect information by means of connections (FIG. 11*b*) leading downward from the bus bars 65 of the pick-up unit to the computer 16. These connections are made to the M or G output terminals by selectively operating the switches 422 by the computer relays **16*a* according to the trial Z quality grade. The read-out head 40 provides means to pivot each transverse bar 410 carrying a row of fingers 64 into contact with a paper tape record containing defect holes in mosaic elements scattered over the tape, so as to permit read-out of the S locations of the defects by means of certain bus bars 65 being energized by the fingers 64 extending through the defect holes into contact with the bars. To read-out defect information from the tape for a given Z length requires that the solenoids 413 be actuated through the connections 424 to the power supply so as to pivot all the bars 410 from row 1 up to and including the row corresponding to the trial Z toward the pick-up unit so as to move the fingers 64** carried thereby into tape contact.

While the present construction would permit programming trial Z's in the order of increasing or decreasing length Z's, for convenience of illustration the trial Z's are programmed in the order of decreasing length Z's. The solenoid actuators 413 for pivoting the bars 40 toward the pick-up unit, and thus the fingers 64 into tape contact, are energized through a switching matrix shown in FIG. 11*c*. The arrangement is such that as the computing cycle progresses, for each successive trial Z programmed the computer 16 supplies a signal through one of the connections Z–1—Z–110 to the switching matrix, which is effective to control the read-out operation of all three defect storage units. Assuming that two of the three units are in operation to store defect data of mirror and glazing quality grade, respectively, the switching matrix operates the read-out sections of both units, by selectively closing the relay contacts 425, so that defect information is supplied to the M and G output terminals of the pick-up unit.

The computer 16 by its relays 16*a* selects the defect information required according to the quality grade.

The coils FR-1 to FR-11 and FR-109, FR-110, constitute the coils of the solenoids 413 for actuating the finger bars 410. In the cascade circuit depicted, the solenoid coils FR-12—FR-109, and connections to these coils have ben left off the diagram for simplicity, but each of these are connected similarly to FR-10, 11, 109 and 110 so that their manner of operation will be apparent.

Figure 11C:
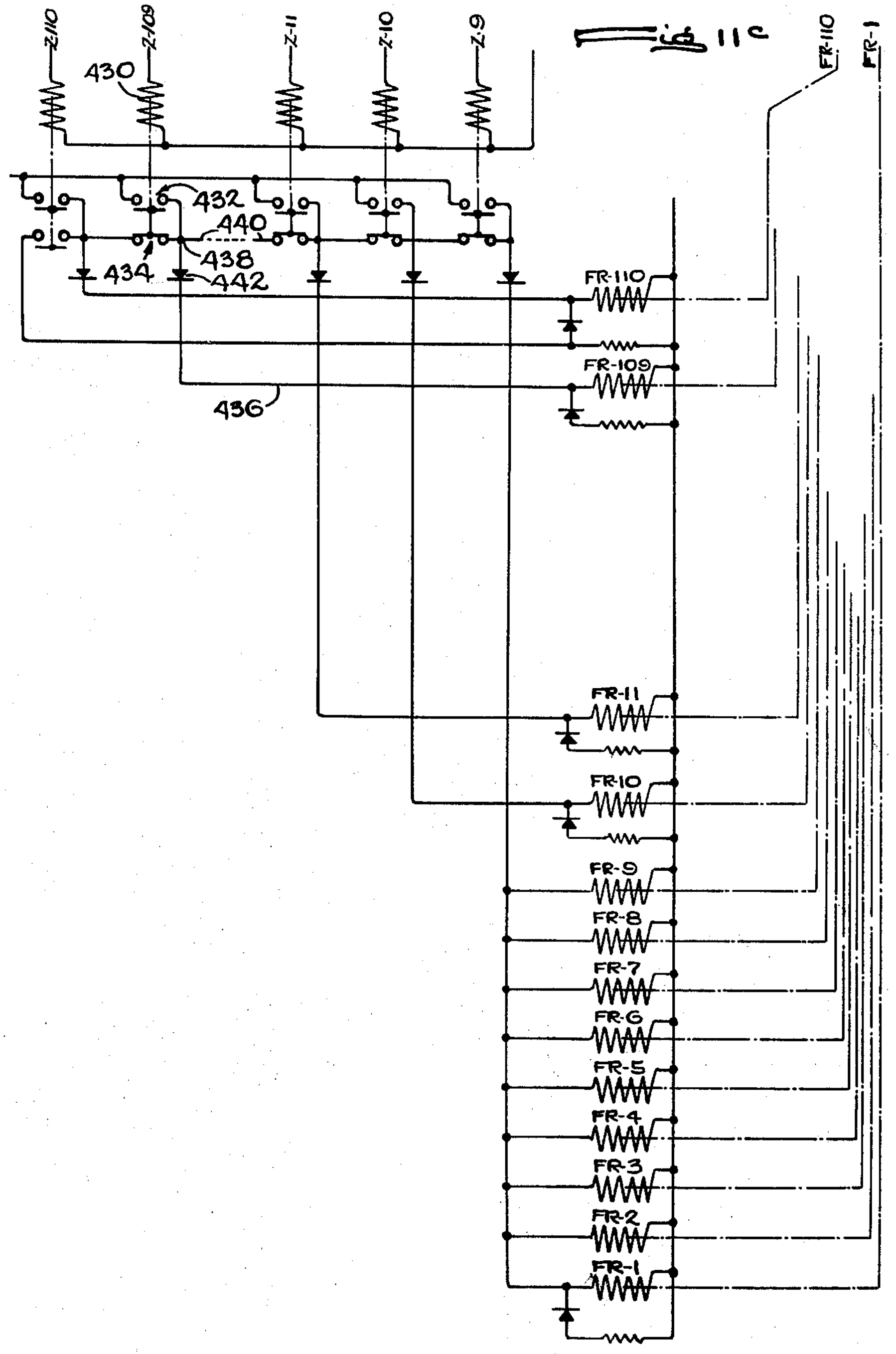

As shown in FIG. 11*b*, the computer is connected by the conductors Z-9—Z-110 to the switching matrix shown in FIG. 11*c*. An input signal from the computer through any one of the conductors Z-9—Z-110, which in effect is a command from the computer to interrogate the record for defect information, operates to advance the first finger bar through the finger bar having that Z number, into tape contact. In this manner, an input signal from the computer through any one line causes a bank of fingers to move into paper tape contact to interrogate the portion of the tape from the leading edge through the mosaic having a Z corresponding to the Z number of the conductor.

In FIG. 11*c*, taking conductor Z-109, for example, an input signal received from the computer through that line will energize the relay coil 430 which has 2 sets of contacts, 432, 434. The relay coil 430 when energized closes the first contacts 432 and opens the second set of its contacts 434, and remains energized only for the duration of the input signal. Closing the first set of contacts 432 will energize the solenoid coil FR-109 by means of a conductor 436 joined to a line connected to a power supply.

From the junction 438 adjacent the second set of contacts 434, of the energized cascade relay, which junction is connected through the first set 432 of contacts when the relay is operated to the power supply, a conductor 440 leads through the normally closed contacts of each of the relays of the lower numbered Z relays so as to connect the solenoid coil FR1-109 in parallel and thereby energize each coil. The diodes 442 prevent reverse flow and false reading. By opening the first set of contacts 432 associated with the energized cascade relay, the circuit to the solenoid coils of the higher numbered Z's is disconnected. Since the minimum length Z that can be cut with the glass cutting apparatus of FIGURE 1 is 18 inches or 9 mosaics, there is no provision made for individual energization of the finger rows Z-1 to Z-9 without simultaneously also advancing the rows of fingers Z-1 to Z-8 into paper tape engagement. Therefore, the cascade switching circuit includes no individual relays for rows Z-1 to 8 and the first relay 444 is connected to a conductor labeled Z-9.

The solenoid coils FR-1—FR-110 when energized close the relay contacts 425 (FIG. 11*b*) which is effective to connect the power supply to the coils 413 for actuating the finger bars 410 of all operative read-out heads. In response thereto the entire bank of fingers in each read-out head from the first finger bar to the finger bar having the number corresponding to the trial Z length, are pivoted into tape contact for read-out of defect information for the trial Z. In the normal read-out procedure, the Z connection voltages are shifted successively from higher to lower numbered trial Z connections, causing the bank of fingers below the trial Z to remain in contact with the tape and the remainder to retract from the tape.

GLASS CLOCK AND CONTROL CIRCUIT

A diagram of the control system for the operation of the components of the defect storage apparatus is shown in FIGS. 43*a*–*c*. This diagram includes the electrically operated components of the apparatus and the means for operating these components to produce the secondary record of defect information on the glass. The circuits are shown in FIGS. 11*a*–*c* for producing D.-C. pulses in separate lines to the punch coils of the punch-in section of the defect storage units indicative of presence and severity of defects on the glass. The circuits in FIGS. 11*a*–*c* and 43*a*–*c* are shown in conventional manner with the A.-C. and D.-C. power supplies not energized.

Two control devices in this control circuit are the glass clock 66, which has been described in general hereinbefore as comprising a mechanism for emitting timed signals to synchronize the operation of the components of the system, and the glass present switches carried by the bridge 18 and incorporated so as to provide means for relating the operation of all the components of the apparatus to the passage of a glass sheet past the bridge.

Referring first to the glass clock 66 in greater detail, FIGS. 36–42 show that the glass clock 66 includes a pair of similar drive rollers 68, 70, one upstream (68) and one downstream of the bridge. The rollers 68, 70 are preferably rubber rimmed and each are separately supported by means of mountings on brackets 450, 452 carried on the main beam of the bridge. Each roller is floatingly supported to be in contact with the surface of the glass and to follow any vertical motion of the surface. Since the floating suport for both rollers 68, 70 is similar it will suffice to describe in detail the arrangement for the upstream roller 68. The roller 68 is carried in a cradle 454 (FIG. 40) which is journalled by means of bearings 456 on a fixed frame member 458. The drive roller 68, is carried on a shaft 460 eccentrically supported in bearings 462 carried by the cradle. The end of the shaft 460 carries a lever 464 (FIG. 37) which is spring biased and with the eccentric mounting of the shaft 460 is effective to urge the drive roller 68 into contact both with the glass and with a second roller 466 which is fixed to a drive shaft 468. There is a separate drive shaft 470 for the downstream roller 70. The drive shaft 468 associated with the upstream drive roller 68 is connected through gearing 472 to a main clutch 326 on the clock shaft 328, the latter being adapted to disconnect both the upstream and downstream rollers 68, 70 from driving the cams 71 of the clock 66.

The drive shaft 470 associated with the downstream roller 70, is also connected to gears 478 for driving the glass clock shaft. Interposed between these latter gears 478 and the downstream roller drive shaft there is also included an auxiliary clutch 72 which must be energized to couple the downstream drive roller 70 in drive relation with the clock shaft 328.

In addition to the foregoing, there is a reset clutch 480 on the glass clock shaft for resetting the cams 71 to a start position by means of connecting the shaft for reverse rotation to its start position by a glass clock reset motor 482. The reset motor 482 in the present arrangement is preferably continuously operating.

As shown in FIG. 41, each cam of the set 71 is provided with lobes 71' to actuate the associated switches 74. One of each pair of switch blades 484 is fastened to a lug 486 which rides on the periphery of the cam. The dwell of the lobes 71' determines the duration of the pulse emitted by the closing of the switches 74. The timing diagram, FIG. 44, shows the sequence in which pulses are emitted from the glass clock 66. It will be understood that the individual cams of the set 71 are so formed, and arranged with the switches 74, as to produce the pulses in the order indicated. Thus the cam shown in FIG. 41 may be employed to produce the paper indexing, erase, and trim-edge correction pulses, the first three reading down from the top in FIG. 44. A similar 4-lobed cam, when angularly displaced, may be used to obtain the punching pulse. Appropriate cam configurations may be used to obtain the other pulses diagrammed.

The switches 74 of the glass clock are electrically energized upon the closing of glass present switch 2 which energizes the clock selector relay 312. One set of contacts 314 of this latter relay connect the power supply to the switches 74 associated with cams 71.

Now turning to FIG. 3, the glass present switches are shown mounted on the bridge. They are mounted so as to be actuated in the order given in the following sequence table. Any suitable conventional switch may be used, such as Allen-Bradley Type 8027 switches.

| Glass Present Switch No. | Function |
|---|---|
| 8 | is located a substantial distance upstream of the row 1 photosensitive elements and is normally closed. This switch is included in the glass tracking circuit of Fig. 10. When closed it energizes the solenoid 488 to unblock the line to the detector 101. |
| 6 | is located a substantial distance upstream from the center line of the bridge 18 and adjacent the upstream drive roller 68. It is a normally closed switch which, when operated, deenergizes the glass clock auxiliary clutch 72 and thereby uncouples the downstream drive roller 70 so that the upstream roller 68 drives the clock cams when the clock main clutch is engaged. Also, when the trailing edge of an uncut passes the switch, it closes to engage the auxiliary clutch 72 so that the downstream roller drives the clock cams. |
| 1 | is located at a point 1/16" upstream of the center line of row 1 of the photosensitive elements 20 and is closed by the leading edge of an uncut or ribbon of glass. When closed the switch passes an initial synchronizing D.-C. pulse through the second set of contacts of glass present switch 2 to the paper indexing, one-revolution clutch 52. It energizes row 1 blanking relay. When the trailing edge of the glass opens switch 1, the blanking relay for row 1 is deenergized. |
| 7 (operated simultaneously with switch 1). | is located adjacent to switch 1 and is normally closed. It is used in connection with glass present switch 8 to limit the number of pulses fed to the trim-edge correction circuit. |
| 2 | is located at a point 1/16" downstream of the center line of row 1 of the photosensitive elements 20 and has two sets of contacts. The first set of contacts are shown normally open and, when closed, operate (1) row blanking relay 177; (2) via a diode, operate clock selector relay 312; (3) also via a diode, operate the glass clock main clutch. The second set of contacts 308 are normally closed and, when operated, open the circuit to the one-revolution solenoid 222. Switch 2 is located 1/8" downstream from glass present switch 1 and the time elapsed between closing switch 1 and opening switch 2 provides a short initial synchronizing electrical pulse to the paper indexing one-revolution clutch 52 operating solenoid 222. |
| 3 | is located at a point 1/16" upstream of the center line of row 2 of the photosensitive elements and, when closed, connects the D.-C. power supply to glass present switch 4. |
| 4 | is located at a point 1/16" downstream of row 2 of the photosensitive elements 20 and, when closed, (1) energizes row 2 blanking relay 178; (2) provides a separate parallel circuit to energize glass clock main clutch and clock selector relay 312. |
| 5 | is located a substantial distance downstream of the row 2 of the photosensitive elements and, when closed, energizes (in parallel with glass present switches Sw #1 and Sw #2 and with switches Sw #3 and Sw #4) the glass clock main clutch 326 and the glass clock selectorrelay 312. This switch maintains the glass clock in circuit to provide for additional pulses from the clock to insure adequate paper supply into the defects storage unit after the trailing edge of an uncut glass sheetpasses the bridge 18. |

Since each defect storage unit of the apparatus includes the same components, for convenience in this description of the control system, a complete description of one unit will suffice. Like reference characters will be used, as hereinbefore, to designate like parts in all units. Referring to FIG. 14 and 43*a–c*, each unit includes the following power driven components.

Motors:
- Paper unwind
- Paper indexing motor
- Power bar motor
- Paper tension motor
- Forward drive motor
- Rewind motor Clutches:
- One-revolution clutch (paper indexing sprocket)
- One-revolution clutch (punch power bar)
- Paper clutch

- High and low speed brake-clutch assemblies (forward drive sprocket)

Brakes:
- Leading edge controlled paper position brake
- Paper tension brakes

Having in mind the arrangement of glass present switches as shown in FIG. 3, and the individual function of each, as given in the table above, as well as the glass clock organization, reference is now made to the timing diagram of FIG. 44 which shows the sequence in which the pulses are emitted by the operation of the glass clock cams 71. In FIGS. 43*a–c*, the connections are depicted which extend from the glass clock switches 74 to the components of one of the defect storage units 26, and the connections from the glass present switches, with the selector switches 321, 322, 323 provided for connecting this unit as well as the other units selectively to appropriate power supplies and also to the glass clock and glass present switch networks.

By way of summary of the partitioning operation, the sequence will now be described from the time a glass sheet approaches the bridge 18 on the conveyor 10, until the glass cutting operations have been directed for the sheet.

The glass clock 66 operates for the period that the glass sheet or ribbon requires to pass the bridge. In the intervals between uncut sheets, pulses are supplied to the defect storage unit for indexing the paper, from the conveyor clock 318, which is shown in FIG. 45. This conveyor clock is located upstream of the bridge 18 and comprises a cam 320 driven by one conveyor roller. A plurality of microswitches 324 are actuated successively by a notch 496 in the periphery of the cam to omit a pulse for every 2" of peripheral movement of the conveyor roll. This conveyor clock operates whether or not glass is on the conveyor 10. The conveyor clock 318 is arranged in parallel with the circuit including the glass clock cam 320 and is connected to emit pulses when the clock selector relay contacts 316 are closed when the clock selector relay is deenergized. During such period of operation, when the clock selector relay 312 is deenergized, the power supply is disconnected from the glass clock 66 by the normally opened contacts 314 and the clock is at rest with the cams at the start position.

The selector switches 321, 322, 323 are provided for connecting the individual defect storage units to the power supplies and selectively for receiving glazing or mirror defect punch pulses. For convenience, the switches may be mounted for manual actuation in any suitable location on a control cabinet. These switches include separate decks or parts which are shown on different figures of the drawings, all of which are connected together for operation. Taking, for example, the selector switch 321 for unit 30, the switch may be turned to either the G or M position to connect the unit 30 to the power supplies and for making the glazing or mirror defect paper record.

Referring to FIG. 43*c*, the switches 502 one of which is shown in series with each motor, may be operated coincident with the selector switch 321 to connect each of the motors to the line. The power bar motor, forward drive motor, paper tension motor, and paper indexing motor all operate continuously. The paper unwind and rewind motors operate as controlled by their associated dancer rolls.

The paper tension clutch 226 is energized by the closing of one of the switches 502 and is operated while the defect storage unit is in operation. The power bar and paper indexing one-revolution clutches are energized by solenoids 353, 222 (FIG. 43*b*), in response to pulses derived from the glass clock 66. Both of the solenoids are connected in circuit with the clock when the selector switch 321 is shifted to either the M or G position.

The power bar clutch 58 is operated to connect the power bar motor to reciprocate the power bar and punch defect holes in one mosaic row of the tape while the succeeding mosaic on the glass is viewed by the photosensitive elements. The clutch 58 is operated by punching pulses which are emitted by the glass clock once each mosaic of paper movement. Sets of contacts 504, 506 interposed in the line 508 conveying punching pulses from the glass clock to the power bar clutch, are operated by logical "OR" gates 512, 514 herein shown as relays connected for operation by defect pulses received through the conductors 182, 183 from the buffer storage circuits 130 and from the leading edge trim circuit 273 through the conductors 522. In the present case separate mirror and glazing "OR" gates are provided wherein relay 512 serves as the mirror "OR" gate while relay 514 serves as the glazing "OR" gate. The coils of the respective "OR" gates are energized whenever a defect mark caused punch signal is transmitted from the memory networks of the buffer storage or whenever a leading edge punch signal is transmitted from the leading edge trim circuit 273. With this "OR" gate arrangement, the power bar is operated only when a defect hole or a leading-edge hole is required to be punched. The circuit diagram shown in FIGS. 43*a* and *b* includes the connections 182, 183 from the A and B buffer storage networks for the first photosensitive element 20 in row 1 to the "OR" gates 512, 514 through the diodes 515, 516. A similar connection is provided from the buffer storage circuit 130 for every other photosensitive element 20 in both rows 1 and 2 to the terminals 517, 518 and through the diodes 519, 520 to the coils of the "OR" gates 512, 514. Referring to FIG. 43*c*, whenever the leading edge coil 272 is energized the relay 521 is also energized, closing its contacts to connect the D.-C. power supply through lines 522 to the common lines 523 shown in FIG. 43*b* extending to the "OR" gates 512, 514. In this arrangement, therefore, the "OR" gates are energized when any punch coil 140 is energized for either row 1 of photosensitive elements 20, and when the leading edge punch coil 272 is energized.

The glass present switch S*w* #8 is first to be operated by the leading edge of an uncut sheet. Referring to FIG. 43*b*, when closed, switch S*w* #8 connects the glass clock to glass present switch S*w* #7. Also, by a connection not shown, glass present switch S*w* #8, when closed, energizes a solenoid 488 (FIG. 10) of the glass tracking means to actuate a valve and unblock the air line 100 to the detecting means 101.

Next in the order of operation, by the leading edge of the glass sheet is glass present switch S*w* #6. Its normally closed contacts are opened when the switch is actuated so as to deenergize the glass clock auxiliary clutch 72 and anticipates operation of the glass clock by the upstream drive roller 68 until the trailing edge of sheet deactuates glass present switch 6 as it passes the upstream drive roller. The glass clock 66 continues to be operated until the trailing edge passes the downstream drive roller 70.

The leading edge of the glass next actuates glass present switches S*w* #1 and S*w* #7 together. These switches, as shown in FIG. 7, are located just upstream of the center line of row 1 photosensitive elements 20, and thus are actuated just prior to the instant that the leading edge of the glass uncut or ribbon arrives within the field of the photosensitive elements in row 1. As shown in FIG. 43, the contacts of glass present switch S*w* #1 are normally open and, when closed, connect the D.-C. power supply to the contacts 308 for glass present switch S*w* #2. Since the second set of contacts 308 of glass present switch S*w* #2 are normally closed, a D.-C. pulse is therefore passed from the glass present switch S*w* #1 through these normally closed contacts through the conductors 532 and 302 leading to the selector switch 321, and through parallel connections not shown to the selector switches 322, 323 for the other defect storage units 26, 28. With this switch 321 on the M or G position, the D.-C. pulse is transmitted to the solenoid 222 of the one-revolution clutch 52 for the paper indexing sprocket. This pulse thus synchronizes the motion of the paper with the arrival of the leading edge of an uncut sheet of glass or ribbon at the defect detection apparatus on the bridge 18.

It is also to be noted that the circuit from the D.-C. power supply through glass present switch S*w* #1 and the second set of contacts of glass present switch S*w* #2 is connected in parallel with the conveyor clock 320. Prior to the time of actuation of the glass present S*w* #1, the conveyor clock 320 supplies periodic pulses for paper indexing so as to move the paper intermittently through the punch section of the defect storage unit even when no glass is present. This new synchronizing pulse thus may or may not coincide with a pulse emitted from the conveyor clock which continues to operate for a short period following the actuation of glass present S*w* #1. Partly or fully coincident pulses may be emitted by the closing of the glass present switch S*w* #1 in the described manner, and from the conveyor clock 320, but if such coincident pulses happen to be emitted they will only cause a single actuation of the one-revovlution clutch 52 in the paper indexing mechanism.

Just following the operation of glass present switches S*w* #1 and S*w* #2, glass present S*w* #2 is actuated by the leading edge of the glass. This glass present switch S*w* #2 is located at a point 1/16" past the center line of the photosensitive elements in row 1. Since the photosensitive elements 20 view only a point area on the glass, glass present switch S*w* #2 is located downstream of the center line of the photosensitive elements in row 1 so that the leading edge of the glass has past the point area viewed by the row 1 photosensitive elements when the leading edge actuates the switch. By the actuation of glass present switch S*w* #2, its first set of contacts connect the D.-C. power supply to the blanking relay 177 for row 1 of the photosensitive elements, which closes the blanking relay contacts 175 and supplies D.-C. power to the output lines 132, 134 from all the discriminators 128 connected to the photosensitive elements in row 1. In this arrangement, the discriminator circuits remain energized for the intervals between uncut sheets, but spurious signals are prevented since no output pulses are produced until the blanking relay is actuated. This arrangement prevents, for example, a spurious pulse which might be caused by the leading edge of the uncut passing the field of the photosensitive elements.

The closing of the first set of contacts of switch S*w* #2 is also effective through a diode connection to apply the D.-C. power supply to the clock clutch 326. The clock selector relay drops out one set of contacts 316 which are in the line connected to the conveyor clock and thereby deenergizes the conveyor clock. A second set of contacts 314 associated with the clock selector relay 312 is picked up when this relay is energized to connect the D.-C. power supply to energize the glass clock 320.

The second set of contacts 310 associated with glass present switch S*w* #2 is normally closed. Opening these contacts terminates the initial pulse started when glass present switch S*w* #1 is actuated by the leading edge of the glass and supplied to the indexing solenoid 222. The operation of the glass clock 66, which emits signals to the paper indexing solenoid through the conductor 302, starts at this time and, therefore, the successive pulses emitted by the clock synchronize the motion of the paper in the punch section with the movement of the glass along the conveyor. The spacing between glass present switch S*w* #1 and the glass present switch S*w* #2 is about 1/8" in the apparatus depicted, for example, in FIG. 7, which shows the physical location of the glass present switches. The time required for the leading edge of the glass to move between these two switches determines the duration of the initial pulse supplied to the paper indexing means.

Following the actuation of glass present switch Sw #2, glass present switches Sw #3 and Sw #4 are actuated in that order by the leading edge of the glass. These switches are associated with row 2 of the photosensitive elements 20 and provide for blanking out spurious signals in a similar manner to glass present switches Sw #1 and Sw #2 for row 1. Thus glass switch Sw #3 is located 1/16" upstream of the center line of row 2. The contacts of this switch are normally open and, as shown in FIG. 43, when closed connect the D.-C. power supply to glass present switch Sw #4. This latter switch is located 1/16" downstream of the center line or row 2 and, when actuated by the glass, energizes the row 2 blanking relay 178 as shown in FIG. 43. The contacts 175' of the row 2 blanking relay are normally open and, when closed by energization of the relay, supply power to the contacts 168, 172 of the output relays 170, 174 in the discriminator circuits 128 for row 2 photosensitive elements. Closing of switch Sw #4 by the leading edge of the glass at an instant just later than the time the leading edge passes the center line of the photosensitive elements, and thus at a point downstream of the point area viewed by the photosensitive elements, eliminates the posibility of spurious pulses caused by the leading edge of the glass passing the field of the photosensitive elements. As in the case of the operation of the switches Sw #1 and Sw #2 for row 1 of photosensitive elements, the photosensitive elements are actuated and view the remaining 1 15/16" portion of the first mosaic, only the small band adjacent the leading edge being excluded due to the delay in energization of the discriminator circuit by the actuation of the discriminator blanking relay.

The closing of glass present switch Sw #4 also provides a separate parallel circuit to energize the glass clock main clutch 326 and the clock selector relay 312 through a diode and connecting line. The diodes in the lines to the clock selector relay and main clutch circuits are provided to prevent reverse flow.

The next switch to operate is glass present switch Sw #5. This switch is located a substantial distance downstream of the photosensitive elements in row 2 and includes normally opened contacts. When the switch is closed and energized it is in parallel with the other circuits to the clock selector relay and glass clock main clutch and has as its main function to maintain the operation of the glass clock for a period following the movement of the trailing edge of the uncut sheet of glass past the photosensitive elements in row 2.

The paper record made in a defect storage unit constitutes an analogue of the defect spotted glass with defect holes or perforations provided coordinately corresponding to the location of the defects. These defect holes are produced in each mosaic rank in the record as the mosaic rank passes successively rows 1 and 2 of the punches in the punch mechanism. A defect in any odd numbered mosaic results in the corresponding punch in punch row 1 being operated, and a defect in any even number mosaic in a rank results in the corresponding punch in row 2 being operated to record the defect. When a ribbon of glass, as distinguished from uncut sheets, is on the conveyor, to provide a continuous reference point on the paper tape a leading edge hole is also punched in a marginal row once every 128 mosaics of glass movement. This is achieved by the leading edge trim circuit 273 which receives pulses from the glass clock and includes a counter 299 which, when 128 pulses are accumulated, transmits a pulse to the "OR" gates 512, 514 by operating the relay 521. The switches 534*a*, *b* provide for selectively connecting the conductors 288, 290 from the glass clock 66 to the stepping switch 291 or the counter 299, so that the leading edge trim circuit may be set up to provide leading edge holes at the positions corresponding to the leading edges of uncut sheets, or every 128 mosaics for a ribbon, depending on whether uncut sheets or a ribbon are on the conveyor. The "U" position is for uncuts, the "R" position for a ribbon.

When the glass production is in the form of uncut sheets, a leading edge hole is produced in the record to indicate the leading edge of each uncut. This leading edge hole is used to control the movement of the paper through the read-out section by means of the leading edge finger assembly and paper positioning brake and forward drive means shown in FIG. 46. In order to provide means for pre-ordaining leading edge trim, there is included in the leading edge trim circuit a control 292 which may be manually set to the amount of trim desired, that is 2, 4 or 6 inches as marked on the dial of the unit.

Means are also provided (not shown) for pre-ordaining trailing edge trim. Thus on the control panel adjacent the switch device 292 a trailing edge trim switch is preferably included, which operates through the computer 16 to command the final Z cut so that the desired width of trim is left.

One cam of the set 71 of the glass clock 66 produces pulses supplied through glass present switches Sw 7 and Sw 8 and conductor 290 to the stepping switch 291 of the leading edge trim circuit 273 as shown in FIGS. 43 and 44. In this arrangement, 0 leading edge trim requires the leading edge hole be punched without delay and thus the first pulse from the glass clock 66 advances the stepping switch 291 so that the arm 291' is in contact with the lead 291" to the 0 position set on the dial of the device 292. This forms a connection from the D.-C. power supply through the selector switch 321 to the control device 292 and line 538 to energize the leading edge punch coil 272. This also energizes the relay 521 which causes a pulse to be transmitted to the "OR" gates 512, 514, thus energizing the latter so that the power bar, when operated, will drive the leading edge punch and produce a leading edge hole. It will readily be seen that the punching of the leading edge hole will be delayed one 2" unit square for each 2" of leading edge trim, up to a maximum of 6" or 3 mosaics or unit squares. Therefore, it is preferred that the punch unit be so arranged that the leading edge hole punch, if operated at the same time the punches 54 are operated to produce defect holes in the odd numbered mosaics in the first rank, produces a hole which is laterally adjacent the said first rank of mosaics on the paper tape corresponding to the first rank of mosaics on the glass. Since there may be a delay of up to 3 mosaics in the operation of the leading edge hole punch, for trim purposes, the leading edge hole may be positioned up to three mosaics downstream of the first defect hole containing rank of mosaics on the paper tape, depending on what position the control device 292 is set.

To supply defect information to the computer 16 respecting on line timing considerations, and yet permitting the application of the partitioning method previously described, the paper tape records concerning one uncut glass sheet are prepared while the records concerning the preceding glass sheet on the conveyor are read into the computer and the partitioning calculations made. This is achieved in the present case by coordinating the operation of the computer and the defect storage apparatus by means including the paper tape control and more particularly the circuit of FIG. 46 and the leading edge finger assembly. Thus as the paper tapes of the separate defect storage units, which tapes operate in unison, advance from the punch section into the read-out section, the portions of the tapes containing defect information are regularly advanced toward the read-out position. the the tapes are stopped for read-out when the portion of each tape containing defect data for a full uncut glass sheet, lies entirely within the associated read-out head. In the present case (referring to FIG. 46), as the leading edge hole in a tape is advanced into coincidence with the first energized leading edge finger 270, the circuit is completed through the bus bar 277 and leading to the computer 16. This both stops any further advance of the paper tape, by means of the positioning brakes of each defect storage unit, and also starts the computing cycle in the computer 16.

With a computer 16 of the type previously referred to, trial Z lengths on the paper tape record are considered for defect data in a programmed order of decreasing lengths. The defect information is supplied to the computer in the form of the S coordinates of defects appearing in the trial lengths, the latter being achieved by the pick-up unit and bus bars 65 (FIG. 11*b*) carried thereby.

For considering programmed trial length Z's in the order of decreasing lengths, the computer first supplies a voltage to a control circuit for the defect storage units through the Z connection (FIG. 11*b*) having the number corresponding to the first and largest programmed trial Z length and succesively to the lower numbered trial Z connections. In response thereto the entire bank of fingers in each operative read-out head from the first finger bar to the finger bar for the largest Z are pivoted into tape contact for read-out of defect information for the first trial Z. In the allotted cycle time of five seconds the Z connection voltages are shifted successively to the lower numbered programmed trial bank of Z connections, causing the bank of fingers below the new trial Z to remain in contact with the tape and the remainder to retract from the tape. In this manner during the read-out period the defect information for the trial Z's may be read in to the computer 16.

After a trial Z is chosen, the paper tape is advanced to position the tape with the point corresponding to the new leading edge at the top of the read-out head, so that defect information may be read out concerning the remainder of the glass sheet. The programmed trial Z lengths are considered in the same manner starting with the largest Z fitting into the remainder of the glass sheet.

In accordance with one of the features of this invention, the speed of the paper tape through the read-out section 40 as it is advanced between read-out positions is controlled according to the length of tape in the loop around the take-up roll 227 between the sections. A preferred means of achieving the result is shown in FIGS. 12 and 46. It will be seen that in the operation of each defect storage unit, the 9 mosaics of tape feed through the punch section during the read-out period are accumulated in the loop around the take-up roll 227. By means of the control of the forward drive unit, shown in FIG. 46, the positioning brake 260 is energized to stop the paper in the section for the read-out period. A signal is supplied from the computer 16 to a selected finger of the leading edge finger assembly 270, thereby energizing the finger. When the leading edge hole in the tape 34 moves into coincidence with the energized finger, a circuit is made through the bus bar 277 to the relay 542 in series with the latter. By energizing the relay 542 the contacts 544 are closed and the contacts 546 opened. A circuit is made through the closed contacts 544 to the leading edge positioning brake coil 260 which thus is energized to stop the drive sprocket 44. In the normal read-out procedure, the paper tape is first stopped with the 90 mosaic record for an entire uncut sheet, or from the leading edge of a ribbon for the succeding 110 mosaics, in the read-out head. Leading edge trim will automatically be taken into consideration by the position of the leading edge hole, causing up to the first 3 mosaics of paper to be advanced beyond the first rank of defect-hole sensing read-out fingers. After the computer calculates the first cutting determination, the paper tape is advanced until the first mosaic after the new leading edge is positioned under the first rank of read-out fingers so that the program of trial Z lengths may be reconsidered covering the remainder of an uncut sheet. Where ribbon glass is on the conveyor the full program of trial Z lengths is reconsidered with respect to each new leading edge. It should be noted that the leading edge finger assemblies for each defect storage unit are connected in parallel to coordinate the controls of the paper tapes of the different units.

At the completion of the read-out period, the positioning brake 260 is released by deenergizing the leading edge finger of the assembly 270 which results in the high-speed clutch **254*c* being energized, to drive the tape at high speed by means of the forward drive sprocket 44. In this manner, the paper is drawn at an initial high speed through the read-out section. The take-up roll 227 is mounted for movement at each end in a slide and is biased by suitable means such as a spring 228 to maintain the paper in the loop under tension. This roll 227 actuates in its movement a pair of circuit breaking means such as microswitches 262, 264 which are located on the frame of the unit. As shown in FIG. 46, these switches may be operated by pivotable arms having rollers contacting the paper moving around the take-up roll. The switches are arranged in the circuit shown in FIG. 46 for controlling the brake-clutch assemblies 254 of the forward drive unit. The first switch 262, as shown in the wiring diagram of FIG. 46, is connected in series with the coils 254*b* for actuating the brakes of the two-speed forward drive unit and is effective to energize or deenergize these brake coils. Switch 262 is mounted so as to be closed when the roll 227 moves (to the right in FIG. 12) to its minimum loop position. Closing this switch energizes the brake coils 254*b*, thus stopping the forward drive unit and further advance of paper through the read-out section 40**.

The second switch 264 is mounted so as to be operated about half way back in the stroke of the take-up roll 227. This switch is in series, as shown in FIG. 46, with a relay 536 for selecting the high-speed or low-speed clutch of the forward drive unit and thus obtain high or low speed of paper movement. As shown, the relay 536 has two sets of contacts, one set 538 normally closed, and one set 540 normally open. With the take-up roll at the full loop position, switch 534 is closed, energizing the relay 536 and closing the switch 540, thereby selecting the high-speed clutch coil **254*c*. The forward drive motor 46 with the forward drive sprocket 44 engages and starts the advance of the tape at high speed out of the read-out head 62. This high-speed movement continues until the take-up roller 227 moves to the right as the loop diminishes and opens the switch 264 and deenergizes relay 536. When the relay 536 is deenergized, the contacts 540 are opened and contacts 538 closed to deenergize the high-speed clutch coil 254*c* and energize the low-speed clutch coil 258*c***. The paper tape continues to advance through the read-out head but at the low speed, which is just slightly greater than the speed in the punch section.

As the paper tape loop decreases in size the take-up roll 227 may move to its limit position. When this occurs the switch 262 is operated to close the circuit to both the brakes **254*b* and 258*b*, thus stopping the advance of the paper. This continues for a short interval as the paper continues to feed i nto the read-out section until the switch 262** again opens.

Therefore, it will be seen that to stop the advance of the paper through the read-out section, for read-out purposes, requires the high-low clutch coils **254*c*, 258*c*, to be deenergized. This is achieved by energizing the relay 542 which opens the contacts 546. When the computer selects a different finger in the leading edge finger assembly 270, in order to advance the paper to place a different section of the tape in the read-out head for interrogation purposes, the relay 542 is deenergized closing contacts 546 and opening contacts 544. This deenergizes the coil of the leading edge positioning brake 260 and permits the forward drive unit to operate the drive sprocket. In this manner the paper tape is moved through the read-out section as directed by the position of the take up roller 227** and in accord with the length of tape accumulated around the roller.

It will be readily understood that as the glass sheet passes the photo-detection apparatus on the bridge, the trailing edges of the uncut sheets de-actuate the glass present switches in the same order given above for their initial operation. Thus, switch Sw #8 is the first switch to be deactuated as the trailing edge of the uncut sheet passes its location upstream of the bridge. As shown in FIG. 43*b*, opening switch Sw #8 disconnects the glass clock from the line 290 leading to the trim-edge correction circuit 273, and thus is effective to discontinue the transmission of pulses from the glass clock to this circuit. Glass present switch Sw #8, through a connection (not shown), also deenergizes the solenoid 488 in the tracking circuit of FIG. 10. When deenergized, the solenoid 488 moves a valve in the line 100 to hold the pressure constant in the detector 101 and the bridge at a fixed lateral position for the period between uncut sheets.

Next in order of operation by the trailing edge of an uncut is glass present switch Sw #6 which, when deactuated, closes its normally closed contacts. This energizes the auxiliary clutch 72 which connects the downstream drive roller 70 to the gears and transmission of the glass clock mechanism. By this means the glass clock 66 continues to operate after the trailin edge of the uncut sheet is past the location of the upstream roller 68 and continues the operation of the glass clock in synchronism with the movement of the glass for the terminal portion of the period of operation of the photodetection apparatus. Following the operation of glass present switch Sw #6, glass present switches Sw #1 and Sw #7 which are actuated together, open to operate the blanking relay for row 1 of the photosentive elements so as to blank out any spurious signal that might otherwise be caused by the trailing edge of the glass passing the row 1 photosensitive elements to be viewed thereby.

Switch Sw #2, being located ⅛" downstream from switch Sw #1, is next actuated by the trailing edge of the glass. The first set of contacts of the switch are opened, and the second set of contacts closed to ready the switch for a subsequent operation by the leading edge of a succeeding sheet or a new ribbon arriving at the photo-detection apparatus. Since by the opening of the contacts of switch Sw #1 the power supply has been disconnected from switch Sw #2, the subsequent operation of switch Sw #2 has no effect on the operation of the components of the apparatus.

Next in position downstream from switch Sw #2 is switch Sw #3. This latter switch is located at a point upstream of the center line of the photosensitive elements in row 2. Accordingly, as the trailing edge of the glass reaches and operates switch Sw #3, its contacts are opened disconnecting the power supply to switch Sw #4. This also has the effect of deenergizing the row 2 discriminator blanking relay which drops out of its contacts, thus deenergizing the relay contacts in the output of discriminator circuit. In this manner, the circuit prevents the transmission of a spurious pulse from the discriminator circuit due to the passage of the trailing edge of the uncut sheet past the photosensitive elements. Disconnecting the power supply to switch Sw #4 also has the effect of deenergizing one of the parallel connections to the clock selector relay and glass clock main clutch.

Glass present switch Sw #4 is next in order of actuation by the trailing edge of the sheet, and the operation of switch Sw #4 by the trailing edge of the uncut sheet readies the switch for actuation by a successive uncut sheet or ribbon of glass.

Following the operation of switch Sw #3 and Sw #4 the glass clock remains energized and connected for operation by the downstream drive roller since the main clutch of the clock remains energized, as does the clock selector relay, in parallel circuit with the clutch. The energization for these devices for a period after the operation by the trailing edge of the uncut sheet, is through glass present switch Sw #5. Accordingly, next in order of operation by the trailing edge of the uncut sheet is glass present switch Sw #5 which is located at a substantial distance downstream of row 2 of the photosensitive elements. The contacts of this switch are normally open and therefore close when the glass sheet actuates the switch. As the trailing edge of the glass passes glass present switch Sw #5 the contacts are opened to disconnect the clock selector relay 312 and main clutch 326 of the clock from the D.-C. power supply. The clock selector relay 312 therefore drops out its contacts 314 and deenergizes the circuits to the switches of the glass clock 66. The other set of contacts 316 in series with the conveyor clock, which contacts 316 are normally closed when the clock selector relay is energized, are closed to connect the conveyor clock to the power supply. Accordingly, the conveyor clock which continuously mechanically operates, is then connected in circuit to emit pulses in accord with the speed of the conveyor roller to which it is connected. These pulses are supplied to the paper indexing means in the defect storage units, as determined by the position of the selector switches 321, to continue the intermittent operation and feed of the paper through the punch section of the unit while no glass is on the conveyor at the location of the bridge. A third set of normally closed contacts 540 controlled by the clock selector relay, are effective to energize the reset clutch 480 which couples the reset motor 482 to the glass clock shaft and drives it in the reverse direction to a zero position, so that when started by the leading edge of a successive glass sheet, the pulses are emitted in proper order. A latch bar 483 is engaged in a notch in a rotatable disc carried on the clock shaft 73 to fix the start position of the clock, as shown in FIG. 42.

S MARKER AND Z CUTTER COMMANDS

Following each computing cycle during which the computer considers the demand program of trial Z lengths and chooses trial Z's providing Z x S sizes that give the preferred fit, the Z cutter is operated, as shown in FIGURE 1, upon command by the computer to make the successive Z cuts. These commands are transmitted through a cable to the Z cutting apparatus which may be of the type disclosed in the copending application of Charles O. Huffman, William F. Galey and George W. Misson, filed January 19, 1959, Serial No. 785,510, entitled Glass Cutting Apparatus. In order to make the longitudinal S cuts on which the calculations depended for choosing the Z lengths, without interfering with the flow on the conveyor, the severed Z lengths of glass are marked for the S cuts and then shunted onto side lines where suitable slit cutting apparatus, such as disclosed in the copending application of Charles O. Huffman, William F. Galey and George W. Misson, filed October 23, 1958, Serial No. 769,223, entitled Glass Cutting Apparatus, may be located to make the S cuts. S marks 558 are shown on the glass pieces downstream of the Z cutting apparatus. Referring to FIGURES 1, 47 and 48, a preferred means is there shown for placing these marks on the glass pieces at the requisite locations. These S marks are used to control the cutting pattern of the slit cutters on each of the side lines by a suitable slit cut mark detector or by some other like means located just upstream of the S cutting apparatus. To facilitate S-mark detection, the marks are made by suitable marking devices, herein shown as cryons 559, which preferably contain a fluorescent material which is activated by an ultraviolet light source and emits visible light during passage through the slit cut mark detector.

As indicated diagrammatically in FIG. 1, the S marker apparatus, carried on a fixed bridge 561 over the conveyor 10, is connected by a cable 562 to the computer 16 so that the command signals may be suitably transmitted. In the present case, the bridge 561 carries sixty-three individually operable markers 564 for making marks on the glass defining the locations for the S cuts. While the spacing of the markers may be varied as desired, and depends primarily on mechanical considerations, in the present case the markers 564 are mounted in four sets across the bridge, the markers in each set being uniformly spaced. It is advantageous to have the spacing between markers as small as the mechanical considerations permit so that the marks appearing on the glass may be located in an off-center band toward the side of the conveyor 10 on which the side lines are located to gain time in the S mark detection and control of the S cutting apparatus. In addition to the sixty-one S markers 564 for marking S cut locations, a 62nd and a 63rd marker are also included for making marginal trim marks. A marker 566 may be included for marking every Z length of glass for synchronization purposes.

Referring to FIG. 48, the S markers 564 include a crayon holder 568 pivotally mounted on the bridge 561 by means of a shaft 570, so that the holder may be moved from a normally raised position wherein the tip of the cryon 559 is above the glass, to a marking position wherein the tip of the cryon is in glass contact, the movement of the glass producing the mark thereon. The holder 568 for the crayon is normally positioned to maintain the crayon above the glass by the solenoid operated latch 571.

In the present case, the holder 568 is yieldingly biased toward marking position by a spring 573. The position of each holder may be adjusted to move the crayon toward the glass by a cam 574 once the latch 571 has been operated to release the holder. Individual cams 574 are provided for each holder and are rotated through successive positions of a cycle by the hydraulic means 576 connected to a shaft 577 carrying the cams by a segmental rack 578 and pinion 580. A solenoid 582 is provided for the latch of each holder, and is connected individually to the computer 16 so that the command to make an S mark at a particular S location on the glass is transmitted from the computer through the connection to the solenoid 582 associated with the marker over the unit square at that S location.

With this arrangement, referring to FIG. 49, the holder has four angular positions (1) latched position, (2) tripped position, (3) operating or marking position, and (4) relatch position. The latched position is maintained by the latch 571 which is engaged by the spring 572 and released when the solenoid 582 is energized upon command from the computer. The tripped position of the holder is assumed when the solenoid 582 is energized allowing the holder to pivot downwardly until it rests on the cam 574. The operating position is assumed when the cam 574 is rotated by the hydraulic means 576 to its marking position as noted in FIG. 49.

As shown in FIGURE 1, it is preferred that the S marks be applied at both the leading and trailing edges of the Z lengths (because the S mark detection stations may be located on the right or left hand side of a side line) so as to extend parallel to the travel of the glass. The marks may thus be made by pivoting the markers into glass contact for appropriate intervals while the glass passes. For achieving this purpose, a plurality of leading and trailing edge switches are carried by the bridge 561 to detect the arrival of the leading edge of the Z length and the passage of the trailing edge. These switches are connected to a suitable control for the hydraulic means 576. As shown, the hydraulic means 576 includes a pair of pistons 584, 586 received in separate chambers in a casing 592. The chambers are of such length that by control of the fluid admitted to these chambers the segmental rack 578 may be moved successively through four positions, i.e., marking, unlatched, relatch, latched (FIG. 49.) Thus the cam 574 may be rotated to the marking position where the crayon is advanced into glass contact, after the solenoid 582 is energized upon command from the computer and the leading edge switch on the S marker bridge is actuated by the leading edge of the Z length of glass. The cam 574 may then be raised, still in an unlatched position, after the mark of a specific length is made adjacent the leading edge, and lowered to marking position a predetermined time prior to the passage of the trailing edge according to one trailing edge switch being actuated by the trailing edge of the Z length. A third relatch position is provided where the cam 574 is rotated to raise the holder above its latched position to allow the latch to reengage when the solenoid is deenergized and after the trailing edge mark is made. Finally, the cam 574 is moved to the latch position and the holder drops onto the latch.

It is a further feature of the S marker arrangement that each crayon holder 568 includes means to feed the crayon 559 to accommodate, automatically, the wearing away of the marking end. In the present case, this means includes dual spring fingers 592, 594 engageable with ratchet teeth 596 formed in the back of the crayon feed bar 598. The upper spring finger 594 is carried on a fixed support as by the bridge 561 so as to engage the rachet teeth of the feed bar when the holder pivots beyond a predetermined angular position selected to allow a given length of crayon tip to project from the end of the holder. When the holder is raised by the cam, relative motion between the crayon feed bar and the holder occurs. As a result of the relative motion, the crayon is advanced to project the selected distance from the end of the crayon holder. The lower spring finger 592 is secured to the crayon holder and prevents the feed bar from retracting. The extent that the crayon projects from the end of the holder limits the angle through which the crayon holder can pivot counterclockwise, thereby preventing further crayon feed until the end of the crayon wears sufficiently to effect a change in the angular position of the holder when in the marking position.

We claim as our invention:

1. In a paper tape record apparatus, a punch section for making perforations in the tape, a read-out section, means for moving said paper tape through said punch section and through said read-out section, and means for stopping the tape in said read-out section at selectively spaced longitudinal positions for interrogation of selected perforation containing portions of said tape including a longitudinal row of sensing fingers mounted to contact the tape and selective individually to stop the tape upon coincidence with a perforation in the tape.

2. In a paper tape record apparatus, a punch section, a read-out section, means for moving said paper tape through said punch section, means for selectively moving and stopping said paper tape through said read-out section to provide for interrogation of record containing portions of said paper tape, said last-named means including a brake for stopping the paper tape precisely at a selected point and a two-speed drive for moving said paper tape at different rates of speed, and paper tape take-up means between said sections controlling said two-speed drive in accord with the accumulated length of tape between said sections.

3. In a paper record apparatus, a punch section, a read-out section, means for moving said paper tape through said punch section, means for selectively moving and stopping said paper tape through said read-out section to provide for interrogation of record containing portions of said paper tape, said last-named means including means for moving said paper tape at different rates of speed at least one of which is substantially higher than the average rate of paper tape movement through the punch section, and paper tape take-up means between said sections controlling the rate of speed of paper tape movement in the read-out section in accord with the accumulated length of tape between said sections.

4. In an apparatus for partitioning glass sheet having defect marks thereon at the location of any defects, the combination comprising, glass cutting apparatus for making successive transverse cuts in the glass, means for conveying the glass continuously to said cutting apparatus, means including a photosensitive apparatus mounted over the conveyor for detecting the defect marks on the glass, means connected to said photosensitive apparatus for making a record of the dimensional location of defects in pace with the glass movement past the photosensitive apparatus to provide a source of defect information for cutting determinations, and means for read-out of defect information from said record as to selected lengths of glass moving between said photosensitive apparatus and the cutting apparatus relative to the new leading edge formed upon each transverse cutting operation so as to provide defect information for the succeeding cutting determinaiton.

5. In an apparatus for partitioning glass sheet into prescribed sizes of specified grades, said sheet having defect coordinate position and severity information thereon, the combination comprising, glass cutting apparatus for making successive transverse cuts in the glass, means for conveying the glass continuously to said cutting apparatus, means including a photosensitive defect detection apparatus mounted over the conveyor for converting defect information contained on the glass into signals indicative of defect coordinate position and severity, means for discriminating between defect response signals derived by said photosensitive apparatus so as to indicate defects of different severity, and defect storage means for receiving said signals and recording the latter in pace with the glass movement past the photosensitive apparatus to provide separate analogue records of the defects of different severity with the defects located at coordinately corresponding positions on the records, said defect storage means including means for read-out of defect information from each of said separate records for selected portions of the glass moving between said photosensitive apparatus and the cutting apparatus.

6. In an apparatus for partitioning glass sheet having defect marks thereon indicating defects of different severity, the combination comprising, glass cutting apparatus for making transverse cuts in the glass, each cut defining a leading edge, means for conveying the glass continuously to said cutting apparatus, means including a photosensitive apparatus mounted over the conveyor for converting the defect marks to signals indicating the dimensional location of defects in the glass, means for discriminating between defect mark response signals derived by said photosensitive apparatus indicating diffferent defect severity, means for applying said signals to separate records in pace with the glass movement past the photosensitive apparatus in order to form separate analogues of the defect spotted glass containing information as to location of defects of different severity, and means for read-out of defect information from each of said separate records for selected portions of the glass moving between said photosensitive apparatus and the cutting apparatus relative to the leading edge established by a cutting determination so as to provide defect information for the succeeding cutting determination.

7. In an apparatus for partitioning glass sheet having defects therein, the combination comprising, glass cutting apparatus for making transverse cuts in the glass, each cut defining a leading edge, means for conveying the glass continuously to said cutting apparatus, defect storage means for recording of the coordinate positions and severity of defects in the glass in pace with its movement past a point prior to the cutting apparatus, said defect storage means including means for read-out of defect coordinate position and severity information from said recording for selected portions of the glass moving between said point and the cutting apparatus relative to the leading edge established by a cutting determination so as to provide defect information for the succeeding cutting determination.

8. In an apparatus for dividing glass sheet into widths and having a conveyor for the glass sheet, and glass cutting apparatus for making longitudinal cuts to slit the glass sheet into widths, means mounted over the conveyor including a set of marking devices spaced across the conveyor, each of said marking devices including a crayon for applying a mark to the glass to locate the longitudinal cuts, a holder for said crayon, means for mounting said holder for movement to and from a marking position, and control means for selectively moving each of said holders toward a marking position so as to apply marks on the glass as the latter moves along the conveyor relative to crayons held in marking position by selectively operated holders to locate the longitudinal cuts at points defining the longitudinal margins of selected widths.

9. In an apparatus for dividing glass sheet into widths and having a conveyor for the glass sheet, and glass cutting apparatus for making longitudinal cuts to slit the glass sheet into widths, means mounted over the conveyor including a set of marking devices spaced across the conveyor, each of said marking devices including a crayon for applying a mark to the glass to locate the longitudinal cuts, a holder for said crayon, means for mounting said holder for movement to and from a marking position, control means for selectively moving each of said holders so as to apply marks on the glass at selected points, and means for automatically feeding said crayon as an incident to movement of said holder to accommodate wear at the marking end.

10. In apparatus for partitioning moving sheet material having scattered defects therein: a source of defect signals representing defects in the sheet material by the length and width coordinates of defective areas containing said defects relative to longitudinal and transverse reference axes; and defect storage apparatus for recording defect signals from said source on a record medium according to said coordinates relative to longitudinal and transverse axes analogous to said reference axes to provide a secondary defect record comprising an analog of the sheet material.

11. In apparatus for partitioning moving sheet material having scattered defective areas therein; a plurality of sources of defect signals representing defective areas of different severity level in the sheet material by their length and width coordinates; and apparatus for recording defect signals received from said sources respectively on separate records to provide both severity level and defect location information.

12. In apparatus for partitioning moving sheet material having scattered defective areas therein: a source of defect signals representing defective areas in transversely contiguous inspection bands extending longitudinally of the sheet material; and apparatus for recording signals received from said source on a record medium in transversely disposed recording bands analogous to said inspection bands of said sheet material, said recording apparatus including a plurality of recording elements adapted to record signals received from said source representing defective areas in an inspection band in a corresponding recording band, and control means for shifting said recording elements and said record medium relatively longitudinally responsive to successive increments of longitudinal movement of said sheet material so as to record defect signals received from said source in successive longitudinal areas of said recording bands.

13. In apparatus for partitioning moving sheet material having scattered defective areas therein: a source of defect signals representing defective areas in transversely contiguous inspection bands extending longitudinally of the sheet material; and apparatus for recording signals received from said source on a record medium in transversely disposed recording bands analogous to said inspection bands of said sheet material, said recording apparatus including a plurality of recording elements disposed transversely across said record medium opposite said recording bands and adapted to record signals received from said source representing defective areas in each inspection band in a corresponding recording band, and control means for shifting said recording elements and said record medium relatively longitudinally responsive to successive increments of longitudinal movement of said sheet material so as to record defect signals received from said source in successive longitudinal areas of said recording bands.

14. In apparatus for partitioning sheet material having defects therein into programmed sizes representative of prescribed united incremental portions of the sheet, said programmed sizes further having quality grade designations, the combination comprising, means providing signals representing the positions of the defects in the sheet material and the severity levels of said defects according to said quality grade designations, and defect storage means connected to receive said signals for preparing separate secondary records thereof for each severity level, said defect storage means including defect record reading means for interrogating predeterimned portions of each said secondary record in a functional order for defect signal location.

15. In an apparatus for continuously partitioning moving glass sheet having scattered defects therein of different severity, the combination comprising, a glass cutting apparatus for making successive transverse cuts in the glass each cut defining a new sheet leading edge, means for conveying the glass continuously to said cutting apparatus, means including a photosensitive apparatus mounted to scan the glass for providing signals representing the dimensional location of defects in glass moving to said cutting apparatus, means for discriminating between signals from said photosensitive apparatus indicating defects of different severity, means for making separate records of the dimensional location of defects of each severity level in pace with the glass movement past the photosensitive apparatus to provide a source of defect information for cutting determinations, and means for read-out of defect information from each of said separate records as to selected lengths of glass moving between said photosensitive apparatus and the cutting apparatus relative to the new leading edge formed upon each transverse cutting operation so as to provide defect information for the succeeding cutting determination.

16. In an apparatus for partitioning moving glass sheet having defects therein: means including a detection apparatus mounted adjacent the moving sheet providing signals representing the coordinate positions of defective areas of a pre-established severity level in said sheet, defect storage apparatus actuated by said detection apparatus to record said signals so as to prepare an analagous secondary record of said defective areas in the glass sheet, said defect storage apparatus comprising a paper tape recording apparatus including a punch section for making perforations in the tape located according to the coordinate positions of said defective areas as determined by said detection apparatus, said paper tape recording apparatus further having a read-out section, means for moving said paper tape through said punch section and through said read-out section, and means for stopping the tape in said read-out section, said read-out section including means for interrogation of selected lengths of said tape providing defective area location coordinates in a selected tape length for partitioning determinations.

17. In an apparatus for partitioning moving glass sheet having defects therein: means including a detection apparatus mounted adjacent the moving sheet providing signals representing the coordinate positions of defective areas of a pre-established severity level in said sheet, defect storage apparatus actuated by signals from said detection apparatus to record said signals so as to prepare an analagous secondary record of said defective areas in the glass sheet, said defect storage apparatus comprising recording apparatus including a read-in section for recording defective areas located according to the coordinate positions thereof on an endless recording medium, said recording apparatus further having a read-out section, means for moving said recording medium through said read-in section and through said read-out section, said read-out section including means for interrogation of selected lengths of said recording medium providing defective area location coordinates in a selected length of recording medium for partitioning determinations.

18. In apparatus for partitioning moving sheet material having scattered defective areas therein, the combination comprising, means for continuously recording in pace with the movement of the glass sheet the length and width coordinates of defective areas therein, means for reading said recording to locate defective areas in a length of glass sheet, and means for operating said reading means to advance to a new portion of said recording following a cutting determination which divides said length of glass sheet into widths excluding the recorded defective areas.

19. In apparatus for partitioning longitudinally moving sheet material having scattered defective areas therein, the combination comprising, a source of signals representing the transverse positions of defective areas across the moving sheet material; defect storage means for preparing a secondary record by locating the positions of said defective areas by their coordinates on said record including means actuated by said signl sources for locating the transverse positions of said defective areas on said record; and means responsive to the movement of said sheet material for locating the longitudinal positions of said defective areas on said record.

20. In apparatus for partitioning longitudinally moving sheet material having scattered defective areas therein, the combination comprising: a source of signals representing defective areas in transversely contiguous inspection bands extending longitudinally of the sheet material; apparatus for recording signals received from said source on a record medium in transversely disposed recording bands analogous to said inspection bands of said sheet material, said recording apparatus including a plurality of recording elements disposed transversely across said record medium opposite said recording bands and adapted to record signals received from said source representing defective areas in each inspection band in a corresponding recording band; and means responsive to successive increments of longitudinal movement of said sheet material for operating said recording elements so as to record defect signals received from said source in successive longitudinal areas of said recording bands.

21. A method for preparing a record of defects in sheet material comprising the steps of subdividing said sheet material into a multiplicity of contiguous inspection zones extending longitudinally and transversely of the sheet, determining the presence or absence of any defects in each zone, and preparing a secondary record of defect-containing zones by recording the locations of said zones on said record.

22. A method for preparing a record of defects of different severity level in sheet material comprising the steps of subdividing said sheet material into a multiplicity of contiguous inspection zones extending longitudinally of and transversely of the sheet, determining the presence or absence of any defects in each zone for each severity level, and preparing a separate secondary record for each severity level of defect-containing zones by recording the locations of said zones on said separate records.

23. In apparatus for partitioning sheet material having defects therein into programmed sizes representative of prescribed united incremental portions of the material and in pace with movement of said material along a line, the combination comprising: means providing signals representing the transverse positions of defects appearing across the material as the latter moves along the line; and defect storage means for recording the longitudinal and transverse positions of defective areas containing said defects, including means for transferring said signals to said storage means for recording, and means for delaying the transfer of said signals for the period of movement of a longitudinal increment of the material so that a signal representing a defect anywhere in said increment is received and recorded as a defective area signal.

24. In apparatus for partitioning sheet material having defects therein into programmed sizes representative of prescribed united incremental portions of the material, said programmed sizes further having quality grade designations, and in pace with movement of said material along a line, the combination comprising: means providing signals representing the transverse positions of defects appearing across the material as the latter moves along the line and the severity levels of said defects according to said quality grade designations; and defect storage means for recording the longtudinal and transverse positions of defective areas containing said defects on separate records for each severity level, including means for transferring said signals to said defect storage means for recording, and means for delaying the transfer of said signals for the period of movement of a longitudinal increment of the material so that a signal representing a defect anywhere in said increment is received and recorded as a defective area signal.

25. In apparatus for partitioning sheet material having defects therein into programmed sizes representative of prescribed united incremental portions of the material, said programmed sizes further having quality grade designations, and in pace with movement of said material along a line, the combination comprising: means providing signals representing the transverse positions of defects appearing across the material as the latter moves along the line and the severity levels of said defects according to said quality grade designations; and defect storage means for recording the longitudinal and transverse positions of defective areas containing said defects on separate records for each severity level, including means for transferring said signals to said defect storage means for recording, means for delaying the transfer of said signals for the period of movement of a longitudinal increment of the material so that a signal representing a defect anywhere in said increment is received and recorded as a defective area signal, and means for interrogating predetermined portions of each said recording in a functional order for defective area positions.

References Cited by the Examiner

UNITED STATES PATENTS

| | | | |
|---|---|---|---|
| 1,764,966 | 6/30 | Mazer | 49—48 |
| 1,970,932 | 8/34 | Drake | 49—48 X |
| 2,158,900 | 5/39 | Goffaux | 49—48 |
| 2,268,498 | 12/41 | Bryce | 235—61.7 |
| 2,300,050 | 10/42 | Leonard et al. | |
| 2,309,343 | 1/43 | Farrow | 83—371 X |
| 2,362,004 | 11/44 | Heidinger | 235—61.115 X |
| 2,438,098 | 3/48 | Tandler et al. | 33—27 X |
| 2,570,405 | 10/51 | Tandler et al. | |
| 2,575,034 | 11/51 | Tyler et al. | 235—61.115 |
| 2,624,511 | 1/53 | Manning | 235—61.111 |
| 2,655,777 | 10/53 | Hagen. | |
| 2,669,304 | 2/54 | Carpenter | 164—115 |
| 2,699,210 | 1/55 | Perrin | 164—115 |
| 2,744,578 | 5/56 | Mallina | 164—115 |
| 2,751,008 | 6/56 | Cunningham | 164—115 |
| 2,771,596 | 11/56 | Bellamy | 164—115 X |
| 2,822,980 | 2/58 | Roth | 235—61.111 |
| 2,834,156 | 5/58 | Oberin | 49—48 |
| 2,852,189 | 9/58 | Becker et al. | 235—151 |
| 2,866,506 | 12/58 | Hierath et al. | 164—115 |
| 2,866,598 | 12/58 | Balde | 234—89 |
| 2,871,940 | 2/59 | Meunier | 83—371 X |
| 2,876,650 | 3/59 | Sangster. | |
| 2,878,872 | 3/59 | Burns et al. | |
| 2,899,132 | 8/59 | Orthuber | 235—61.115 X |
| 2,924,380 | 2/60 | Demer et al. | 235—61.115 |
| 2,944,737 | 7/60 | Cail et al. | 235—151 |
| 2,948,991 | 8/60 | Walters et al. | 49—48 |
| 2,992,578 | 7/61 | Hribar | 83—467 X |
| 3,000,555 | 9/61 | Innes | 235—61.6 |
| 3,007,636 | 11/61 | Vossen | 235—61.113 |
| 3,013,118 | 12/61 | Kleinschmidt. | |
| 3,015,974 | 1/62 | Orbom et al. | |
| 3,020,033 | 2/62 | McCreanor et al. | 148—9.5 X |
| 3,020,034 | 2/62 | Laycak et al. | |

FOREIGN PATENTS

| | | |
|---|---|---|
| 1,114,501 | 12/55 | France. |

ANDREW R. JUHASZ, *Primary Examiner.*

CHARLES R. HODGES, ARTHUR P. KENT, J. SPENCER OVERHOLSER, *Examiners.*